(12) United States Patent
Takashima et al.

(10) Patent No.: US 9,106,408 B2
(45) Date of Patent: Aug. 11, 2015

(54) SIGNATURE PROCESSING SYSTEM, KEY GENERATION DEVICE, SIGNATURE DEVICE, VERIFICATION DEVICE, SIGNATURE PROCESSING METHOD, AND SIGNATURE PROCESSING PROGRAM

(75) Inventors: Katsuyuki Takashima, Tokyo (JP); Tatsuaki Okamoto, Tokyo (JP)

(73) Assignees: Mitsubishi Electric Corporation, Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 162 days.

(21) Appl. No.: 13/981,679

(22) PCT Filed: Dec. 8, 2011

(86) PCT No.: PCT/JP2011/078463
§ 371 (c)(1),
(2), (4) Date: Jul. 25, 2013

(87) PCT Pub. No.: WO2012/101913
PCT Pub. Date: Aug. 2, 2012

(65) Prior Publication Data
US 2013/0322627 A1 Dec. 5, 2013

(30) Foreign Application Priority Data
Jan. 25, 2011 (JP) ................ 2011-013281

(51) Int. Cl.
*H04L 29/06* (2006.01)
*H04L 9/08* (2006.01)
(Continued)

(52) U.S. Cl.
CPC ............ *H04L 9/0816* (2013.01); *H04L 9/3073* (2013.01); *H04L 9/3255* (2013.01)

(58) Field of Classification Search
CPC .... H04L 9/3073; H04L 9/0816; H04L 9/3255
See application file for complete search history.

(56) References Cited

U.S. PATENT DOCUMENTS 6,320,966 B1    11/2001  Brands
7,181,017 B1 *   2/2007  Nagel et al. .................. 380/282
(Continued)

FOREIGN PATENT DOCUMENTS

WO    WO 97/16903    A1    5/1997
WO    WO 2007/135580 A2    11/2007
WO    WO 2011/007697 A1    1/2011

OTHER PUBLICATIONS

International Search Report issued Mar. 19, 2012, in PCT/JP2011/078463.

(Continued)

*Primary Examiner* — Chau Le
*Assistant Examiner* — Muhammad Chaudhry
(74) *Attorney, Agent, or Firm* — Oblon, McClelland, Maier & Neustadt, L.L.P.

(57) ABSTRACT

The object is to provide an attribute-based signature scheme which is flexible in the design and which supports a non-monotone predicate. An access structure is constituted by applying the inner-product of the attribute vectors to a non-monotone span program. This access structure is flexible in the design of the span program and in the design of the attribute vectors, providing high flexibility in the design of access control. By incorporating the concept of secret distribution in the access structure, the attribute-based signature scheme which supports the non-monotone predicate is realized.

10 Claims, 23 Drawing Sheets

(51) Int. Cl.
*H04L 9/30* (2006.01)
*H04L 9/32* (2006.01)

(56) References Cited

U.S. PATENT DOCUMENTS

| | | | |
|---|---|---|---|
| 2008/0130895 A1* | 6/2008 | Jueneman et al. | 380/277 |
| 2010/0115281 A1 | 5/2010 | Camenisch et al. | |
| 2011/0013771 A1 | 1/2011 | Camenisch et al. | |
| 2012/0027201 A1* | 2/2012 | Fujisaki et al. | 380/28 |
| 2012/0027210 A1* | 2/2012 | Takeuchi et al. | 380/255 |
| 2012/0124379 A1 | 5/2012 | Teranishi | |
| 2013/0173929 A1 | 7/2013 | Takashima et al. | |

OTHER PUBLICATIONS

Delia Khader, "Authenticating with Attributes", Cryptology Eprint Archive, Jan. 28, 2008, 20 pages.
Hemanta Maji, et al., "Attribute-Based Signatures: Achieving Attribute-Privacy and Collusion-Resistance", Cryptology Eprint Archive, IACR, http://eprint.iacr.org/2008/328, Aug. 3, 2008, 23 pages.
Guo Shaniqng, et al., "Attribute-based Signature Scheme", 2008 International Conference on Information Security and Assurance, 2008, pp. 509-511.
Delia Khader, "Attribute Based Group Signatures", Cryptology Eprint Archive, 2007, http://eprint.iar.org/2007/159, 2007, 18 pages.
Dalia Khader, "Attribute Based Group Signature with Revocation", Cryptology Eprint Archive, http://eprint.iacr.org/2007/241, 2007, 19 pages.
Jin Li, et al., "Attribute-based Signature and its Applications", ASIACCS, Apr. 13-16, 2010, 10 pages.
Jin Li, et al., "Attribute-Based Ring Signatures", http://eprint.iacr.org/2008/394, 2008, 16 pages.
Hemanta K. Maji, et al., "Attribute-Based Signatures", http://www.cs.uiuc.edu/mmp/research.html, 2010, 35 pages.
Siamak F. Shahandashti, et al., "Threshold Attribute-Based Signatures and Their Application to Anonymous Credential Systems", Africacrypt, 2009, p. 198-216.
Brent Waters, "Dual System Encryption: Realizing Fully Secure IBE and HIBE under Simple Assumptions", CRYPTO, LNCS, vol. 5677, 2009, pp. 619-636.
Dan Boneh, et al., "Conjunctive, Subset, and Range Queries on Encrypted Data", S.P. Vadhan (Ed.), TCC, LNCS, vol. 4392, 2007, pp. 535-554.
Jonathan Katz, et al., "Predicate Encryption Supporting Disjunctions, Polynomial Equations, and Inner Products", SMART, N.P. (Ed.), EUROCRYPT, LNCS, vol. 4965, 2008, pp. 146-162.
Elaine Shi, et al., "Delegating Capabilities in Predicate Encryption Systems", ICALP, LNCS, vol. 5126, 2008, pp. 560-578.
Tatsuaki Okamoto, et al., "Hierarchical Predicate Encryption for Inner-Products", Asiacrypt, LNCS, vol. 5912, 2009, pp. 214-231.
Allison Lewko, et al., "New Techniques for Dual System Encryption and Fully Secure HIBE with Short Ciphertexts", IACR, 2010, 22 pages.
Allison Lewko, et al., "Fully Secure Functional Encryption: Attribute-Based Encryption and (Hierarchical) Inner Product Encryption", EUROCRYPT, LNCS, vol. 6110, 2010, pp. 62-91.
Tatsuaki Okamoto, et al., "Fully Secure Functional Encryption with General Relations from the Decisional Linear Assumption", CRYPTO, LNCS, vol. 6223, 2010, pp. 191-208.
Allison Lewko, et al., "Decentralizing Attribute-Based Encryption", Eprint, IACR, http://eprint/iacr.org/2010/351, 2010, 29 pages.

* cited by examiner

Fig. 3

$$s_0 = \begin{bmatrix} \overbrace{1,\ldots,1}^{r\text{ COLUMNS}} \end{bmatrix} \begin{bmatrix} f_1 \\ \vdots \\ f_r \end{bmatrix} = \sum_{k=1}^{r} f_k$$

Fig. 4

$$\vec{s}^T = \begin{pmatrix} M_{1,1} & M_{1,2} & \cdots & M_{1,r} \\ M_{2,1} & M_{2,2} & \cdots & M_{2,r} \\ \vdots & & & \vdots \\ M_{L,1} & M_{L,2} & \cdots & M_{L,r} \end{pmatrix} \begin{pmatrix} f_1, & \cdots, & f_r \end{pmatrix} = \begin{pmatrix} s_1, & \cdots, & s_r \end{pmatrix}$$

SIGNATURE PROCESSING SYSTEM, KEY GENERATION DEVICE, SIGNATURE DEVICE, VERIFICATION DEVICE, SIGNATURE PROCESSING METHOD, AND SIGNATURE PROCESSING PROGRAM

TECHNICAL FIELD

The present invention relates to an attribute-based signature (ABS) scheme.

BACKGROUND ART

Non-Patent Literatures 26, 29, 30, 34 to 37, 45, and 51 describe an attribute-based signature scheme. Particularly, Non-Patent Literatures 36 and 37 describe an attribute-based signature scheme that supports a monotone predicate.

CITATION LIST

Patent Literature

Non-Patent Literature 1: Beimel, A., Secure schemes for secret sharing and key distribution. PhD Thesis, Israel Institute of Tech-nology, Technion, Haifa, Israel, 1996.
Non-Patent Literature 2: Belenkiy, M., Camenisch, J., Chase, M., Kohlweiss, M., Lysyanskaya, A. and Shacham, H.: Randomizable proofs and delegatable anonymous credentials. CRYPTO 2009. LNCS, Springer Heidelberg (2009)
Non-Patent Literature 3: Belenkiy, M., Chase, M., Kohlweiss, M. and Lysyanskaya, A.: P-signatures and noninteractive anonymous credentials. TCC 2008, LNCS, Springer Heidelberg (2008)
Non-Patent Literature 4: Bethencourt, J., Sahai, A., Waters, B.: Ciphertext-policy attribute-based encryption. In: 2007 IEEE Sym-posium on Security and Privacy, pp. 321.334. IEEE Press (2007)
Non-Patent Literature 5: Boneh, D., Boyen, X.: Efficient selective-ID secure identity based encryption without random oracles. In: Cachin, C., Camenisch, J. (eds.) EURO-CRYPT 2004. LNCS, vol. 3027, pp. 223.238. Springer Heidelberg (2004)
Non-Patent Literature 6: Boneh, D., Boyen, X.: Secure identity based encryption without random oracles. In: Franklin, M. K. (ed.) CRYPTO 2004. LNCS, vol. 3152, pp. 443.459. Springer Heidelberg (2004)
Non-Patent Literature 7: Boneh, D., Boyen, X., Goh, E.: Hierarchical identity based encryption with constant size ciphertext. In: Cramer, R. (ed.) EUROCRYPT 2005. LNCS, vol. 3494, pp. 440.456. Springer Heidelberg (2005)
Non-Patent Literature 8: Boneh, D., Franklin, M.: Identity-based encryption from the Weil pairing. In: Kilian, J. (ed.) CRYPTO 2001. LNCS, vol. 2139, pp. 213.229. Springer Heidelberg (2001)
Non-Patent Literature 9: Boneh, D., Hamburg, M.: Generalized identity based and broadcast encryption scheme. In: Pieprzyk, J. (ed.) ASIACRYPT 2008. LNCS, vol. 5350, pp. 455.470. Springer Heidelberg (2008)
Non-Patent Literature 10: Boneh, D., Katz, J., Improved efficiency for CCA-secure cryptosystems built using identity based encryp-tion. RSA-CT 2005, LNCS, Springer Verlag (2005)
Non-Patent Literature 11: Boneh, D., Waters, B.: Conjunctive, subset, and range queries on encrypted data. In: Vadhan, S. P. (ed.) TCC 2007. LNCS, vol. 4392, pp. 535.554. Springer Heidelberg (2007)
Non-Patent Literature 12: X. Boyen: Mesh signatures. EUROCRYPT, LNCS, vol. 4515, pp. 210.227. Springer (2007).
Non-Patent Literature 13: Boyen, X., Waters, B.: Anonymous hierarchical identity-based encryption (without random oracles). In: Dwork, C. (ed.) CRYPTO 2006. LNCS, vol. 4117, pp. 290.307. Springer Heidelberg (2006)
Non-Patent Literature 14: Camenisch, J. and Gross, T.: Efficient attributes for anonymous credentials. CCS 2008.
Non-Patent Literature 15: Camenisch, J. and Lysyanskaya, A.: An efficient system for non-transferable anonymous credentials with optimal anonymity revocation. Eurocrypt 2001.
Non-Patent Literature 16: Camenisch, J. and Lysyanskaya, A.: Signature schemes and anonymous credentials from bilinear maps. Crypto 2004.
Non-Patent Literature 17: Canetti, R., Halevi S., Katz J., Chosen-ciphertext security from identity-based encryption. EUROCRYPT 2004, LNCS, Springer-Verlag (2004)
Non-Patent Literature 18: Chaum, D.: Security without identification: Transaction systems to make big brother obsolete. CACM (1985).
Non-Patent Literature 19: D. Chaum and E. van Heyst: Group signatures. In proceedings of EUROCRYPT'91, . . . , LNCS, vol. 547, pp. 257.265 (1991).
Non-Patent Literature 20: Cocks, C.: An identity based encryption scheme based on quadratic residues. In: Honary, B. (ed.) IMA Int. Conf. LNCS, vol. 2260, pp. 360.363. Springer Heidelberg (2001)
Non-Patent Literature 21: Gentry, C.: Practical identity-based encryption without random oracles. In: Vaudenay, S. (ed.) EURO—CRYPT 2006. LNCS, vol. 4004, pp. 445.464. Springer Heidelberg (2006)
Non-Patent Literature 22: Gentry, C., Halevi, S.: Hierarchical identity-based encryption with polynomially many levels. In: Reingold, O. (ed.) TCC 2009. LNCS, vol. 5444, pp. 437.456. Springer Heidelberg (2009)
Non-Patent Literature 23: Gentry, C., Silverberg, A.: Hierarchical ID-based cryptography. In: Zheng, Y. (ed.) ASIA-CRYPT 2002. LNCS, vol. 2501, pp. 548.566. Springer Heidelberg (2002)
Non-Patent Literature 24: Goyal, V., Pandey, O., Sahai, A., Waters, B.: Attribute-based encryption for fine-grained access control of encrypted data. In: ACM Conference on Computer and Communication Security 2006, pp. 89.98, ACM (2006)
Non-Patent Literature 25: Groth, J., Sahai, A.: Efficient non-interactive proof systems for bilinear groups. In: Smart, N. P. (ed.) EUROCRYPT 2008. LNCS, vol. 4965, pp. 415.432. Springer Heidelberg (2008)
Non-Patent Literature 26: S. Guo and Y. Zeng: Attribute-based Signature Scheme, In ISA'08, pp. 509.511 (2008).
Non-Patent Literature 27: Horwitz, J., Lynn, B.: Towards hierarchical identity-based encryption. In: Knudsen, L. R. (ed.) EURO-CRYPT 2002. LNCS, vol. 2332, pp. 466.481. Springer Heidelberg (2002)
Non-Patent Literature 28: Katz, J., Sahai, A., Waters, B.: Predicate encryption supporting disjunctions, polynomial equations, and inner products. In: Smart, N. P. (ed.) EURO-CRYPT 2008. LNCS, vol. 4965, pp. 146.162. Springer Heidel-berg (2008)
Non-Patent Literature 29: D. Khader: Attribute Based Group Signatures, Cryptology ePrint Archive, Report 2007/159 (2007).
Non-Patent Literature 30: D. Khader: Attribute Based Group Signature with Revocation. Cryptology ePrint Archive, Report 2007/241, (2007). http://eprintiacr.org/2007/241.

Non-Patent Literature 31: Lewko, A., Okamoto, T., Sahai, A., Takashima, K. and Waters, B.: Fully Secure Functional Encryption: Attribute-Based Encryption and (Hierarchical) Inner Product Encryption, EUROCRYPT 2010. LNCS, Springer Heidelberg (2010)

Non-Patent Literature 32: Lewko, A. B., Waters, B.: Fully secure HIBE with short ciphertexts. ePrint, IACR, Non-Patent Literature 33: Lewko, A. B., Waters, B.: Decentralizing Attribute-Based Encryption, ePrint, IACR, Non-Patent Literature 34: Jin Li, Man Ho Au, Willy Susilo, Dongqing Xie, Kui Ren: Attribute-based Signature and its Application, ASIACCS' 2010, ACM (2010)

Non-Patent Literature 35: J. Li and K. Kim: Attribute-based ring signatures. 2008. To appear in Journal of Information Sciences.

Non-Patent Literature 36: Maji, H., Prabhakaran, M., Rosulek, M.: Attribute-Based Signatures: Achieving Attribute-Privacy and Collusion-Resistance. ePrint, IACR, Non-Patent Literature 37: Maji, H., Prabhakaran, M., Rosulek, M.: Attribute-Based Signatures.

Non-Patent Literature 38: Okamoto, T., Takashima, K.: Homomorphic encryption and signatures from vector decomposition. In: Galbraith, S. D., Paterson, K. G. (eds.) Pairing 2008. LNCS, vol. 5209, pp. 57.74. Springer Heidelberg (2008)

Non-Patent Literature 39: Okamoto, T., Takashima, K.: Hierarchical predicate encryption for Inner-Products, In: ASIACRYPT 2009, Springer Heidelberg (2009)

Non-Patent Literature 40: Okamoto, T., Takashima, K.: Fully Secure Functional Encryption with General Relations from the Deci-sional Linear Assumption, In: CRYPTO 2010, Springer Heidelberg (2010)

Non-Patent Literature 41: Ostrovsky, R., Sahai, A., Waters, B.: Attribute-based encryption with non-monotonic access structures. In: ACM Conference on Computer and Communication Security 2007, pp. 195.203, ACM (2007)

Non-Patent Literature 42: Pirretti, M., Traynor, P., McDaniel, P., Waters, B.: Secure attribute-based systems. In: ACM Conference on Computer and Communication Security 2006, pp. 99.112, ACM, (2006)

Non-Patent Literature 43: Pirretti, M., Traynor, P., McDaniel, P., Waters, B.: Secure attribute-based systems. In: ACM Conference on Computer and Communication Security 2006, pp. 99.112, ACM, (2006)

Non-Patent Literature 44: Sahai, A., Waters, B.: Fuzzy identity-based encryption. In: Cramer, R. (ed.) EUROCRYPT 2005. LNCS, vol. 3494, pp. 457.473. Springer Heidelberg (2005)

Non-Patent Literature 45: S. F. Shahandashti and R. Safavi-Naini: Threshold attribute-based signatures and their application to anonymous credential systems. In AFRICACRYPT'09, pp. 198.216 (2009).

Non-Patent Literature 46: A. Shamir: Identity-based cryptosystems and signature schemes. In CRYPTO'84, pp. 47.53 (1984).

Non-Patent Literature 47: Shi, E., Waters, B.: Delegating capability in predicate encryption systems. In: Aceto, L., Damgoard, I., Goldberg, L. A., Halldorsson, M. M., Ingolfsdottir, A., Walukiewicz, I. (eds.) ICALP (2) 2008. LNCS, vol. 5126, pp. 560.578. Springer Heidelberg (2008)

Non-Patent Literature 48: Shi, E., Waters, B.: Delegating capability in predicate encryption systems. In: Aceto, L., Damg° ard, I., Goldberg, L. A., Halldorsson, M. M., Ingolfsdottir, A., Walukiewicz, I. (eds.) ICALP (2) 2008. LNCS, vol. 5126, pp. 560.578. Springer Heidelberg (2008)

Non-Patent Literature 49: Waters, B.: Ciphertext-policy attribute-based encryption: an expressive, efficient, and provably secure realization. ePrint, IACR, Non-Patent Literature 50: Waters, B.: Dual system encryption: Realizing fully secure IBE and HIBE under simple assumptions. In: Halevi, S. (ed.) CRYPTO 2009. LNCS, vol. 5677, pp. 619.636. Springer Heidelberg (2009)

Non-Patent Literature 51: Waters, B.: Dual system encryption: Realizing fully secure IBE and HIBE under simple assumptions. In: Halevi, S. (ed.) CRYPTO 2009. LNCS, vol. 5677, pp. 619.636. Springer Heidelberg (2009)

SUMMARY OF INVENTION

Technical Problem

The conventional attribute-based signature scheme does not support non-monotone predicates.

It is an object of the present invention to provide an attribute-based signature scheme that supports non-monotone predicates.

Solution to Problem

A signature processing system according to the present invention is a signature processing system that includes a key generation device, a signature device, and a verification device, and serves to execute a signature process using a basis $B_t$ and a basis $B^*_t$ for each integer t=0, ..., d+1 (d is an integer of 1 or more), wherein the key generation device includes a first information input part which takes as input an attribute set $\Gamma$ including identification information t and attribute information $\vec{x}_t:=(x_{t,i})$ (i=1, ..., $n_t$ where $n_t$ is an integer of 1 or more) for at least one integer t=1, ..., d, a key element 0 generation part which generates a key element $k^*_0$ where a predetermined value $\delta$ is set as a coefficient for a basis vector $b^*_{0,1}$ of a basis $B^*_0$, a key element t generation part which generates a key element $k^*_t$ where $\delta x_{t,i}$ (i=1, ..., $n_t$) obtained by multiplying the attribute information $\vec{x}_t$ by the predetermined value $\delta$ is set as a coefficient for a basis vector $b^*_{t,i}$ (i=1, ..., $n_t$) of the basis $B^*_t$, concerning each identification information t included in the attribute set $\Gamma$ inputted by the first information input part, a key element d+1 generation part which generates a key element $k^*_{d+1,1}$ where the predetermined value $\delta$ is set as a coefficient for a basis vector $b^*_{d+1,1}$ of a basis $B^*_{d+1}$, and a key element $k^*_{d+1,2}$ where the predetermined value $\delta$ is set as a coefficient for a basis vector $b^*_{d+1,2}$ of the basis $B^*_{d+1}$, and a signing key transmission part which transmits, to the signature device, a signing key $sk_\Gamma$ including: the key element $k^*_0$ generated by the key element 0 generation part; the key element $k^*_t$ generated by the key element t generation part concerning each identification information t included in the attribute set $\Gamma$; the key element $k^*_{d+1,1}$ and the key element $k^*_{d+1,2}$ which are generated by the key element d+1 generation part; and the attribute set $\Gamma$, wherein the signature device includes a second information input part which takes as input a variable $\rho(i)$ for each integer i=1, ..., L (L is an integer of 1 or more), which variable $\rho(i)$ is either one of a positive tuple (t, $\vec{v}_i$) and a negative tuple $\neg$ (t, $\vec{v}_i$) of the identification information t (t is any one integer of t=1, ..., d) and attribute information $\vec{v}_i:=(v_{i,i'})$ (i'=1, ..., $n_t$); a predetermined matrix M having L rows and r columns (r is an integer of 1 or more); and a message m, a signing key acquisition part which acquires the signing key $sk_\Gamma$ transmitted by the signing key transmission part, a complementary coefficient calculation part which, based on the variable $\rho(i)$ inputted by the second information input part and the attribute set $\Gamma$ included in the signing key $sk_\Gamma$ acquired by the signing key acquisition part, specifies, among integers i=1, ..., L, a set I of an integer i for which the variable $\rho(i)$ is a positive tuple $(t, \vec{v}_i)$ and with which an inner-product of $\vec{v}_i$ of the positive tuple and $\vec{x}_t$ included in the attribute set $\Gamma$ indicated by identification information t of the positive tuple becomes 0, and an integer i for which the variable $\rho(i)$ is a negative tuple $\neg (t, \vec{v}_i)$ and with which an inner-product of $\vec{v}_i$ of the negative tuple and $\vec{x}_t$ included in the attribute set $\Gamma$ indicated by identification information t of the negative tuple does not become 0; and calculates, concerning i included in the set I specified, a complementary coefficient $\alpha_i$ with which a total of $\alpha_i M_i$ based on $M_i$ which is an element on an i-th row of the matrix M inputted by the second information input part becomes a predetermined vector $\vec{h}$, a signature element 0 generation part which generates a signature element $s^*_0$ including the key element $k^*_0$ included in the signing key $sk_\Gamma$, a signature element i generation part which generates, for each integer i=1 ..., L, a signature element $s^*_i$ including $\gamma_i k^*_t$ obtained by multiplying the key element $k^*_t$ included in the signing key $sk_\Gamma$ by a value $\gamma_i$, by setting the value $\gamma_i$ to satisfy $\gamma_i := \alpha_i$ when the integer i is included in the set I specified by the complementary coefficient calculation part and the variable $\rho(i)$ is a positive tuple $(t, \vec{v}_i)$; by setting the value $\gamma_i$ to satisfy $\gamma_i := \alpha_i/(\vec{v}_i \cdot \vec{x}_t)$ when the integer i is included in the set I and the variable $\rho(i)$ is a negative tuple $\neg (t, \vec{v}_i)$; and by setting the value $\gamma_i$ to satisfy $\gamma_i := 0$ when the integer is not included in the set I, a signature element L+1 generation part which generates a signature element $s^*_{L+1}$ including a sum of the key element $k^*_{d+1,1}$ included in the signing key $sk_\Gamma$ and $m' \cdot k^*_{d+1,2}$ obtained by multiplying the key element $k^*_{d+1,2}$ by a value $m'$ generated using the message m, and a signature data transmission part which transmits, to the verification device, signature data $\sigma$ including: the signature element $s^*_0$ generated by the signature element 0 generation part; the signature element $s^*_i$ generated for each integer i=1, ..., L by the signature element i generation part; the signature element $s^*_{L+1}$ generated by the signature element L+1 generation part; the message m; the variable $\rho(i)$; and the matrix M, and wherein the verification device includes a data acquisition part which acquires the signature data $\sigma$ transmitted by the signature data transmission part, a verification element 0 generation part which generates a verification element $c_0$ by setting, as a coefficient for a basis vector $b_{0,1}$ of a basis $B_0$, $-s_0 - s_{L+1}$ calculated from a value $s_0 := \vec{h} \cdot \vec{f}^T$ and a predetermined value the value $s_0 := \vec{h} \cdot \vec{f}^T$ being generated using a vector $\vec{f}$ having r pieces of elements, and the vector $\vec{h}$, a verification element i generation part which, for each integer i=1, ..., L and using a column vector $\vec{s}^T := (s_1, \ldots s_L)^T := M \cdot \vec{f}^T$ generated based on the vector $\vec{f}$ and the matrix M which is included in the signature data $\sigma$ acquired by the data acquisition part, and a predetermined number $\theta_i$ for each integer i=1, ..., L, generates a verification element $c_i$, when the variable $\rho(i)$ is a positive tuple $(t, \vec{v}_i)$, by setting $s_i + \theta_i v_{i,1}$ as a coefficient for a basis vector $b_{t,1}$ of the basis $B_1$ indicated by identification information t of the positive tuple and by setting $\theta_i v_{i,i'}$ (i'=2, ..., $n_t$) as a coefficient for a basis vector $b_{t,i'}$ (i'=2, ..., $n_t$), and generates a verification element $c_i$, when the variable $\rho(i)$ is a negative tuple $\neg (t, \vec{v}_i)$, by setting $s_i v_{i,i'}$ (i'=1, ..., $n_t$) as a coefficient for the basis vector $b_{t,i'}$ (i'=1, ..., $n_t$) indicated by identification information t of the negative tuple, a verification element L+1 generation part which generates a verification element $c_{L+1}$ by setting $s_{L+1} - \theta_{L+1} m'$ calculated from the predetermined value $s_{L+1}$, the value $m'$, and a predetermined value $\theta_{L+1}$ as a coefficient for a basis vector $b_{d+1,1}$ of a basis $B_{d+1}$, and by setting the predetermined value $\theta_{L+1}$ as a coefficient for a basis vector $b_{d+1,2}$, and a pairing operation part which verifies an authenticity of the signature data $\sigma$ by conducting a pairing operation $\Pi_{i=0}^{L+1} e(c_i, s^*_i)$ for the verification element $c_0$ generated by the verification element 0 generation part, the verification element $c_i$ generated by the verification element i generation part, the verification element $c_{L+1}$ generated by the verification element L+1 generation part, and the signature elements $s^*_0$, $s^*_i$, and $s^*_{L+1}$ included in the signature data $\sigma$.

Advantageous Effects of Invention

An attribute-based signature scheme according to the present invention supports non-monotone predicates, and accordingly realizes an attribute-based signature scheme having diversified applications.

BRIEF DESCRIPTION OF DRAWINGS

FIG. 3 is an explanatory drawing of $s_0$.
FIG. 4 is an explanatory drawing of $\vec{s}^T$.

DESCRIPTION OF EMBODIMENTS

Figure 1:
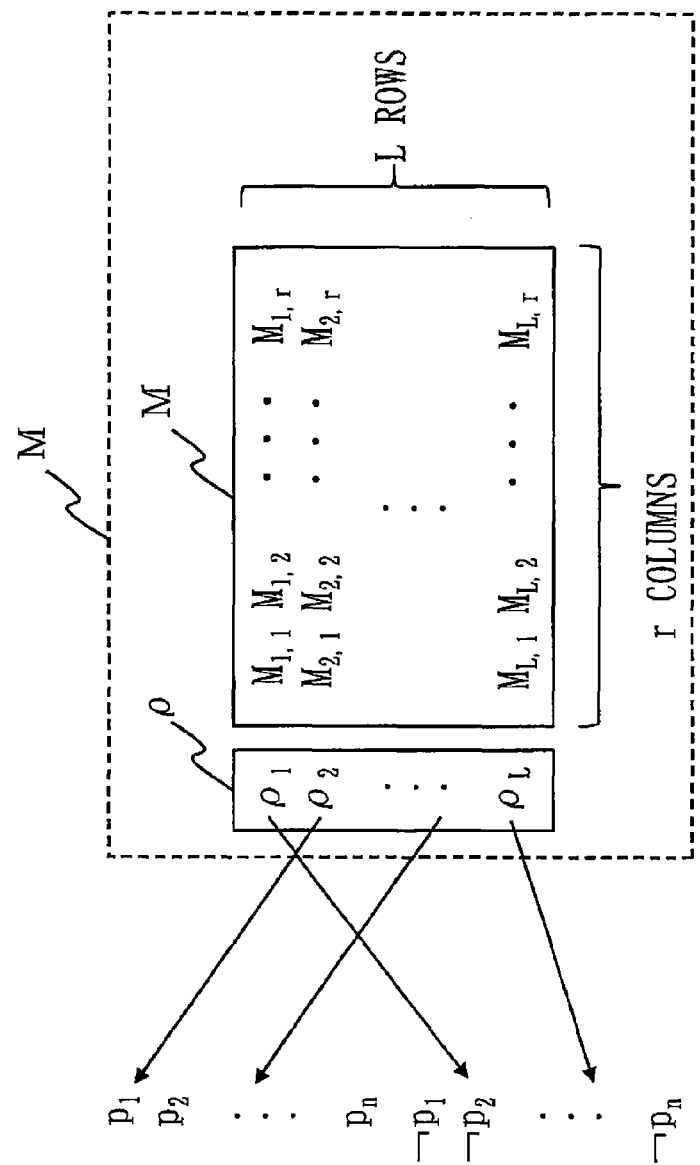
FIG. 1 is an explanatory drawing of a matrix $M^\wedge$.

Embodiments of the present invention will be described hereinafter with reference to the accompanying drawings.

In the following description, a processing device is, for example, a CPU 911 (to be described later). A storage device is, for example, a ROM 913, a RAM 914, or a magnetic disk 920 (each will be described later). A communication device is, for example, a communication board 915 (to be described later). An input device is, for example, a keyboard 902 or the communication board 915 (to be described later). Namely, the processing device, the storage device, the communication device, and the input device are hardware.

The notation in the following description will be explained.

When A is a random variable or distribution, Formula 101 denotes that y is randomly selected from A according to the distribution of A. Namely, in Formula 101, y is a random number.

$$y \xleftarrow{R} A \quad \text{[Formula 101]}$$

When A is a set, Formula 102 denotes that y is uniformly selected from A. Namely, in Formula 102, y is a uniform random number.

$$y \xleftarrow{U} A \quad \text{[Formula 102]}$$

Formula 103 denotes that y is a set, defined or substituted by z.

$$y := z \quad \text{[Formula 103]}$$

When a is a fixed value, Formula 104 denotes an event that a machine (algorithm) A outputs a on input x.

$$A(x) \to a \quad \text{[Formula 104]}$$

For example, $$A(x) \to 1$$

Formula 105, namely, $F_q$, denotes a finite field of order q.

$$\mathbb{F}_q \quad \text{[Formula 105]}$$

A vector symbol denotes a vector representation over the finite field $F_q$. Namely, Formula 106 is established.

$\vec{x}$ denotes $$(x_1, \ldots, x_n) \in \mathbb{F}_q^n \quad \text{[Formula 106]}$$

Formula 107 denotes the inner-product, indicated in Formula 109, of two vectors $\vec{x}$ and $\vec{v}$ indicated in Formula 108.

$$\vec{x} \cdot \vec{v} \quad \text{[Formula 107]}$$

$$\vec{x} = (x_1, \ldots, x_n)$$

$$\vec{v} = (v_1, \ldots, v_n) \text{[Formula 108]}$$

$$\Sigma_{i=1}^n x_i v_i \quad \text{[Formula 109]}$$

Note that $X^T$ denotes the transpose of matrix M.

When $b_i$ (i=1, n) is an element of a vector of a space V, namely, when Formula 110 is established, Formula 111 denotes a subspace generated by Formula 112.

$$b_i \in \mathbb{V} \ (i=1, \ldots, n) \quad \text{[Formula 110]}$$

$$\mathrm{span}\langle b_1, \ldots, b_n \rangle \subseteq \mathbb{V} \ (\text{resp. span}\langle \vec{x}_1, \ldots, \vec{x}_n \rangle) \quad \text{[Formula 111]}$$

$$b_1, \ldots, b_n \ (\text{resp. } \vec{x}_1, \ldots, \vec{x}_n) \quad \text{[Formula 112]}$$

Note that for bases B and B* indicated in Formula 113, Formula 114 is established.

$$\mathbb{B} := (b_1, \ldots b_N),$$

$$\mathbb{B}^* := (b_1^*, \ldots, b_N^*) \quad \text{[Formula 113]}$$

$$(x_1, \ldots, x_N)_\mathbb{B} := \Sigma_{i=1}^N x_i b_i,$$

$$(y_1, \ldots, y_N)_{\mathbb{B}^*} := \Sigma_{i=1}^N y_i b_i^* \quad \text{[Formula 114]}$$

In the following description, in $\mathrm{param}_{v0}$, V0 represents $V_0$. Likewise, nt in $F_q^{nt}$ represents $n_t$.

Likewise, xt in $sk_{gtd,(t,xt)}$ represents $x_t$.

Likewise, when "δi,j" is indicated as a superscript, δi,j is $\delta_{i,j}$.

When "→" indicating a vector is attached to a subscript or superscript, "→" is attached as a superscript to the subscript or superscript.

In the following description, a signature process includes a key generation process, a signature process, and a verification process.

Embodiment 1

This embodiment describes an "attribute-based signature scheme".

First, an attribute-based signature will be briefly explained.

Second, a space having a rich mathematical structure called "dual pairing vector spaces (DPVS)" which is a space for implementing the attribute-based signature scheme will be described.

Third, a concept for implementing the attribute-based signature scheme will be described. Here, a "span program", "the inner-product of attribute vectors, and an access structure", and a "secret distribution scheme (secret sharing scheme)" will be described. Collision resistant hash functions will also be described.

Fourth, an "attribute-based signature scheme" according to this embodiment will be described. Initially, the basic structure of the "attribute-based signature scheme" will be described. Subsequently, the basic structure of a "signature processing system 10" that implements the "attribute-based signature scheme" will be described. Then, the "attribute-based signature scheme" and the "signature processing system 10" according to this embodiment will be described in detail.

<1. Attribute-Based Signature>

The concept of digital signature was introduced in the seminal paper by Diffie and Hellman in 1976. In this concept, a pair comprising a secret signing key sk and a public verification key pk is generated for the signer, and signature a of message m generated using the signing key sk is verified by the corresponding verification key pk. Hence, the signer of the message (m, σ) signed using the signing key sk is identified through the verification key pk.

Although this is one of the requirements of digital signatures, there is no flexibility or privacy in the relationship between signers and claims attested by signatures due to the tight relation between the signing key sk and the verification key pk.

Versatile and privacy-enhanced variants of digital signatures have been studied, where the relation between a signing key and verification key is more flexible or sophisticated.

In this class of signatures, the signing key and verification key are parameterized by attribute x and predicate v, respectively, and signed message (m, generated by the signing key with parameter x, $sk_x$, is correctly verified by public key pk and parameter v, if and only if predicate v accepts attribute x (when v(x) holds).

The privacy of signers in this class of signatures requires that a signature for predicate v, generated by the signing key $sk_x$ release no information regarding attribute x except that v(x) holds.

When predicate v is the equality with parameter v (i.e., v(x) holds if and only if x=v), the class of signatures for this predicate is ID-based signatures (Identity-Based Signatures, IBS) (see Non-Patent Literature 46).

Here note that there is no room for privacy in the ID-based signatures, since predicate v uniquely identifies attribute x of the signer's secret key $sk_x$, such that x=v.

Group signatures are also in this class of signatures (see Non-Patent Literature 19). Group signatures are signatures with predicate v, where v(x) holds if and only if predicate parameter v is the group identity and attribute x is a member identity of group v (or $pk_v$ is a public key identifying group v and $sk_x$ is a secret key of member x of group v).

Due to the privacy requirement, signatures generated using the secret key $sk_x$ release no information regarding member identity x except that x is a member of group v.

This class of signatures includes an attribute-based signature with a more sophisticated predicate (see Non-Patent Literatures 26, 29, 30, 34 to 46, 45, and 51), where x for signing key slc is a tuple of attributes $(x_1, \ldots, x_i)$, and v for verification is a threshold or access structure predicate.

The widest class of predicates in the existing attribute-based signature scheme are monotone access structures (see Non-Patent Literatures 36 and 37), where predicate v is specified by a monotone span program (M, ρ) (MSP(M, ρ)) along with a tuple of attributes $(v_1, \ldots, v_j)$, and v(x) holds if and only if MSP (M, ρ) accepts the truth-value vector of $(T(x_{i\_1}=v_1), \ldots, T(x_{i\_i}=v_j))$. Here, T(ψ):=1 if ψ is true, and T(ψ):=0 if ψ is false. For example, T(x=v):=1 if x=v, and T(x=v):=0 if x≠v.

Such a monotone predicate can express AND, OR, and Threshold gates.

An example of such monotone predicate v for an attribute-based signature will be explained.

An example of such monotone predicate v is (Institute=Univ. A) AND (TH2((Department=Biology), (Gender=Female), (Age=50's)) OR (Position=Professor)), where TH2 means the threshold gate with threshold value 2 (namely, a gate that requires two or more conditions being held).

Attribute $x_A$ of Alice is (Institute=Univ. A), (Department=Biology), (Position=Postdoc), (Age=30), (Gender=Female), and attribute $x_B$ of Bob is (Institute=Univ. A), (Department=Mathematics), (Position=Professor), (Age=45), (Gender=Male). Although their attributes, $x_A$ and $x_B$, are quite different, it is clear that $v(x_A)$ and $v(x_B)$ hold, and that there are many other attributes that satisfy v.

Hence Alice and Bob can generate a signature on this predicate, and due to the privacy requirement of the attribute-based signature, a signature for v releases no information regarding the attribute of the signer, i.e., Alice or Bob (or other), except that the attribute of the signer satisfies the predicate v.

There are many applications of the attribute-based signature such as attributed-based messaging (ABM), attributed-based authentication, trust-negotiation and leaking secrets (see Non-Patent Literatures 36 and 37).

However, there is no attribute-based signature scheme, even one with a low security, for a non-monotone predicate. A non-monotone predicate can express a NOT gate, as with AND, OR, and Threshold gates.

More specifically, with a monotone predicate, although a positive condition can be set, such as (Institute=Univ. A), a negative condition cannot be set, such as (Institute≠Univ. A) (that is, Not(Institute=Univ. A)). In contrast to this, with a non-monotone predicate, a negative condition can be set.

If there are many universities besides Univ. A, it is difficult to set a negative condition of other than Univ. A using only a positive condition (the description becomes complicated). This indicates usefulness of non-monotone predicates.

<2. Dual Pairing Vector Spaces>

First, symmetric bilinear pairing groups will be described.

The symmetric bilinear pairing groups (q, G, $G^T$, g, e) are a tuple of a prime q, a cyclic additive group G of order q, a cyclic multiplicative group $G^T$ of order q, g≠0∈G, and a polynomial-time computable nondegenerate bilinear pairing e:G× G→$G_T$. The nondegenerate bilinear pairing signifies e(sg, tg)=e(g, g)$^{st}$, and e(g, g)≠1.

In the following description, let Formula 115 be an algorithm that takes as input $1^\lambda$ and outputs the values of a parameter $param_G:=(q, G, G_T, g, e)$ of bilinear pairing groups with a security parameter λ.

$$\mathcal{G}_{bpg} \quad \text{[Formula 115]}$$

Dual pairing vector spaces will now be described.

Dual pairing vector spaces (q, V, $G_T$, A, e) can be constituted by a direct product of symmetric bilinear pairing groups $(param_G:=(q, G, G_T, g, e))$. The dual pairing vector spaces (q, V, $G_T$, A, e) are a tuple of a prime q, an N-dimensional vector space V over $F_q$ indicated in Formula 116, a cyclic group $G_T$ of the order q, and a canonical basis $A:=(a_1, \ldots, a_N)$ of the space V, and have the following operations (1) and (2) where $a_i$ is as indicated in Formula 117.

$$\mathbb{V} := \overbrace{G \times \ldots \times G}^{N} \quad \text{[Formula 116]}$$

$$a_i := (\overbrace{0, \ldots, 0}^{i-1}, g, \overbrace{0, \ldots, 0}^{N-i}) \quad \text{[Formula 117]}$$

Operation (1): Nondegenerate Bilinear Pairing

The pairing on the space V is defined by Formula 118.

$$e(x,y):=\Pi_{i=1}^N e(G_i, H_i) \in \mathbb{G}_T \quad \text{[Formula 118]}$$

where $(G_1, \ldots, G_N):=x \in \mathbb{V}$, $(H_1, \ldots, H_N):=y \in \mathbb{V}$ This is nondegenerate bilinear, i.e., e(sx, ty)=e(s, y)$^{st}$ and if e(x, y)=1 for all y∈V, then x=0. For all i and j, $e(a_i, a_j)$=e(g, g)$^{\delta_{i,j}}$ where $\delta_{i,j}$=1 if i=j, and $\delta_{i,j}$=0 if i≠j. Also, e(g, g)≠1∈$G_T$.

Operation (2): Distortion Maps

Linear transformation $\phi_{i,j}$ on the space V indicated in Formula 119 can achieve Formula 120.

$$\phi_{i,j}(a_j) = a_i \quad \text{[Formula 119]}$$

if $k \neq j$ then $\phi_{i,j}(a_k) = 0$ $$\phi_{i,j}(x) := (\overbrace{0, \ldots, 0}^{i-1}, g_j, \overbrace{0, \ldots, 0}^{N-i}) \quad \text{[Formula 120]}$$

Note that $x := (g_1, \ldots g_N)$

Linear transformation $\phi_{i,j}$ will be called distortion maps.

In the following description, let Formula 121 be an algorithm that takes as input, $1^\lambda$ ($\lambda \in$natural number), N$\in$natural number, and the values of the parameter $\text{param}_G := (q, G, G_T, g, e)$ of bilinear pairing groups, and outputs the values of a parameter $\text{param}_v := (q, V, G_T, A, e)$ of dual pairing vector spaces which have a security parameter $\lambda$ and which form an N-dimensional space V.

$$\mathcal{G}_{dpvs} \quad \text{[Formula 121]}$$

A case will be described where dual pairing vector spaces are constructed from the symmetric bilinear pairing groups described above. Dual pairing vector spaces can be constructed from asymmetric bilinear pairing groups as well. The following description can be easily applied to a case where dual pairing vector spaces are constructed from asymmetric bilinear pairing groups.

<3. Concept for Implementing Attribute-Based Signature Scheme>

<3-1. Span Program>

FIG. 1 is an explanatory drawing of a matrix M^.

Let $\{p_1, \ldots, p_n\}$ be a set of variables. $M^\wedge := (M, \rho)$ is a labeled matrix where the matrix M is an (L rows×r columns) matrix over $F_q$, and $\rho$ is a label of each row of the matrix M and is related to one of literals $\{p_1, \ldots, p_n, \neg p_1, \ldots, \neg p_n\}$. A label $\rho_i$ (i=1, . . . , L) of every row of M is related to one of the literals, namely, $\rho: \{1, \ldots, L\} \to \{p_1, \ldots, p_n, \neg p_1, \ldots, \neg p_n\}$.

For every input sequence $\delta \in \{0, 1\}^n$, a submatrix $M_\delta$ of the matrix M is defined. The matrix $M_\delta$ is a submatrix consisting of those rows of the matrix M, whose labels $\rho$ are related to value "1" by the input sequence $\delta$. Namely, the matrix $M_\delta$ is a submatrix consisting of the rows of the matrix M which are related to $p_i$ with which $\delta_i=1$ and the rows of the matrix M which are related to $\neg p_i$ with which $\delta_i=0$.

Figure 2:
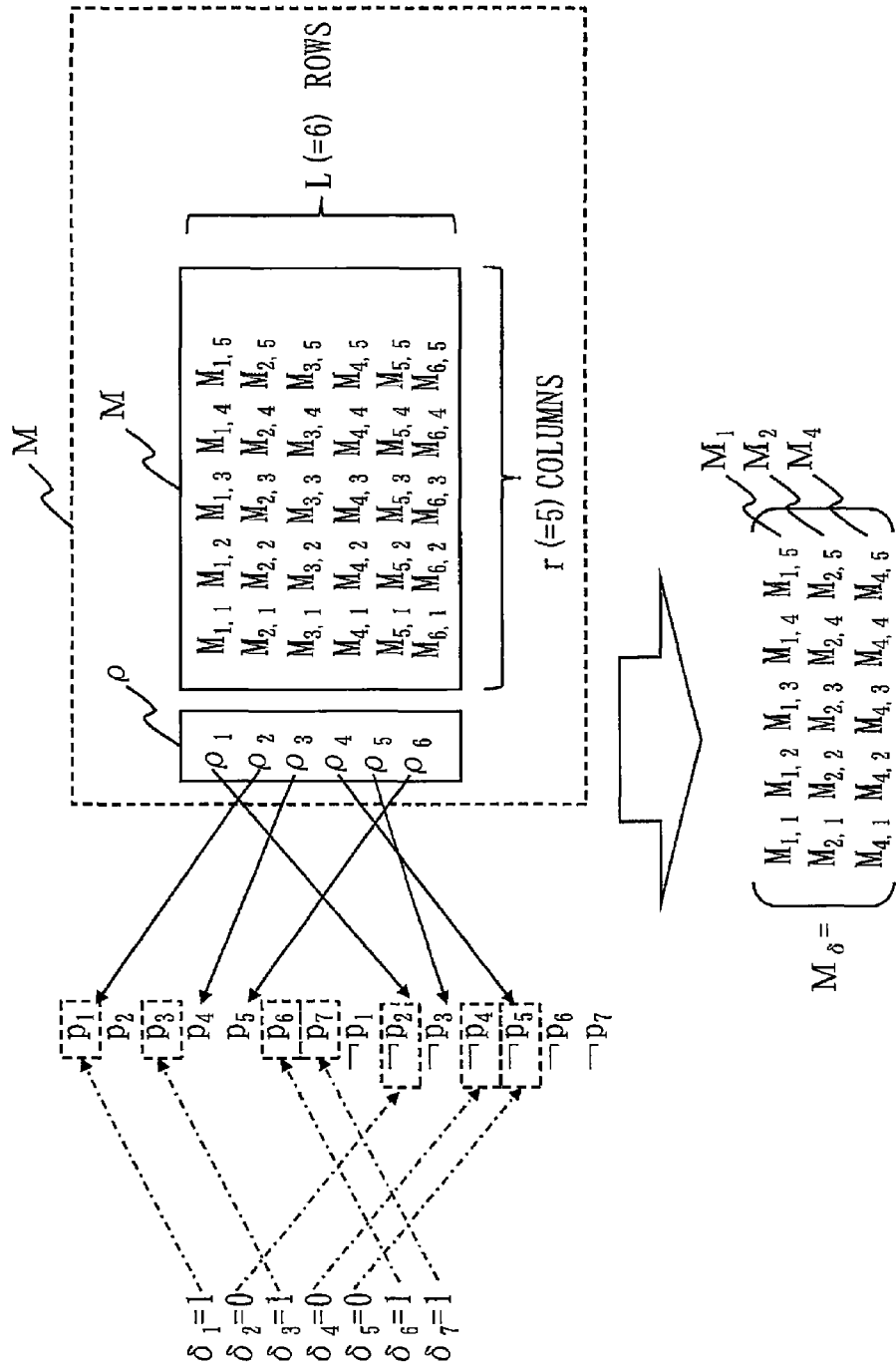
FIG. 2 is an explanatory drawing of a matrix $M_\delta$.

FIG. 2 is an explanatory drawing of the matrix $M_\delta$. Note that in FIG. 2, n=7, L=6, and r=5. That is, the set of variables is $\{p_1, \ldots, p_7\}$, and the matrix M is a (6 rows×5 columns) matrix. In FIG. 2, assume that the labels $\rho$ are related such that $\rho_1$ corresponds to $\neg p_2$, $\rho_2$ to $p_1$, $\rho_3$ to $p_4$, $\rho_4$ to $\neg p_5$, $\rho_5$ to $\neg p_3$, and $\rho_6$ to $\neg p_5$.

Assume that in an input sequence $\delta \in \{0,1\}^7$, $\delta_1=1$, $\delta_2=0$, $\delta_3=1$, $\delta_4=0$, $\delta_5=0$, $\delta_6=1$, and $\delta_7=1$. In this case, a submatrix consisting of the rows of the matrix M which are related to literals ($p_1, p_3, p_6, p\gamma_i \neg_2, \neg p_4, \neg p_5$) surrounded by broken lines is the matrix $M_\delta$. That is, the submatrix consisting of the 1st row ($M_1$), 2nd row ($M_2$), and 4th row ($M_4$) of the matrix M is the matrix $M_\delta$.

In other words, when map $\gamma: \{1, \ldots, L\} \to \{0, 1\}$ is $[\rho(j)=p_i] \wedge [\delta_i=1]$ or $[\rho(j)=\neg p_i] \wedge [\delta_i=0]$, then $\gamma(j)=1$; otherwise $\gamma(j)=0$. In this case, $M_\delta := (M_j)_{\gamma(j)=1}$. Note that $M_j$ is the j-th row of the matrix M.

That is, in FIG. 2, map $\gamma(j)=1$ (j=1, 2, 4), and map $\gamma(j)=0$ (j=3, 5, 6). Hence, $(M_j)_{\gamma(j)=1}$ is $M_1, M_2$, and $M_4$, and the matrix $M_\delta$.

More specifically, whether or not the j-th row of the matrix M is included in the matrix $M_\delta$ is determined by whether the value of the map $\gamma(j)$ is "0" or "1".

The span program M^ accepts an input sequence $\delta$ if and only if $1^\to \in \text{span}<M_\delta>$, and rejects the input sequence $\delta$ otherwise. Namely, the span program M^ accepts the input sequence $\delta$ if and only if linear combination of the rows of the matrix $M_\delta$ which are obtained from the matrix M^ by the input sequence $\delta$ gives $1^\to$. $1^\to$ is a row vector which has value "1" in each element.

For example, in FIG. 2, the span program M^ accepts the input sequence $\delta$ if and only if linear combination of the respective rows of the matrix $M_\delta$ consisting of the 1st, 2nd, and 4th rows of the matrix M gives $1^\to$. That is, if there exist $\alpha_1, \alpha_2$, and $\alpha_4$ with which $\alpha_1(M_1)+\alpha_2(M_2)+\alpha_4(M_4)=1^\to$, the span program M^ accepts the input sequence $\delta$.

The span program is called monotone if its labels $\rho$ are related to only positive literals $\{p_1, \ldots, p_n\}$. The span program is called non-monotone if its labels $\rho$ are related to the literals $\{p_1, \ldots, p_n, \neg p_1, \ldots \neg p_n\}$. Suppose that the span program is non-monotone. An access structure (non-monotone access structure) is constituted using the non-monotone span program.

Because the span program is not monotone but non-monotone as described above, the application of the attribute-based signature scheme constituted using the span program widens.

<3-2. Inner-Product of Attribute Vectors and Access Structure>

Map $\gamma(j)$ described above will be calculated using the inner-product of attribute vectors. Namely, which row of the matrix M is to be included in the matrix $M_\delta$ will be determined using the inner-product of the attribute vectors.

$U_t$ (t=1, . . . , d and $U_t \subset \{0, 1\}^*$) is a sub-universe and an attribute set. Each $U_t$ includes identification information (t) of the sub-universe and $n_t$-dimensional vector ($v^\to$). Namely, $U_t$ is (t, $v^\to$) where $t \in \{1, \ldots, d\}$ and $v^\to \in F_q^{nt}$.

Let $U_t := (t, v^\to)$ be a variable p of the span program $M^\wedge := (M, \rho)$, that is, $p := (t, v^\to)$. Let the span program $M^\wedge := (M, \rho)$ having the variable $(p := (t, v^\to), (t', v'^\to), \ldots)$ be an access structure S.

That is, the access structure $S := (M, \rho)$, and $\rho: \{1, \ldots, L\} \to \{(t \, v^\to), (t', v'^\to), \ldots, \neg(t, v^\to), \neg(t', v'^\to), \ldots\}$.

Let $\Gamma$ be an attribute set, that is, $\Gamma := \{(t, x^\to_t) | x^\to_q \in F_q^{nt}, 1 \leq t \leq d\}$.

When $\Gamma$ is given to the access structure S, map $\gamma: \{1, \ldots, L\} \to \{0, 1\}$ for the span program $M^\wedge := (M, \rho)$ is defined as follows. For each integer i=1, . . . , L, set $\gamma(i)=1$ if $[\rho(i)=(t, v^\to_i)] \wedge [(t, x^\to_t) \in \Gamma \wedge [v^\to_i \cdot x^\to_t=0]$ or $[\rho(i)=\neg(t, v^\to_i)] \wedge [(t, x^\to_t) \in \Gamma] \wedge [v^\to_i \cdot x^\to_t \neq 0]$. Set $\gamma(i)=0$ otherwise.

Namely, the map $\gamma$ is calculated based on the inner-product of the attribute vectors $v^\to$ and $x^\to$. As described above, which row of the matrix M is to be included in the matrix $M_\delta$ is determined by the map $\gamma$. More specifically, which row of the matrix M is to be included in the matrix $M_\delta$ is determined by the inner-product of the attribute vectors $v^\to$ and $x^\to$. The access structure $S := (M, \rho)$ accepts $\Gamma$ if and only if $1^\to \in \text{span}<M_i>_{\gamma(i)=1}>$.

A simpler form of the inner-product relations in the above-mentioned access structures is obtained when $n_t=2$ for all $t \in \{1, \ldots, d\}$, and $x^\to := (1, x)$ and $v^\to := (v, -1)$.

In this case, $(t, x^\to_t) := (t, (1, x))$ and $(t, v^\to_i) := (t, (v_i, -1))$, which will be simplified as $(t, x_t)$ and $(t, v_i)$. Then, the access structure S is $S := (M, \rho)$ such that $\rho: \{1, \ldots, L\} \to \{(t, v), (t', v'), \ldots \neg(t, v), \neg(t', v'), \ldots\}$ ($v, v', \ldots \in F_q$), and the attribute set $\Gamma$ is $\Gamma := \{(t, x_t) | x_t \in F_q, 1 \leq t \leq d\}$.

When $\Gamma$ is given to the access structure S, map $\gamma: \{1, \ldots, L\} \to \{0, 1\}$ for the span program $M^\wedge := (M, \rho)$ is defined as follows: For each integer i=1, . . . , L, set $\gamma(i)=1$ if $[\rho(i)=(t, v_i)] \wedge [(t, x_t) \in \Gamma] \wedge [v_i=x_t]$ or $[\rho(i)=\neg(t, v_i)] \wedge [(t, x_t) \in \Gamma] \wedge [v_i \neq x_t]$. Set $\gamma(i)=0$ otherwise.

<3-3. Secret Distribution Scheme>

A secret distribution scheme for the access structure S:=(M, ρ) will be described.

The secret distribution scheme is distributing secret information to render it nonsense distributed information. For example, secret information s is let to be distributed among 10 lumps to generate 10 pieces of distributed information. Each of the 10 pieces of distributed information does not have information on secret information s. Hence, even when certain one piece of distributed information is obtained, no information can be obtained on the secret information s. On the other hand, if all of the 10 pieces of distributed information are obtained, the secret information s can be recovered.

Another secret distribution scheme is also available according to which even when all of the 10 pieces of distributed information cannot be obtained, if one or more, but not all, (for example, 8 pieces) of distributed information can be obtained, then the secret information s can be recovered. A case like this where the secret information s can be recovered using 8 pieces out of 10 pieces of distributed information will be called 8-out-of-10. That is, a case where the secret information s can be recovered using t pieces out of n pieces of distributed information will be called t-out-of-n. This t will be called a threshold.

Still another secret distribution scheme is available according to which when 10 pieces of distributed information $d_1, \ldots, d_{10}$ are generated, the secret information s can be recovered if 8 pieces of distributed information $d_1, \ldots, d_8$ are given, but cannot if 8 pieces of distributed information $d_3, \ldots, d_{10}$ are given. Namely, this is a secret distribution scheme with which whether or not the secret information s can be recovered is controlled not only by the number of pieces of distributed information obtained but also depending on the combination of the distributed information.

FIG. 3 is an explanatory drawing of $s_0$. FIG. 4 is an explanatory drawing of $\vec{s}^T$.

Let a matrix M be an (L rows×r columns) matrix. Let $\vec{f}$ be a column vector indicated in Formula 122.

$$\vec{f}^T := (f_1, \ldots f_r)^T \xleftarrow{U} \mathbb{F}_q^r \qquad \text{[Formula 122]}$$

Let $s_0$ indicated in Formula 123 be secret information to be shared.

$$s_0 := \vec{1} \cdot \vec{f}^T := \Sigma_{k=1}^r f_k \qquad \text{[Formula 123]}$$

Let $\vec{s}^T$ indicated in Formula 124 be a vector of L pieces of distributed information of $s_0$.

$$\vec{s}^T := (s_1, \ldots, s_L)^T := M \cdot \vec{f}^T \qquad \text{[Formula 124]}$$

Let the distributed information $s_i$ belong to ρ(i).

If the access structure S:=(M, ρ) accepts Γ, that is, $1^{\rightarrow} \in \text{span}\langle (M_i)_{\gamma(i)=1}\rangle$ for γ: {1, ..., L}→{0, 1}, then there exist constants $\{\alpha_i \in \mathbb{F}_q | i \in I\}$ such that $I \subseteq \{i \in \{1, \ldots, L\} | \gamma(i)=1\}$.

This is obvious from the explanation on FIG. 2 in that if there exist $\alpha_1$, $\alpha_2$, and $\alpha_4$ with which $\alpha_1(M_1)+\alpha_2(M_2)+\alpha_4(K) = 1^{\rightarrow}$, the span program M^ accepts the input sequence δ. Namely, if the span program M^ accepts the input sequence δ when there exist $\alpha_1$, $\alpha_2$, and $\alpha_4$ with which $\alpha_1(M_1)+\alpha_2(M_2)+\alpha_4(M_4)=1^{\rightarrow}$, then there exist $\alpha_1$, $\alpha_2$, and $\alpha_4$ with which $\alpha_1(M_1)+\alpha_2(M_2)+\alpha_4(M_4)=1^{\rightarrow}$.

Note Formula 125.

$$\Sigma_{i \in I} \alpha_i s_i = s_0 \qquad \text{[Formula 125]}$$

Note that the constants $\{\alpha_i\}$ can be computed in time polynomial in the size of the matrix M.

With the attribute-based signature scheme according to this and the following embodiments, an access structure is constructed by applying the inner-product predicate and the secret distribution scheme to the span program, as described above. Therefore, access control can be designed flexibly by designing the matrix M in the span program and the attribute information x and the attribute information v (predicate information) in the inner-product predicate. Namely, access control can be designed very flexibly. Designing of the matrix M corresponds to designing of conditions such as the threshold of the secret distribution scheme.

In particular, the access structure in the attribute-based signature scheme according to this and the following embodiments constitutes a non-monotone access structure that uses a non-monotone span program. Namely, the attribute-based signature scheme according to this and the following embodiments is a signature scheme with non-monotone predicates. Thus, the flexibility in the access control design further improves.

<3-4. Collision Resistance Hash Function>

A collision resistance hash function is a hash function which is difficult to find two inputs that hash to the same output.

Let a natural number λ be a security parameter. A collision resistant hash function family H associated with algorithm $G_{bpg}$, and a polynomial poly(λ) specify two items:

1. A family of key spaces is indexed by λ. Each such key space is a probability space on bit strings denoted by $KH_\lambda$. There must exist a probabilistic polynomial-time algorithm whose output distribution on input $1^\lambda$ is equal to $KH_\lambda$.

2. A family of hash functions is indexed by λ, hk randomly selected from $KH_\lambda$, and D:={0, 1}$^{poly(\lambda)}$, where each such function $H_{hk}^{\lambda,D}$ maps an element of D to an element of $\mathbb{F}_q^x$ with q being the first element of output param$_G$ of algorithm $G_{bpg}(1^\lambda)$. There must exist a deterministic polynomial-time algorithm that on input $1^\lambda$, hk and d∈D, outputs $H_{hk}^{\lambda,D}(d)$.

Let ε be a probabilistic polynomial-time machine. For all λ, Formula 126 is defined:

$$Adv_\varepsilon^{H,CR}(\lambda) := \qquad \text{[Formula 126]}$$
$$Pr[(d_1, d_2) \in D^2 \wedge d_1 \neq d_2 \wedge H_{hk}^{\lambda,D}(d_1) = H_{hk}^{\lambda,D}(d_2)]$$

where $$D := \{0, 1\}poly(\lambda)$$

$$hk \xleftarrow{R} KH_\lambda$$

$$(d_1, d_2) \xleftarrow{R} \varepsilon(1^\lambda, hk, D)$$

H is a collision resistant hash function family if for any probabilistic polynomial-time adversary ε, $Adv_\varepsilon^{H,CR}(\lambda)$ is negligible.

<4. Structure of Attribute-Based Signature Scheme>

<4-1. Basic Structure of Attribute-Based Signature Scheme>

The attribute-based signature scheme consists of four algorithms: Setup, KeyGen, Sig, and Ver.

(Setup)

A Setup algorithm is a randomized algorithm that takes as input a security parameter λ and an attribute format $\vec{n}:=(d; n_t, u_t, w_t, z_t (t=1, \ldots d))$, and outputs a public parameter pk and a master key sk.

(KeyGen)

A KeyGen algorithm is a randomized algorithm that takes as input an attribute set $\Gamma:=\{(t, \vec{x}_t) | \vec{x}_t \in \mathbb{F}_q^{n_t} \setminus \{\vec{0}\}, 1 \leq t \leq d\}$, the public parameter pk, and the master key sk, and outputs a signing key $sk_\Gamma$.

(Sig)

A Sig algorithm is a randomized algorithm that takes as input a message m, an access structure $\mathbb{S}:=(M, \rho)$ that accepts the attribute set $\Gamma$, the signing key $sk_\Gamma$, and the public parameter pk, and outputs signature data $\sigma$ including a signature $\vec{s}^*$, the message m, and the access structure $\mathbb{S}$.

(Ver)

A Ver algorithm is an algorithm that takes as input the signature data $\sigma$ and the public parameter pk, and outputs Boolean value 1 (accept) or 0 (reject).

With the attribute-based signature scheme, for every public parameter pk and master key sk indicated in Formula 127, every message m, every attribute set $\Gamma$, every signing key $sk_\Gamma$ indicated in Formula 128, every access structure $\mathbb{S}$ that accepts the attribute set $\Gamma$, and every signature data $\sigma$ indicated in Formula 129, 1=Ver(pk, m, $\mathbb{S}$, $\sigma$) holds with probability 1.

$$(pk, sk) \xleftarrow{R} \text{Setup}(1^\lambda, \vec{n}) \qquad \text{[Formula 127]}$$

$$sk_\Gamma \xleftarrow{R} \text{KeyGen}(pk, sk, \Gamma) \qquad \text{[Formula 128]}$$

$$\sigma \xleftarrow{R} \text{Sig}(pk, sk_\Gamma, m, \mathbb{S}) \qquad \text{[Formula 129]}$$

<4-2. Signature Processing System 10>

A signature processing system 10 that executes the algorithms of the attribute-based signature scheme described above will be described.

Figure 5:
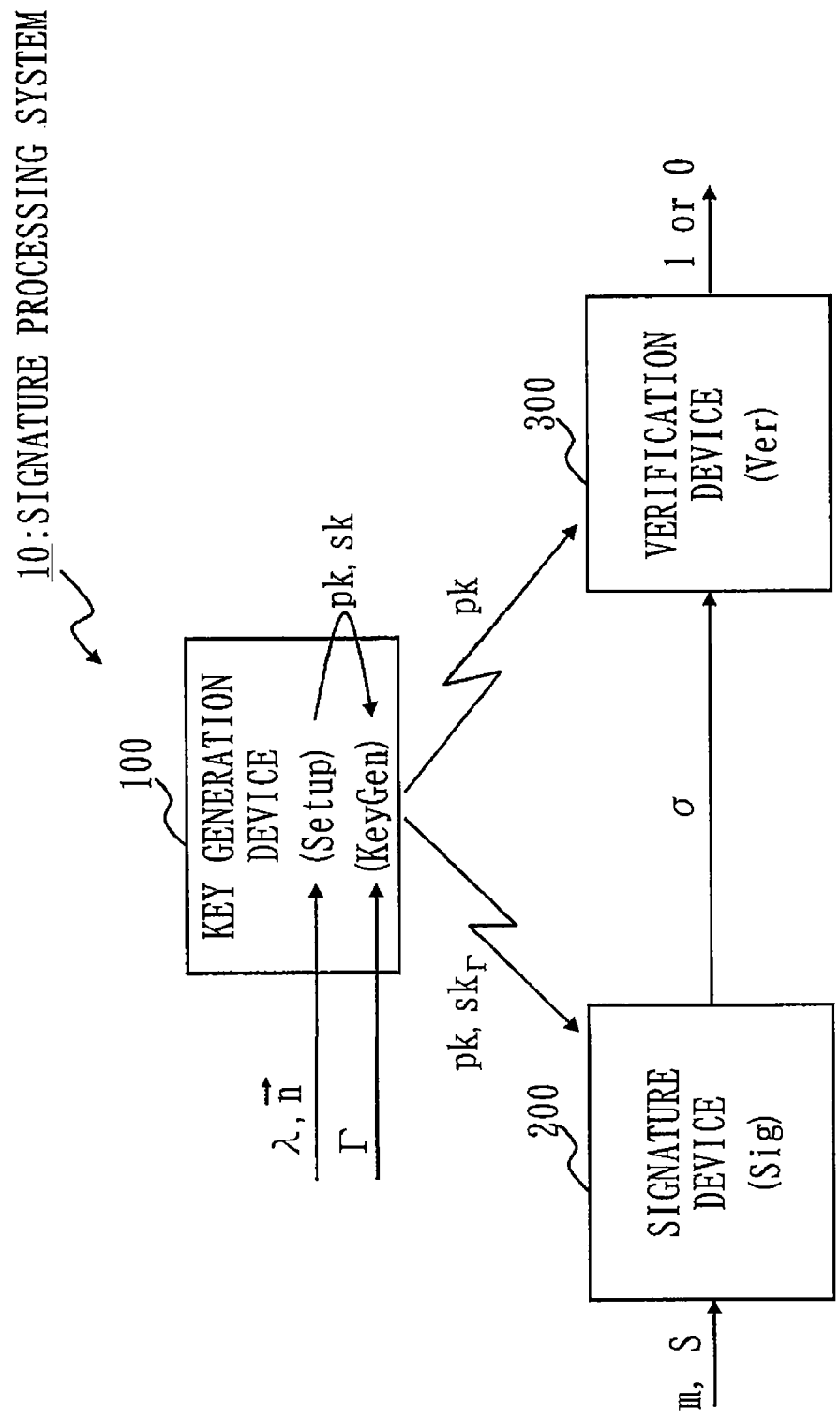
FIG. 5 is a configuration diagram of a signature processing system 10 which executes an attribute-based signature scheme.

FIG. 5 is a configuration diagram of the signature processing system 10 which executes the attribute-based signature scheme.

The signature processing system 10 is provided with a key generation device 100, a signature device 200, and a verification device 300.

The key generation device 100 executes the Setup algorithm by taking as input a security parameter $\lambda$, and an attribute format $\vec{n}:=((d; n_t, u_t, w_t, z_t (t=1, \ldots, d))$, and generates a public parameter pk and a master key sk. The key generation device 100 publicizes the generated public parameter pk. The key generation device 100 also executes the KeyGen algorithm by taking as input the attribute set $\Gamma:=\{(t, \vec{x}_t) | \vec{x}_t \in \mathbb{F}_q^{n_t} \setminus \{\vec{0}\}\}, 1 \leq t \leq d\}$, the public parameter pk, and the master key sk, and generates a signing key $sk_\Gamma$ and distributes it to the signature device 200 in secrecy.

The signature device 200 executes the Sig algorithm by taking as input a message m, an access structure $\mathbb{S}:=(M, \rho)$ that accepts the attribute set $\Gamma$, the signing key $sk_\Gamma$, and the public parameter pk, and generates signature data $\sigma$ including a signature $\vec{s}^*$, the message m, and the access structure $\mathbb{S}$. The signature device 200 transmits the generated signature data $\sigma$ to the verification device 300.

The verification device 300 executes the Ver algorithm by taking as input the signature data $\sigma$ and the public parameter pk, and outputs Boolean value 1 (accept) or 0 (reject).

<4-3. Attribute-Based Signature Scheme and Signature Processing System 10 in Detail>

The attribute-based signature scheme, and the function and operation of the signature processing system 10 which executes the attribute-based signature scheme will be described with reference to FIGS. 6 to 12.

Figure 6:
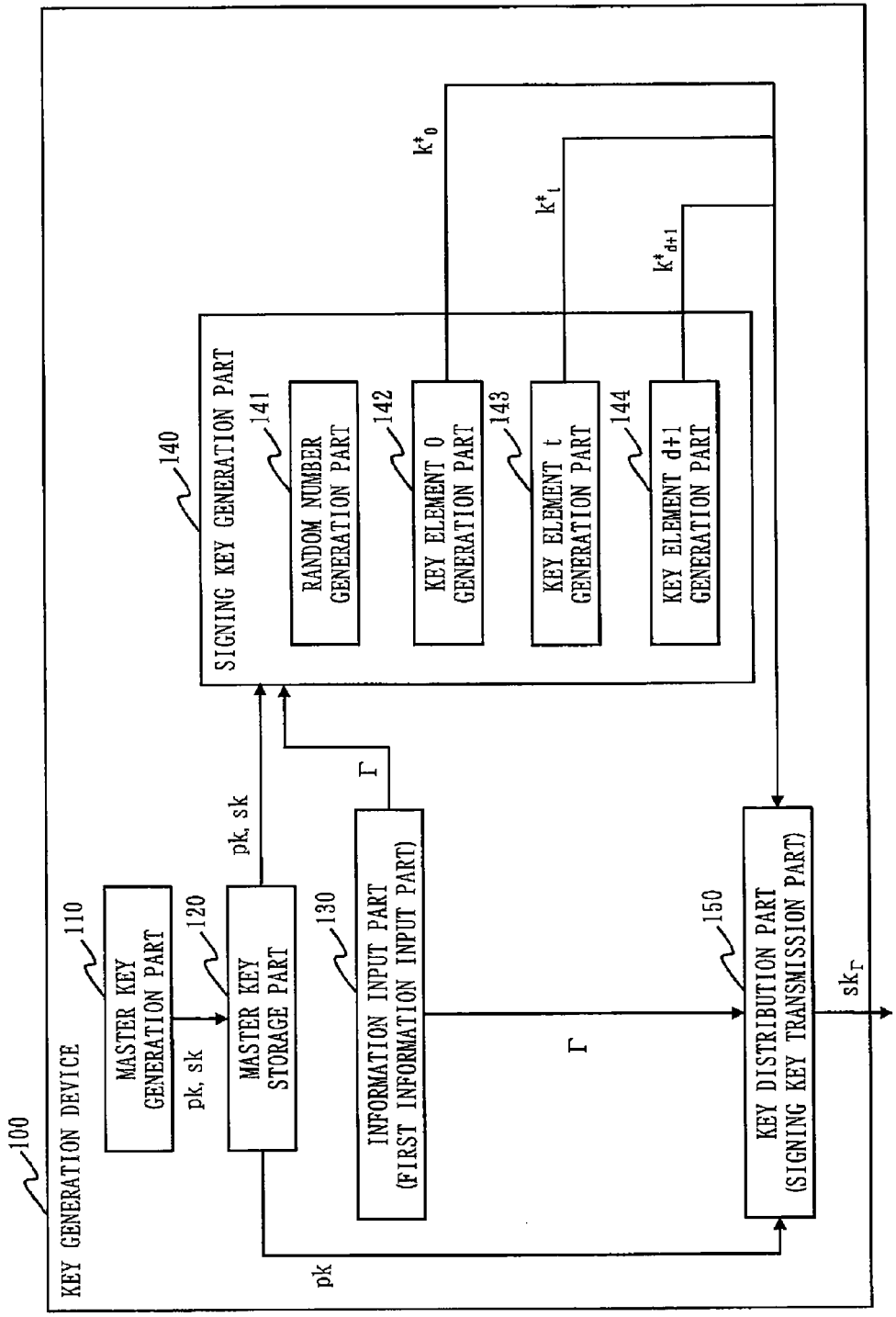
FIG. 6 is a function block diagram showing a function of a key generation device 100.
Figure 7:
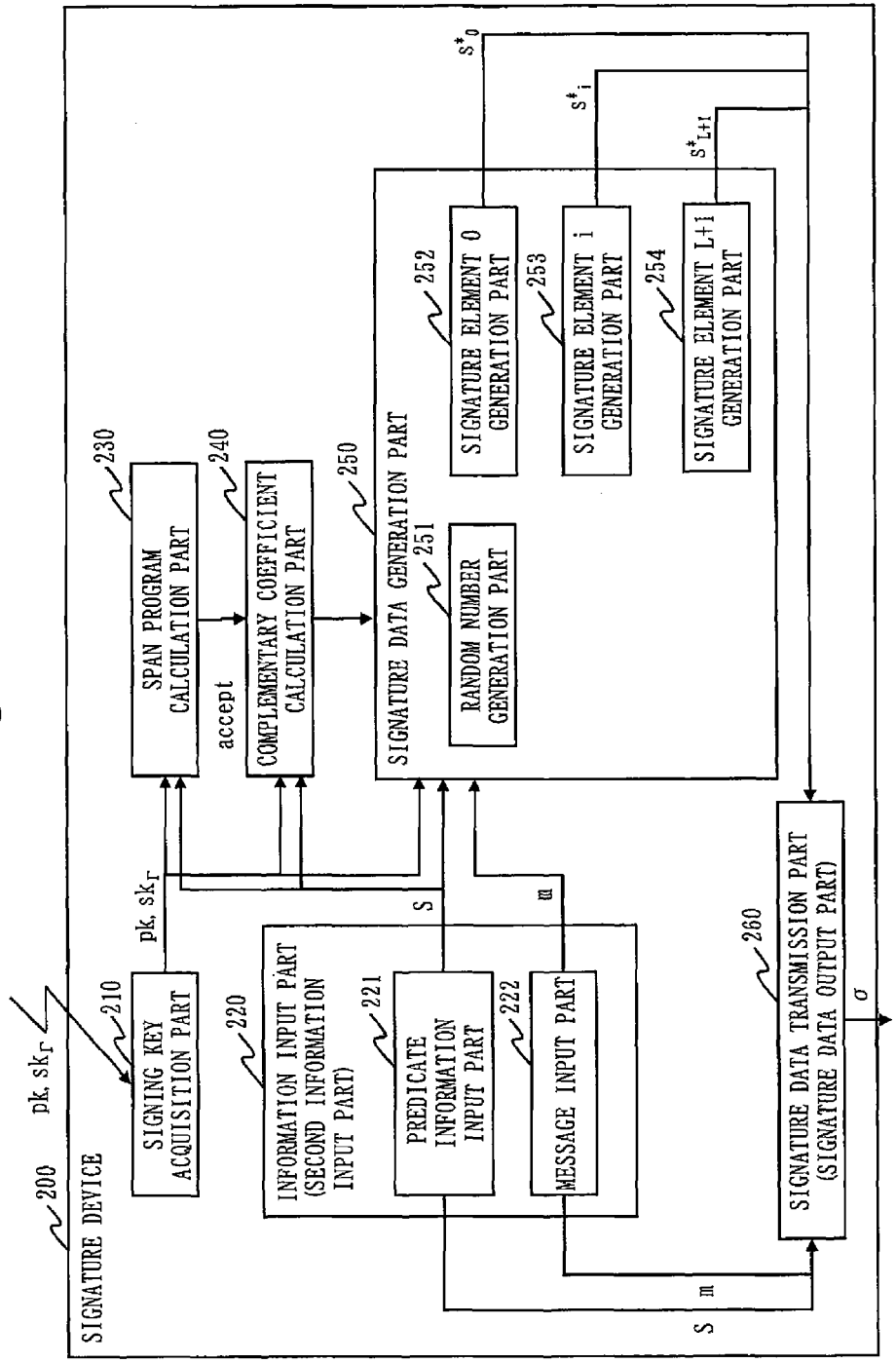
FIG. 7 is a function block diagram showing a function of a signature device 200.
Figure 8:
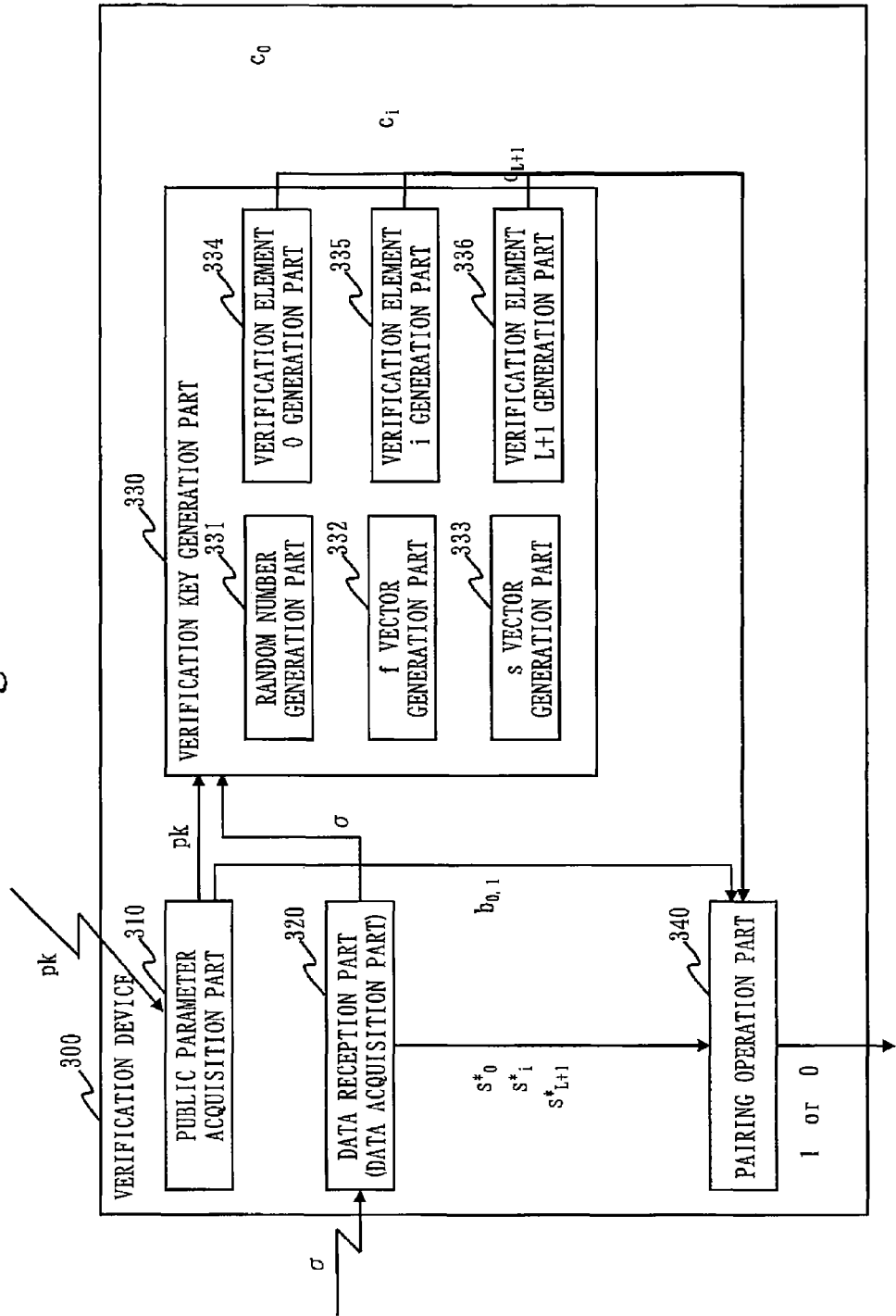
FIG. 8 is a function block diagram showing a function of a verification device 300.

FIG. 6 is a function block diagram showing the function of the key generation device 100. FIG. 7 is a function block diagram showing the function of the signature device 200. FIG. 8 is a function block diagram showing the function of the verification device 300.

Figure 9:
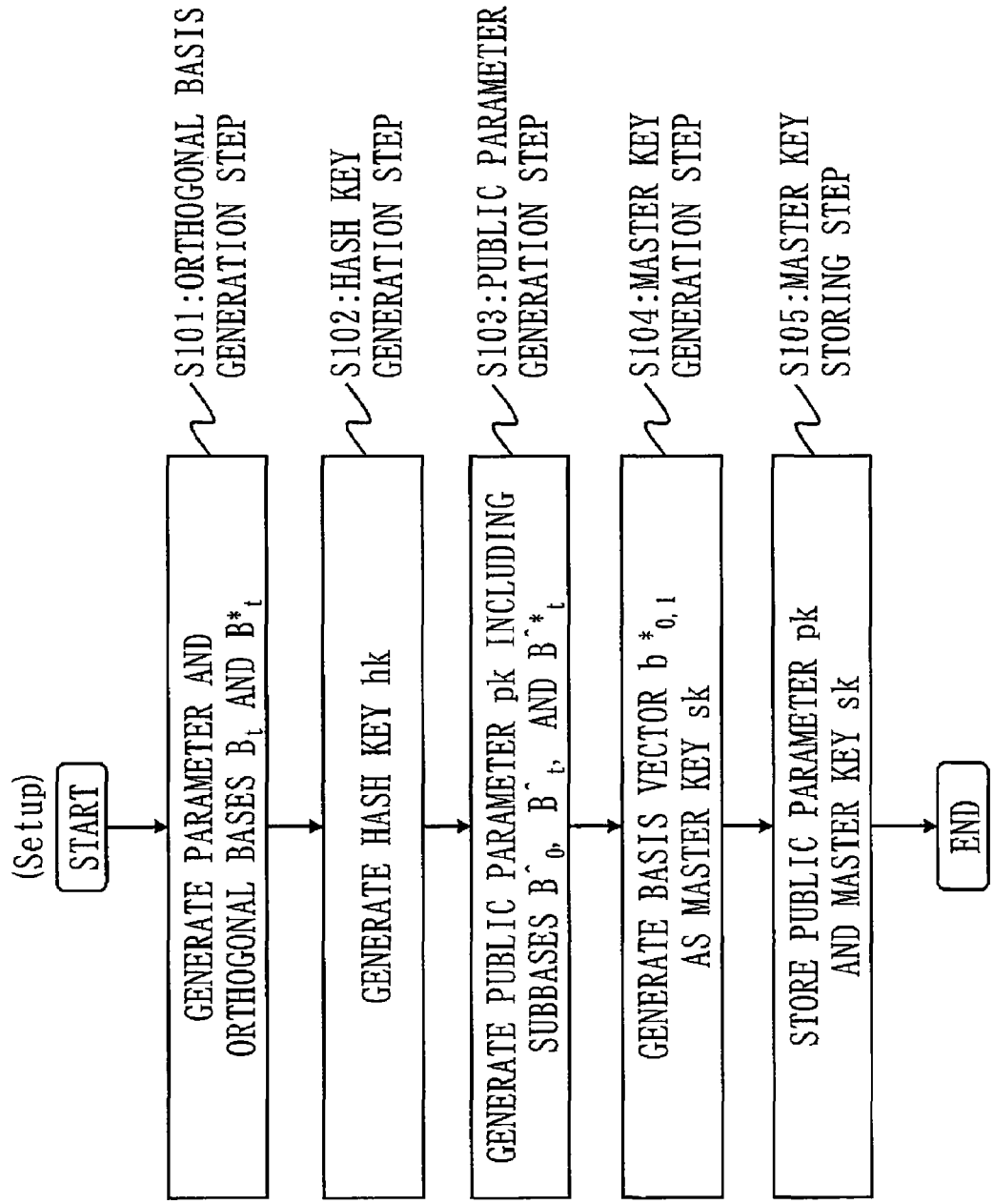
FIG. 9 is a flowchart showing the process of Setup algorithm.
Figure 10:
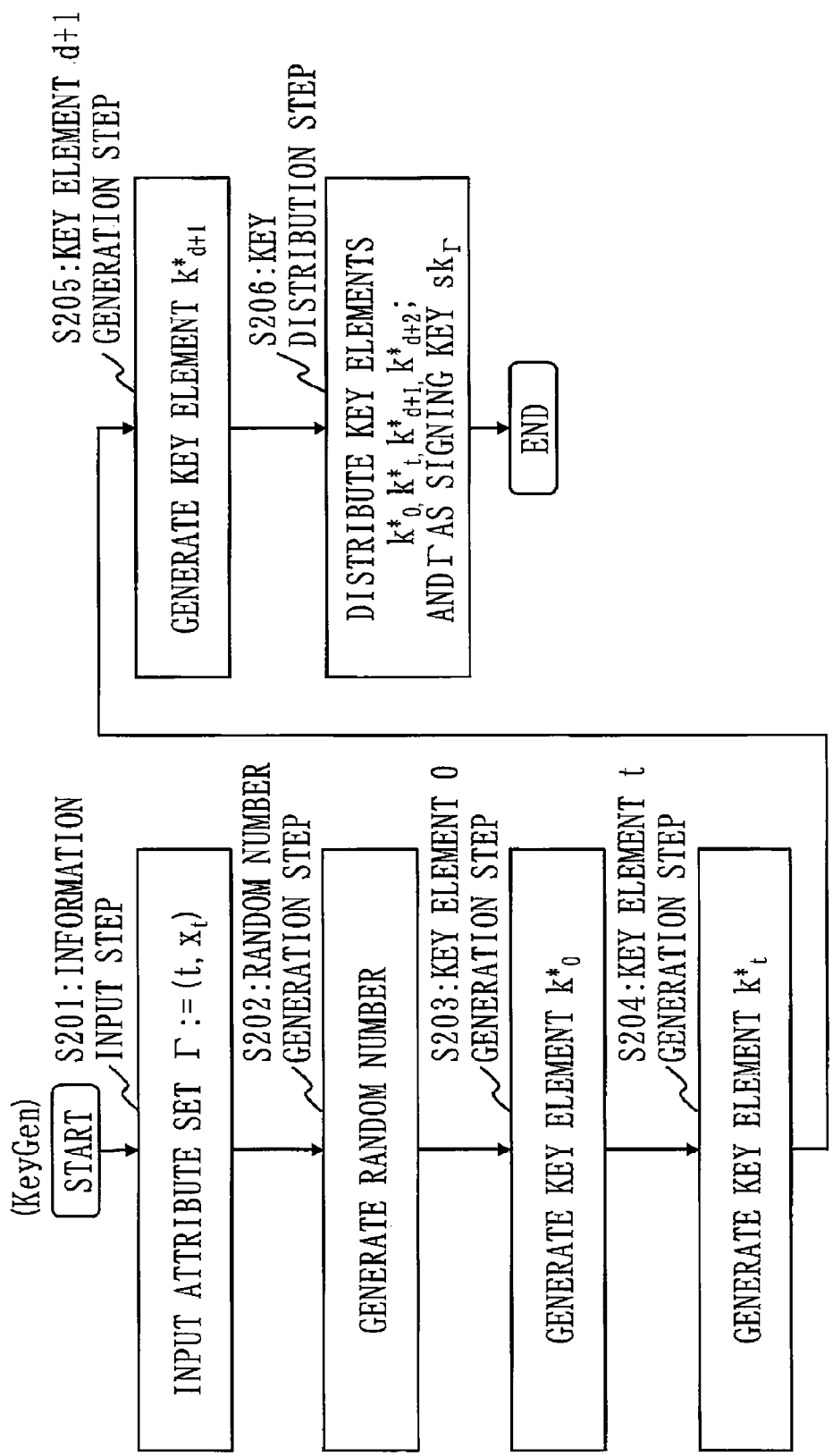
FIG. 10 is a flowchart showing the process of KeyGen algorithm.
Figure 11:
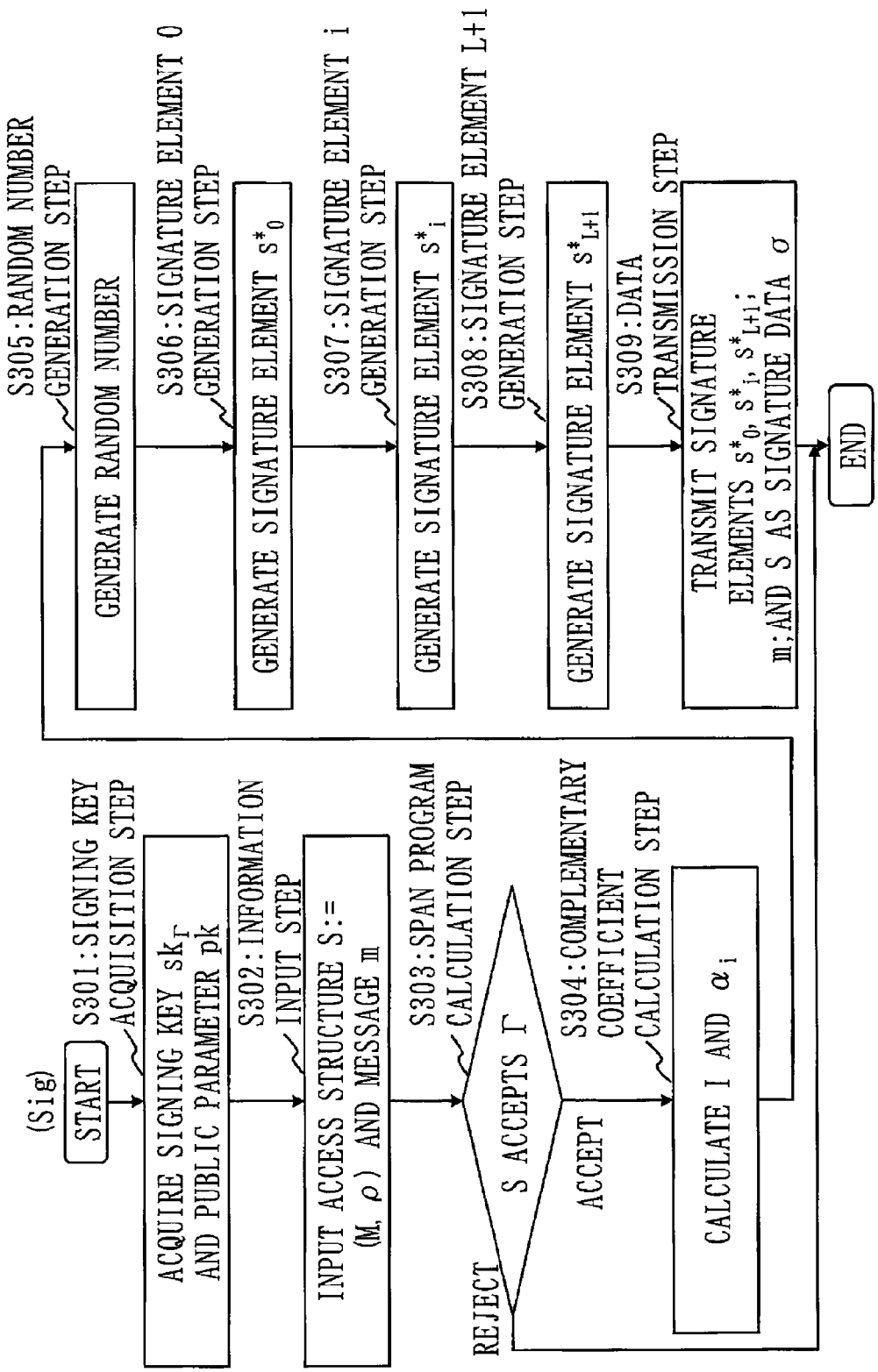
FIG. 11 is a flowchart showing the process of Sig algorithm.
Figure 12:
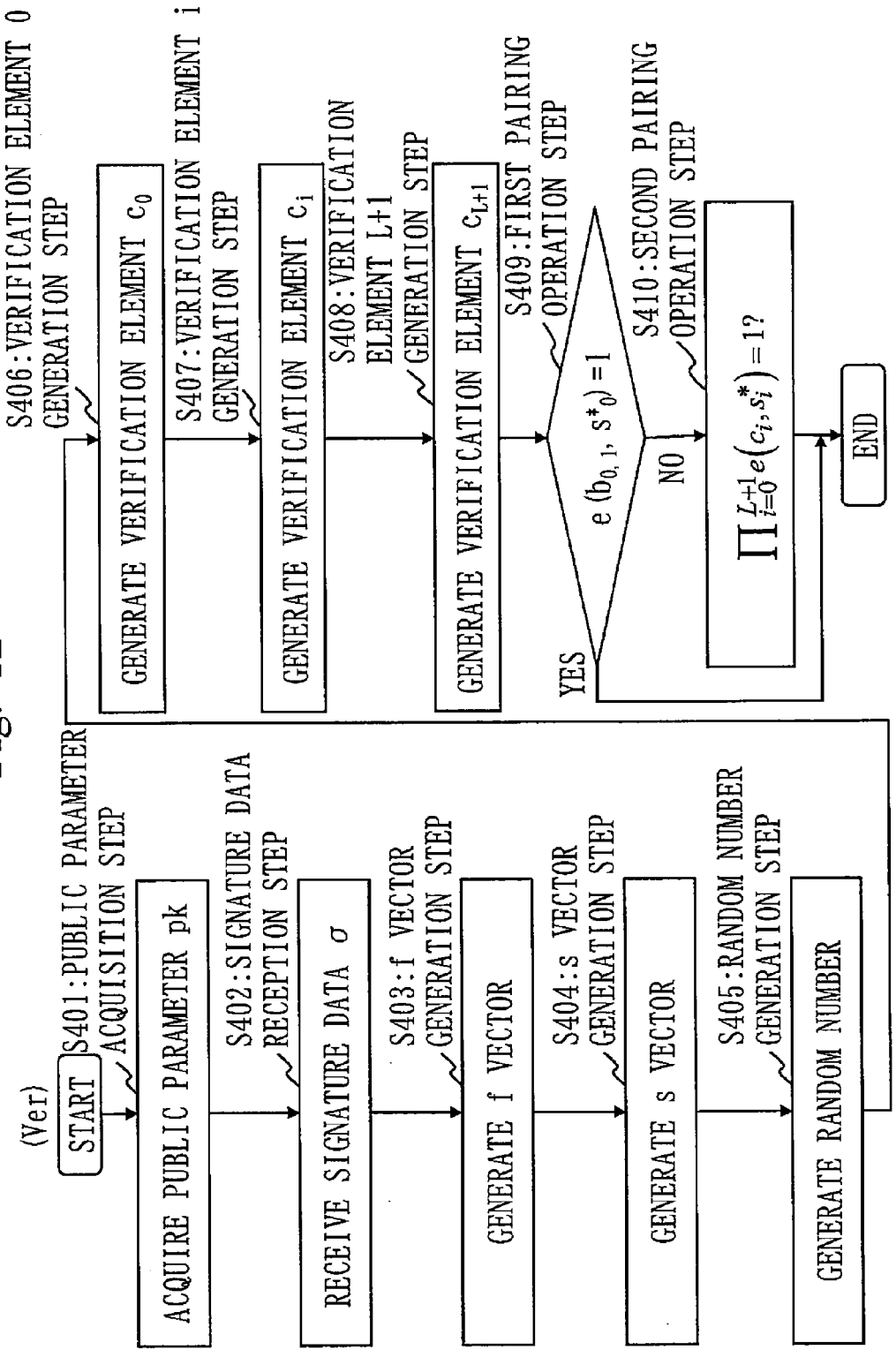
FIG. 12 is a flowchart showing the process of Ver algorithm.

FIGS. 9 and 10 are flowcharts showing the operation of the key generation device 100. Note that FIG. 9 is a flowchart showing the process of the Setup algorithm, and that FIG. 10 is a flowchart showing the process of the KeyGen algorithm. FIG. 11 is a flowchart showing the operation of the signature device 200 and the process of the Sig algorithm. FIG. 12 is a flowchart showing the operation of the verification device 300 and the process of the Ver algorithm.

The function and operation of the key generation device 100 will be described.

As shown in FIG. 6, the key generation device 100 is provided with a master key generation part 110, a master key storage part 120, an information input part 130 (first information input part), a signing key generation part 140, and a key distribution part 150 (signing key transmission part).

The signing key generation part 140 is provided with a random number generation part 141, a key element 0 generation part 142, a key element t generation part 143, and a key element d+1 generation part 144.

In the following description, $H:=(KH_\lambda, H_{hk}^{\lambda,D})$ is a collision resistant hash function family described above.

The process of the Setup algorithm executed by the key generation device 100 will be described first with reference to FIG. 9.

(S101: Orthogonal Basis Generation Step)

The master key generation part 110 calculates Formula 130 with the processing device to randomly generate the $param_{\vec{n}}$, and bases $\mathbb{B}_t$ and $\mathbb{B}^*_t$ for each integer $t=0, \ldots, d+1$.

[Formula 130]

$$\text{input } 1^\lambda, \vec{n} := (d; n_t, u_t, w_t, z_t)(t = 0, \ldots, d+1) \qquad (1)$$

$$param_\mathbb{G} := (q, \mathbb{G}, \mathbb{G}_T, g, e) \xleftarrow{R} \mathcal{G}_{bpg}(1^\lambda) \qquad (2)$$

$$\psi \xleftarrow{U} \mathbb{F}_q^x, \qquad (3)$$

$N_t := n_t + u_t + w_t + z_t$ for $t = 0, \ldots, d+1$

For each $t$ of $t = 0, \ldots, d+1$, the processes (4) to (8) are executed.

$$param_{\mathbb{V}_t} := (q, \mathbb{V}_t, \mathbb{G}_T, \mathbb{A}_t, e) := \mathcal{G}_{dpvs}(1^\lambda, N_t, param_\mathbb{G}) \qquad (4)$$

$$X_t := (\chi_{t,i,j})_{i,j} \xleftarrow{U} GL(N_t, \mathbb{F}_q) \qquad (5)$$

$$(v_{t,i,j})_{i,j} := \psi \cdot (X_t^T)^{-1} \qquad (6)$$

$$b_{t,i} := (\chi_{t,i,1}, \ldots, \chi_{t,i,N_t})_{\mathbb{A}_t} = \sum_{j=1}^{N_t} \chi_{t,i,j} a_{t,j}, \qquad (7)$$

$$\mathbb{B}_t := (b_{t,1}, \ldots, b_{t,N_t})$$

$$b^*_{t,i} := (v_{t,i,1}, \ldots, v_{t,i,N_t})_{\mathbb{A}_t} = \sum_{j=1}^{N_t} v_{t,i,j} a_{t,j}, \qquad (8)$$

$$\mathbb{B}^*_t := (b^*_{t,1}, \ldots, b^*_{t,N_t})$$

$$g_T := e(g, g)^\psi \qquad (9)$$

$$param_{\vec{n}} := (\{param_{\mathbb{V}_t}\}_{t=0,\ldots,d+1}, g_T)$$

Namely, the master key generation part 110 executes the following processes.

(1) With the input device, the master key generation part 110 takes as input a security parameter λ ($1^\lambda$) and the attribute format $\vec{n} := ((d; n_t, u_t, w_t, z_t \ (t=0, \ldots, d+1))$, where d is an integer of 1 or more, and $n_t$ is 1 for t=0, an integer of 1 or more for each integer t=1, ..., d, and 2 for t=d+1. Each of $u_t$, $w_t$, and $z_t$ is an integer of 1 or more for each integer t=0, ..., d+1.

(2) With the processing device, the master key generation part 110 executes algorithm $G_{bpg}$ by taking as input the security parameter λ ($1^\lambda$) inputted in (1), and randomly generates the values of a parameter $param_G := (q, G, G_T, g, e)$ of the bilinear pairing group.

(3) With the processing device, the master key generation part 110 generates a random number ψ, and sets $n_t + u_t + w_t + z_t$ in $N_t$ for each integer t=0, ..., d+1.

Subsequently, the master key generation part 110 executes the processes of the following (4) to (8) for each integer t=0, ..., d+1.

(4) With the processing device, the master key generation part 110 executes algorithm $G_{dpvs}$ by taking as input the security parameter λ ($1^\lambda$) inputted in (1), $N_t$ set in (3), and the values of $param_G := (q, G, G_T, g, e)$ generated in (2), and generates the values of parameter $param_{V_t} := (q, V_t, G_T, A_t, e)$ of the dual pairing vector spaces.

(5) With the processing device, the master key generation part 110 takes as input $N_t$ set in (3), and $F_q$, and generates linear transformation $X_t := (\chi_{t,i,j})_{i,j}$ randomly. Note that GL stands for General Linear. Namely, GL is a general linear group, a set of square matrices in which the determinant is not 0, and a group with respect to multiplication. Note that $(\chi_{t,i,j})_{i,j}$ signifies a matrix concerning the suffixes i and j of the matrix $\chi_{t,i,j}$ where i, j=1, ..., $n_t$.

(6) With the processing device and based on the random number ψ and linear transformation $X_t$, the master key generation part 110 generates $(v_{t,i,j})_{i,j} := \psi \cdot (X_t^T)^{-1}$. As $(\chi_{t,i,j})_{i,j}$ does, $(v_{t,i,j})_{i,j}$ signifies a matrix concerning the suffixes i and j of the matrix $v_{t,i,j}$ where i, j=1, ..., $n_t$.

(7) With the processing device and based on the linear transformation $X_t$ generated in (5), the master key generation part 110 generates the basis $B_t$ from the canonical basis $A_t$ generated in (4).

(8) With the processing device and based on $(v_{t,i,j})_{i,j}$ generated in (6), the master key generation part 110 generates the basis $B^*_t$ from the canonical basis $A_t$ generated in (4).

(9) With the processing device, the master key generation part 110 sets $e(g, g)^\psi$ in $g_T$. The master key generation part 110 also sets $\{param_{V_t}\}_{t=0, \ldots, d+1}$ generated in (4), and $g_T$ in $param_{\vec{n}}$. Note that $g_T = e(b_{t,i}, b^*_{t,i})$ for each integer t=0, ..., d+1 and each integer i=1, ..., $N_t$.

In brief, in (S101), the master key generation part 110 executes the algorithm $G_{ob}$ indicated in Formula 131, and generates $param_{\vec{n}}$, and the bases $B_t$ and $B^*_t$ for each integer t=0, ..., d+1.

[Formula 131]
$$\mathcal{G}_{ob}(1^\lambda, \vec{n}) := (d; n_t, u_t, w_t, z_t)(t = 0, \ldots, d+1)):$$
$$param_G := (q, G, G_T, g, e) \xleftarrow{R} \mathcal{G}_{bpg}(1^\lambda),$$
$$\psi \xleftarrow{U} F_q^\times,$$
$$N_t := n_t + u_t + w_t + z_t \text{ for } t = 0, \ldots, d+1,$$
$$\text{For } t = 0, \ldots, d+1,$$
$$param_{V_t} :=$$
$$(q, V_t, G_T, A_t, e) := \mathcal{G}_{dpvs}(1^\lambda, N_t, param_G),$$

$$X_t := (\chi_{t,i,j})_{i,j} \xleftarrow{U} GL(N_t, F_q),$$
$$(v_{t,i,j})_{i,j} := \psi \cdot (X_t^T)^{-1},$$
$$b_{t,i} := (\chi_{t,i,1}, \ldots, \chi_{t,i,N_t})_{A_t} = \sum_{j=1}^{N_t} \chi_{t,i,j} a_{t,j},$$
$$B_t := (b_{t,1}, \ldots, b_{t,N_t}),$$
$$b^*_{t,i} := (v_{t,i,1}, \ldots, v_{t,i,N_t})_{A_t} = \sum_{j=1}^{N_t} v_{t,i,j} a_{t,j},$$
$$B^*_t := (b^*_{t,1}, \ldots, b^*_{t,N_t}),$$
$$g_T := e(g, g)^\psi,$$
$$param_{\vec{n}} := (\{param_{V_t}\}_{t=0, \ldots, d+1}, g_T)$$
$$\text{return } (param_{\vec{n}}, \{B_t, B^*_t\}_{t=0, \ldots, d+1}).$$

(S102: Hash Key Generation Step)
With the processing device, the master key generation part 110 calculates Formula 132, to generate a hash key hk randomly.

$$hk \xleftarrow{R} KH_\lambda \quad \text{[Formula 132]}$$

(S103: Public Parameter Generation Step)
With the processing device, the master key generation part 110 generates a subbasis $\hat{B}_0$ of the basis $B_0$, a subbasis $\hat{B}_t$ of the basis $B_t$ for each integer t=1, ..., d, and a subbasis $\hat{B}_{d+1}$ of the basis $B_{d+1}$, as indicated in Formula 133.

$$\hat{B}_0 := (b_{0,1}, b_{0,1+u_0+1}, \ldots, b_{0,1+u_0+w_0+z_0}),$$
$$\hat{B}_t := (b_{t,1}, \ldots, b_{t,n_t}, b_{t,n_t+w_t+1}, \ldots, b_{t,n_t+u_t+w_t+z_t}) t=1, \ldots, d,$$
$$\hat{B}_{d+1} := (b_{d+1,1}, b_{d+1,2}, b_{d+1,2+u_{d+1}+w_{d+1}+1}, \ldots, b_{d+1,2+u_{d+1}+w_{d+1}+z_{d+1}}) \quad \text{[Formula 133]}$$

With the processing device, the master key generation part 110 generates a subbasis $\hat{B}^*_t$ of the basis $B^*_t$ for each integer t=1, ..., d, and a subbasis $\hat{B}^*_{d+1}$ of the basis $B^*_{d+1}$, as indicated in Formula 134.

$$\hat{B}^*_t := (b^*_{t,1}, \ldots, b^*_{t,n_t}, b^*_{t,n_t+u_t+1}, \ldots, b^*_{t,n_t+u_t+w_t}),$$
$$\hat{B}^*_{d+1} := (b^*_{d+1,1}, b^*_{d+1,2}, b^*_{d+1,2+u_t+1}, \ldots, b^*_{d+1,2+u_t+w_t}) \quad \text{[Formula 134]}$$

The master key generation part 110 treats the generated subbases $\hat{B}_t$ (t=0, ..., d+1) and $\hat{B}^*_t$ (t=1, ..., d+1), the security parameter λ ($1^\lambda$) inputted in (S101), $param_{\vec{n}}$ generated in (S101), the hash key hk generated in (S102), and basis vectors $b^*_{0,1+u0+1}, \ldots, b^*_{0,1+u0+w0}$ (where u0 and w0 respectively represent $u_0$ and $w_0$) in combination, as the public parameter pk.

(S104: Master Key Generation Step)
The master key generation part 110 treats a basis vector $b^*_{0,1}$ of the basis $B^*_0$, as the master key sk.

(S105: Master Key Storing Step)
The master key storage part 120 stores the public parameter pk generated in (S103), in the storage device. The master key storage part 120 also stores the master key sk generated in (S104), in the storage device.

In brief, from (S101) through (S104), the key generation device 100 generates the public parameter pk and the master key sk by executing the Setup algorithm indicated in Formula 135. Then, in (S105), the key generation device 100 stores the generated public parameter pk and master key sk, in the storage device.

Note that the public parameter is publicized via, e.g., a network, so the signature device 200 and verification device 300 can acquire it.

$$\text{Setup}(1^\lambda, \vec{n} := (d; n_t, u_t, w_t, z_t)(t = 0, \ldots, d+1)) \quad \text{[Formula 135]}$$

$$hk \xleftarrow{R} KH_\lambda, n_0 := 1, n_{d+1} := 2,$$

$$(param_{\vec{n}}, \{\mathbb{B}_t, \mathbb{B}^*_t\}_{t=0,\ldots,d+1}) \xleftarrow{R} \mathcal{G}_{ob}(1^\lambda, \vec{n}),$$

$$\hat{\mathbb{B}}_t := (b_{t,1}, \ldots, b_{t,n_t}, b_{t,n_t+u_t+w_t+1}, \ldots, b_{t,n_t+u_t+w_t+z_t})$$

for $t = 0, \ldots, d+1,$ $$\hat{\mathbb{B}}^*_t := (b^*_{t,1}, \ldots, b^*_{t,n_t}, b^*_{t,n_t+u_t+1}, \ldots, b^*_{t,n_t+u_t+w_t})$$

for $t = 1, \ldots, d+1,$ $sk := b^*_{0,1},$ pk :=

$$\left(1^\lambda, hk, param_{\vec{n}}, \{\hat{\mathbb{B}}_t\}_{t=0,\ldots,d+1}, \{\hat{\mathbb{B}}^*_t\}_{t=1,\ldots,d+1},\right.$$

$$\left. b^*_{0,1+u_0+1}, \ldots, b^*_{0,1+u_0+w_0}\right).$$

return sk, pk.

The process of the KeyGen algorithm executed by the key generation device 100 will be described with reference to FIG. 10.

(S201: Information Input Step)

With the input device, the information input part 130 takes as input an attribute set $\Gamma := \{(t, \vec{x}_t := (x_{t,i}) (i=1, \ldots, n_t)) | 1 \le t \le d\}$. Note that t need not be all of the integers t within the range of $1 \le t \le d$, but may be at least one of integers t within the range of $1 \le t \le d$.

(S202: Random Number Generation Step)

With the processing device, the random number generation part 141 generates a random number $\delta$, and random numbers $\phi_0, \phi_{t,\iota}, \phi_{d+1,1,\iota}$, and $\phi_{d+1,2,\iota}$ (t=1, ..., d; $\iota$=1, ..., $w_t$), as indicated in Formula 136.

$$\delta \xleftarrow{U} \mathbb{F}^x_q, \quad \text{[Formula 136]}$$

$$\vec{\varphi}_0 := (\varphi_{0,1}, \ldots, \varphi_{0,w_0}) \xleftarrow{U} \mathbb{F}^{w_0}_q,$$

$$\vec{\varphi}_t := (\varphi_{t,1}, \ldots, \varphi_{t,w_t}) \xleftarrow{U} \mathbb{F}^{w_t}_q$$

for $t = 1, \ldots, d,$ $$\vec{\varphi}_{d+1,1} := (\varphi_{d+1,1,1}, \ldots, \varphi_{d+1,1,w_{d+1}}),$$

$$\vec{\varphi}_{d+1,2} := (\varphi_{d+1,2,1}, \ldots, \varphi_{d+1,2,w_{d+1}})$$

$$\xleftarrow{U} \mathbb{F}^{w_{d+1}}_q$$

(S203: Key Element 0 Generation Step)

With the processing device, the key element 0 generation part 142 generates a key element $k^*_0$, which is an element of the signing key $sk_\Gamma$, as indicated in Formula 137.

$$k^*_0 := (\delta, \overbrace{0^{u_0}}^{u_0}, \overbrace{\varphi_{0,1}, \ldots, \varphi_{0,w_0}}^{w_0}, \overbrace{0^{z_0}}^{z_0})\mathbb{B}^*_0 \quad \text{[Formula 137]}$$

As described above, for the bases B and B* indicated in Formula 113, Formula 114 is established. Hence, Formula 137 means that the coefficient for the basis vector of a basis $B^*_0$ is set as described below. For the purpose of simple representation, a basis vector $b^*_{0,i}$ is specified only by its i portion. For example, a basis vector 1 signifies a basis vector $V_{0,1}$. Basis vectors 1, . . . , 3 signify basis vectors $b^*_{0,1}, \ldots, V_{0,3}$, respectively.

The random number $\delta$ is set as the coefficient for the basis vector 1 of the basis $B^*_0$. 0 is set as the coefficient for basis vectors 1+1, . . . , 1+$u_0$. Random numbers $\phi_{0,1}, \ldots, \phi_{0,w0}$ (where w0 represents $w_0$) are each set as the coefficient for basis vectors 1+$u_0$+1, . . . , 1+$u_0$+$w_0$. 0 is set as the coefficient for basis vectors 1+$u_0$+$w_0$+1, . . . , 1+$u_0$+$w_0$+$z_0$.

(S204: Key Element t Generation Step)

With the processing device, the key element t generation part 143 generates a key element $k^*$, which is an element of the signing key $sk_\Gamma$, for each integer t of (t, $\vec{x}_t$) included in the attribute set $\Gamma$, as indicated in Formula 138.

$$k^*_t := (\overbrace{\delta(x_{t,1}, \ldots, x_{t,n_t})}^{n_t}, \overbrace{0^{u_t}}^{u_t}, \overbrace{\varphi_{t,1}, \ldots, \varphi_{t,w_t}}^{w_t}, \overbrace{0^{z_t}}^{z_t})\mathbb{B}^*_t \quad \text{[Formula 138]}$$

for $(t, \vec{x}_t) \in \Gamma$

More specifically, as Formula 137 does, Formula 138 means that the coefficient for the basis vector of a basis $B^*_t$ is set as described below. For the purpose of simple representation, a basis vector $b^*_{t,i}$ is specified only by its i portion. For example, a basis vector 1 signifies a basis vector $b^*_{t,1}$. Basis vectors 1, . . . , 3 signify basis vectors $b^*_{t,1}, \ldots, b^*_{t,3}$, respectively.

$\delta x_{t,1}, \ldots, \delta x_{t,nt}$ (where nt represents $n_t$) are each set as the coefficient for the basis vectors 1, . . . , $n_t$. 0 is set as the coefficient for basis vectors $n_t$+1, . . . , $n_t$+$u_t$. Random numbers $\phi_{t,\iota}, \ldots, \phi_{t,wt}$ (where wt represents $w_t$) are each set as the coefficient for basis vectors $n_t$+$u_t$+1, . . . , $n_t$+$u_t$+$w_t$. 0 is set as the coefficient for basis vectors $n_t$+$u_t$+$w_t$+1, . . . , $n_t$+$u_t$+$w_t$+$z_t$.

(S205: Key Element d+1 Generation Step)

With the processing device, the key element d+1 generation part 144 generates a key element $k^*_{d+1,1}$ and a key element $k^*_{d+1,2}$, which are elements of the signing key $sk_\Gamma$, as indicated in Formula 139.

$$k^*_{d+1,1} := \quad \text{[Formula 139]}$$

$$(\overbrace{\delta(1,0),}^{2} \overbrace{0^{u_{d+1}}}^{u_{d+1}}, \overbrace{\varphi_{d+1,1,1}, \ldots, \varphi_{d+1,1,w_{d+1}}}^{w_{d+1}}, \overbrace{0^{z_{d+1}}}^{z_{d+1}})\mathbb{B}^*_{d+1},$$

$$k^*_{d+1,2} := (\overbrace{\delta(0,1),}^{2} \overbrace{0^{u_{d+1}}}^{u_{d+1}}, \overbrace{\varphi_{d+1,2,1}, \ldots, \varphi_{d+1,2,w_{d+1}}}^{w_{d+1}}, \overbrace{0^{z_{d+1}}}^{z_{d+1}})\mathbb{B}^*_{d+1}$$

Namely, as Formula 137 does, Formula 139 means that the coefficient for the basis vector of the basis $B^*_{d+1}$ is set as described below. For the purpose of simple representation, a basis vector $b^*_{d+1,i}$ is specified only by its i portion. For example, a basis vector 1 signifies a basis vector $b^*_{d+1,1}$. Basis vectors 1, . . . , 3 signify basis vectors $b^*_{d+1,1}, \ldots, b^*_{d+1,3}$, respectively.

First, regarding the key element $k^*_{d+1,1}$, the random number δ is set as the coefficient for the basis vector 1. 0 is set as the coefficient for the basis vector 2. 0 is set as the coefficient for basis vectors 2+1, ..., $2+u_{d+1}$. Random numbers $\phi_{d+1,1,1}, \ldots, \phi_{d+1,1,wd+1}$ (where wd+1 represents $w_{d+1}$) are each set as the coefficient for basis vectors $2+u_{d+1}+1, \ldots, 2+u_{d+1}+w_{d+1}$. 0 is set as the coefficient for basis vectors $2+u_{d+1}+w_{d+1}+1, \ldots, 2+u_{d+1}+w_{d+1}+z_{d+1}$.

Regarding the key element $k^*_{d+1,2}$, 0 is set as the coefficient for the basis vector 1. The random number δ is set as the coefficient for the basis vector 2. 0 is set as the coefficient for basis vectors 2+1, ..., $2+u_{d+1}$. Random numbers $\theta_{d+1,2,1}, \ldots, \phi_{d+1,2,wd+1}$ (where wd+1 represents $w_{d+1}$) are each set as the coefficient for basis vectors $2+u_{d+1}+1, \ldots, 2+u_{d+1}+w_{d+1}$. 0 is set as the coefficient for basis vectors $2+u_{d+1}+w_{d+1}+1, \ldots, 2+u_{d+1}+w_{d+1}+z_{d+1}$.

(S206: Key Distribution Step)

For example, with the communication device, the key distribution part 150 distributes the signing key $sk_\Gamma$, constituted by, as elements, the attribute set Γ, the key element $k^*_0$, the key element $k^*_t$ (t in (t, $\vec{x}_t$) included in the attribute set Γ), the key element $k^*_{d+1,1}$, and the key element $k^*_{d+1,2}$, to the signature device 200 in secrecy via the network. As a matter of course, the signing key $sk_\Gamma$ may be distributed to the signature device 200 by another method.

In brief, from (S201) through (S205), the key generation device 100 generates the signing key $sk_\Gamma$ by executing the KeyGen algorithm indicated in Formula 140. In (S206), the key generation device 100 distributes the generated signing key $sk_\Gamma$ to the signature device 200.

[Formula 140]
$$KeyGen(pk, sk, \Gamma :=$$
$$\{(t, \vec{x}_t := (x_{t,1}, \cdots, x_{t,n_t}) \in \mathbb{F}_q^{n_t}) | 1 \le t \le d\})$$
$$\delta \xleftarrow{U} \mathbb{F}_q^x,$$
$$\vec{\varphi}_0 \xleftarrow{U} \mathbb{F}_q^{w_0},$$
$$\vec{\varphi}_t \xleftarrow{U} \mathbb{F}_q^{w_t}$$
for
$$t = 1, \ldots, d,$$
$$\vec{\varphi}_{d+1,1}, \vec{\varphi}_{d+1,2} \xleftarrow{U} \mathbb{F}_q^{w_{d+1}},$$
$$k_0^* := (\delta, \overbrace{0^{u_0}}^{u_0}, \overbrace{\varphi_{0,1}, \ldots, \varphi_{0,w_0}}^{w_0}, \overbrace{0^{z_0}}^{z_0})\mathbb{B}_0^*,$$
$$k_t^* := (\overbrace{\delta(x_{t,1}, \ldots, x_{t,n_t})}^{n_t}, \overbrace{0^{u_t}}^{u_t}, \overbrace{\varphi_{t,1}, \ldots, \varphi_{t,w_t}}^{w_t}, \overbrace{0^{z_t}}^{z_t})\mathbb{B}_t^*$$
for
$$(t, \vec{x}_t) \in \Gamma,$$
$$k_{d+1,1}^* := (\overbrace{\delta(1, 0)}^{2}, \overbrace{0^{u_{d+1}}}^{u_{d+1}},$$
$$\overbrace{\varphi_{d+1,1,1}, \ldots, \varphi_{d+1,1,w_{d+1}}}^{w_{d+1}}, \overbrace{0^{z_{d+1}}}^{z_{d+1}})\mathbb{B}_{d+1}^*,$$
$$k_{d+1,2}^* := (\overbrace{\delta(0, 1)}^{2}, \overbrace{0^{u_{d+1}}}^{u_{d+1}}, \overbrace{\varphi_{d+1,2,1}, \ldots, \varphi_{d+1,2,w_{d+1}}}^{w_{d+1}}, \overbrace{0^{z_{d+1}}}^{z_{d+1}})$$
$$\mathbb{B}_{d+1}^*,$$
$$T := \{0, (d+1, 1), (d+1, 2)\} \cup \{t \mid 1 \le t \le d, (t, \vec{x}_t) \in \Gamma\},$$
$$\text{return } sk_\Gamma := (\Gamma, \{k_t^*\}_{t \in T}).$$

The function and operation of the signature device 200 will be described.

As shown in FIG. 7, the signature device 200 is provided with a signing key acquisition part 210, an information input part 220 (second information input part), a span program calculation part 230, a complementary coefficient calculation part 240, a signature data generation part 250, and a signature data transmission part 260 (signature data output part).

The information input part 220 is provided with a predicate information input part 221 and a message input part 222. The signature data generation part 250 is provided with a random number generation part 251, a signature element 0 generation part 252, a signature element i generation part 253, and a signature element L+1 generation part 254.

The process of the Sig algorithm executed by the signature device 200 will be described with reference to FIG. 11.

(S301: Signing key Acquisition Step)

For example, with the communication device, the signing key acquisition part 210 acquires the signing key $sk_\Gamma$ generated by the key generation device 100, via the network. The signing key acquisition part 210 also acquires the public parameter pk generated by the key generation device 100.

(S302: Information Input Step)

With the input device, the predicate information input part 221 takes as input the access structure S:=(M, ρ). The matrix M is a matrix of L rows×r columns. L and r are each an integer of 1 or more.

With the input device, the message input part 220 takes as input the message m to be signed.

The matrix M of the access structure S is to be set depending on the condition of the system to be realized.

(S303: Span Program Calculation Step)

With the processing device, the span program calculation part 230 checks whether or not the access structure S inputted in (S302) accepts the attribute set Γ included in the signing key $sk_\Gamma$ acquired in (S301).

The method of checking whether or not the access structure accepts the attribute set is the same as that described in "3. Concept for Implementing Attribute-Based Signature Scheme".

The span program calculation part 230 advances the process to (S304) if the access structure S accepts the attribute set Γ (accept in S303). If the access structure S rejects the attribute set Γ (reject in S303), the span program calculation part 230 ends the process.

(S304: Complementary Coefficient Calculation Step)

With the processing device, the complementary coefficient calculation part 430 calculates I and a constant (complementary coefficient) $\alpha_i$ for each integer i included in I, which I and $\alpha_i$ satisfying Formula 141.

[Formula 141]
$$\Sigma_{i \in I} \alpha_i M_i := \vec{1}$$
and $I \subseteq \{i \in \{1, \ldots, L\} \mid$
$$[\rho(i) = (t, \vec{v}_i) \wedge (t, \vec{x}_t) \in \Gamma \wedge \vec{v}_i \cdot \vec{x}_t = 0] \vee$$
$$[\rho(i) = \neg(t, \vec{v}_i) \wedge (t, \vec{x}_t) \in \Gamma \wedge \vec{v}_i \cdot \vec{x}_t \ne 0]\},$$

Note that $M_i$ signifies the i-th row of the matrix M.

(S305: Random Number Generation Step)

With the processing device, the random number generation part 251 generates a random number ξ and a random number $\beta_i$ (i=1, ..., L), as indicated in Formula 142.

[Formula 142]
$$\xi \xleftarrow{U} \mathbb{F}_q^x,$$

-continued $$(\beta_i) \xleftarrow{U} \{(\beta_1, \ldots, \beta_L) \mid \sum_{i=1}^{L} \beta_i M_i = \vec{0}\}$$

(S306: Signature Element 0 Generation Step)

With the processing device, the signature element 0 generation part 252 generates $s^*_0$ which is an element of the signature data σ, as indicated in Formula 143.

$$s_0^* := \xi k_0^* + r_0^*$$ [Formula 143]

Note that $r^*_0$ is defined by Formula 144 (see Formulas 110 through 112 and their explanations).

$$r_0^* \xleftarrow{U} \text{span}\langle b^*_{0,1+u_0+1}, \ldots, b^*_{0,1+u_0+w_0}\rangle$$ [Formula 144]

(S307: Signature Element i Generation Step)

With the processing device, the signature element i generation part 253 generates a signature element $s^*_i$ which is an element of the signature data σ, for each integer i=1, . . . , L, as indicated in Formula 145.

$$s_i^* := \gamma_i \cdot \xi k_t^* + \Sigma_{t'=1}^{n_t} y_{i,t'} \cdot b_{t,t'}^* + r_i^* \text{ for } 1 \le i \le L$$ [Formula 145]

Note that $r^*_i$ is defined by Formula 146 (see Formulas 110 through 112 and their explanations).

$$r_i^* \xleftarrow{U} \text{span}\langle b^*_{t,n_t+u_t+1}, \ldots, b^*_{t,n_t+u_t+w_t}\rangle$$ [Formula 146]

Also, $\gamma_i$ and $\vec{y}_i := {}^t y_{1,i'} (i'=1, \ldots, n_t)$ are defined by Formula 147.

if $i \in I \land \rho(i) = (t, \vec{v}_i)$, [Formula 147]

$\gamma_i := \alpha_i, \vec{y}_i \xleftarrow{U} \{\vec{y}_i \mid \vec{y}_i \cdot \vec{v}_i = 0 \land y_{i,1} = \beta_i\}$, if $i \in I \land \rho(i) = \neg(t, \vec{v}_i)$, $\gamma_i := \frac{\alpha_i}{\vec{v}_i \cdot \vec{x}_t}, \vec{y}_i \xleftarrow{U} \{\vec{y}_i \mid \vec{y}_i \cdot \vec{v}_i = \beta_i\}$, if $i \notin I \land \rho(i) = (t, \vec{v}_i)$, $\gamma_i := 0, \vec{y}_i \xleftarrow{U} \{\vec{y}_i \mid \vec{y}_i \cdot \vec{v}_i = 0 \land y_{i,1} = \beta_i\}$, if $i \notin I \land \rho(i) = \neg(t, \vec{v}_i)$, $\gamma_i := 0, \vec{y}_i \xleftarrow{U} \{\vec{y}_i \mid \vec{y}_i \cdot \vec{v}_i = \beta_i\}$ (S308: Signature Element L+1 Generation Step)

With the processing device, the signature element L+1 generation part 254 generates a signature element $s^*_{L+1}$, which is an element of the signature data σ, as indicated in Formula 148.

$$s_{L+1}^* := \xi(k_{d+1,1}^* + H_{hk}^{\lambda,D}(m \| \mathbb{S}) \cdot k_{d+1,2}^*) + r_{L+1}^*$$ [Formula 148]

Note that $r^*_{L+1}$ is defined by Formula 149 (see Formulas 110 through 112 and their explanations).

$$r_{L+1}^* \xleftarrow{U} \text{span}\langle b^*_{d+1,2+u_{d+1}+1}, \ldots, b^*_{d+1,2+u_{d+1}+w_{d+1}}\rangle$$ [Formula 149]

(S309: Data Transmission Step)

For example, with the communication device, the signature data transmission part 260 transmits the signature data σ, including the signature element $s^*_0$, the signature element $s^*_i$ (i=1, . . . , L), the signature element $s^*_{L+1}$, the message m, and the access structure S:=(M, ρ), to the verification device 300 via the network. As a matter of course, the signature data σ may be transmitted to the verification device 300 by another method.

In brief, from (S301) through (S308), the signature device 200 generates the signature data σ by executing the Sig algorithm indicated in Formula 150. In (S309), the signature device 200 distributes the generated signature data σ to the verification device 300.

$Sig(\text{pk}, sk_\Gamma, m, \mathbb{S} := (M, \rho))$ [Formula 150]

If $\mathbb{S} := (M, \rho)$ accepts $\Gamma := \{(t, \vec{x}_t)\}$, then compute $I$ and $\{\alpha_i\}_{i \in I}$ such that $$\sum_{i \in I} \alpha_i M_i := \vec{1}$$

and $I \subseteq \{i \in \{1, \ldots, L\} \mid [\rho(i) = (t, \vec{v}_i) \land (t, \vec{x}_t) \in \Gamma \land \vec{v}_i \cdot \vec{x}_t = 0] \lor$ $[\rho(i) = \neg(t, \vec{v}_i) \land (t, \vec{x}_t) \in \Gamma \land \vec{v}_i \cdot \vec{x}_t \ne 0]\}$, $\xi \xleftarrow{U} \mathbb{F}_q^x$, $(\beta_i) \xleftarrow{U} \{(\beta_1, \ldots, \beta_L) \mid \sum_{i=1}^{L} \beta_i M_i = \vec{0}\}$, $s_0^* := \xi k_0^* + r_0^*$, where $r_0^* \xleftarrow{U} \text{span}\langle b^*_{0,1+u_0+1}, \ldots, b^*_{0,1+u_0+w_0}\rangle$, $s_i^* := \gamma_i \cdot \xi k_t^* + \sum_{t'=1}^{n_t} y_{i,t'} \cdot b_{t,t'}^* + r_i^*$, for $1 \le i \le L$, where $r_i^* \xleftarrow{U} \text{span}\langle b^*_{t,n_t+u_t+1}, \ldots, b^*_{t,n_t+u_t+w_t}\rangle$, and $\gamma_i, \vec{y}_i := (y_{i,1}, \ldots, y_{i,n_t})$ are defined as if $i \in I \land \rho(i) = (t, \vec{v}_i)$, $\gamma_i := \alpha_i, \vec{y}_i \xleftarrow{U} \{\vec{y}_i \mid \vec{y}_i \cdot \vec{v}_i = 0 \land y_{i,1} = \beta_i\}$, if $i \in I \land \rho(i) = \neg(t, \vec{v}_i)$, $\gamma_i := \frac{\alpha_i}{\vec{v}_i \cdot \vec{x}_t}$, $\vec{y}_i \xleftarrow{U} \{\vec{y}_i \mid \vec{y}_i \cdot \vec{v}_i = \beta_i\}$, if $i \notin I \land \rho(i) = (t, \vec{v}_i)$, $\gamma_i := 0$, $\vec{y}_i \xleftarrow{U} \{\vec{y}_i \mid \vec{y}_i \cdot \vec{v}_i = 0 \land y_{i,1} = \beta_i\}$, if $i \notin I \land \rho(i) = \neg(t, \vec{v}_i)$, $\gamma_i := 0$, $\vec{y}_i \xleftarrow{U} \{\vec{y}_i \mid \vec{y}_i \cdot \vec{v}_i = \beta_i\}$, -continued $$s^*_{L+1} := \xi(k^*_{d+1,1} + H^{\lambda,D}_{hk}(m\|\mathbb{S}) \cdot k^*_{d+1,2}) + r^*_{L+1},$$

where $$r^*_{L+1} \xleftarrow{U} \text{span}\langle b^*_{d+1,2+u_{d+1}+1}, \ldots, b^*_{d+1,2+u_{d+1}+w_{d+1}}\rangle,$$

$$\text{return } \vec{s}^* := (s^*_0, \ldots, s^*_{L+1}).$$

The function and operation of the verification device 300 will be described.

As shown in FIG. 8, the verification device 300 is provided with a public parameter acquisition part 310, a data reception part 320, a verification key generation part 330, and a pairing operation part 340.

The verification key generation part 330 is provided with a random number generation part 331, an f vector generation part 332, an s vector generation part 333, a verification element 0 generation part 334, a verification element i generation part 335, and a verification element L+1 generation part 336.

The process of the Ver algorithm executed by the verification device 300 will be described with reference to FIG. 12.

(S401: Public Parameter Acquisition Step)

For example, with the communication device, the public parameter acquisition part 310 acquires the public parameter pk generated by the key generation device 100, via the network.

(S402: Signature Data Reception Step)

For example, with the communication device, the data reception part 320 receives the signature data σ transmitted by the signature device 200, via the network.

(S403: f Vector Generation Step)

With the processing device, the f vector generation part 332 generates a vector $\vec{f}$ having r pieces of elements, randomly as indicated in Formula 151.

$$\vec{f} \xleftarrow{U} \mathbb{F}^r_q \qquad \text{[Formula 151]}$$

(S404: s Vector Generation Step)

With the processing device, the s vector generation part 333 generates a vector $\vec{s}^{\rightarrow T}$, based on the (L rows×r columns) matrix M of the access structure S included in the signature data σ received in (S402) and the vector $\vec{f}$ generated in (S403) and having r pieces of elements, as indicated in Formula 152.

$$\vec{s}^T := (s_1, \ldots, s_L)^T := M \cdot \vec{f}^T \qquad \text{[Formula 152]}$$

With the processing device, the s vector generation part 333 generates a value $s_0$, based on the vector $\vec{f}$ generated in (S403), as indicated in Formula 153. Note that $\vec{1}$ is a vector which has a value 1 in all its elements.

$$s_0 := \vec{1} \cdot \vec{f}^T \qquad \text{[Formula 153]}$$

(S405: Random Number Generation Step)

With the processing device, the random number generation part 331 generates a random number $\eta_{0,i}$ for each integer i=1, ..., $z_0$, a random number $\eta_{L+1,i}$ for each integer i=1, ..., $z_{d+1}$, a random number $\theta_{L+1}$, and a random number $s_{L+1}$, as indicated in Formula 154.

$$\vec{\eta}_0 := (\eta_{0,1}, \ldots, \eta_{0,z_0}) \xleftarrow{U} \mathbb{F}^{z_0}_q, \qquad \text{[Formula 154]}$$

$$\vec{\eta}_{L+1} := (\eta_{L+1,1}, \ldots, \eta_{L+1,z_{d+1}}) \xleftarrow{U} \mathbb{F}^{z_{d+1}}_q,$$

$$\theta_{L+1}, s_{L+1} \xleftarrow{U} \mathbb{F}_q$$

(S406: Verification Element 0 Generation Step)

With the processing device, the verification element 0 generation part 334 generates a verification element $c_0$, which is an element of the verification key, as indicated in Formula 155.

$$c_0 := (-s_0 - s_{L+1}, \overbrace{0^{u_0}}^{u_0}, \overbrace{0^{w_0}}^{w_0}, \overbrace{\eta_{0,1}, \ldots, \eta_{0,z_0}}^{z_0})\mathbb{B}_0 \qquad \text{[Formula 155]}$$

As described above, for the bases B and B* indicated in Formula 113, Formula 114 is established. Hence, Formula 155 means that the coefficient for the basis vector of the basis $B_0$ is set as described below. For the purpose of simple representation, a basis vector $b_{0,i}$ is specified only by its i portion. For example, a basis vector 1 signifies a basis vector $b_{0,1}$. Basis vectors 1, ..., 3 signify basis vectors $b_{0,1}$, ..., $b_{0,3}$, respectively.

$-s_0-s_{L+1}$ is set as the coefficient for the basis vector 1 of the basis $B_0$. 0 is set as the coefficient for basis vectors 1+1, ..., 1+$u_0$+$w_0$. Random numbers $\eta_{0,1}$, ..., $\eta_{0,z0}$ (where z0 represents $z_0$) are each set as the coefficient for basis vectors 1+$u_0$+$w_0$+1, ..., 1+$u_0$+$w_0$+$z_0$ (where z0 represents $z_0$).

(S407: Verification Element i Generation Step)

With the processing device, the verification element i generation part 335 generates a verification element which is an element of the verification key, for each integer i=1, ..., L, as indicated in Formula 156.

$$\text{if } \rho(i) = (t, \vec{v}_i := (v_{i,1}, \ldots, v_{i,n_t}) \in \mathbb{F}^{n_t}_q), \qquad \text{[Formula 156]}$$

$$\theta_i \xleftarrow{U} \mathbb{F}_q, \vec{\eta}_i := (\eta_{i,1}, \ldots, \eta_{i,z_t}) \xleftarrow{U} \mathbb{F}^{z_t}_q,$$

$$c_i := (\overbrace{s_i + \theta_i v_{i,1}, \theta_i v_{i,2}, \ldots, \theta_i v_{i,n_t}}^{n_t}, \overbrace{0^{u_t}}^{u_t}, \overbrace{0^{w_t}}^{w_t}, \overbrace{\eta_{i,1}, \ldots, \eta_{i,z_t}}^{z_t})\mathbb{B}_t,$$

$$\text{if } \rho(i) = \neg(t, \vec{v}_i := (v_{i,1}, \ldots, v_{i,n_t}) \in \mathbb{F}^{n_t}_q),$$

$$\vec{\eta}_i := (\eta_{i,1}, \ldots, \eta_{i,z_t}) \xleftarrow{U} \mathbb{F}^{z_t}_q,$$

$$c_i := (\overbrace{s_i(v_{i,1}, \ldots, v_{i,n_t})}^{n_t}, \overbrace{0^{u_t}}^{u_t}, \overbrace{0^{w_t}}^{w_t}, \overbrace{\eta_{i,1}, \ldots, \eta_{i,z_t}}^{z_t})\mathbb{B}_t$$

In brief, as Formula 155 does, Formula 156 means that the coefficient for the basis vector of the basis $B_t$ is set as described below. For the purpose of simple representation, a basis vector $b_{t,i}$ is specified only by its i portion. For example, a basis vector 1 signifies a basis vector $b_{t,1}$. Basis vectors 1, ..., 3 signify basis vectors $b_{t,1}$, ..., $b_{t,3}$, respectively.

When ρ(i) is a positive tuple (t, $\vec{v}_i$), $s_i + \theta_i v_{i,1}$ is set as the coefficient for the basis vector 1. $\theta_1 v_{t,2}$, ..., $\theta_i v_{i,nt}$ (where nt represents $n_t$) are each set as the coefficient for basis vectors 2, ..., $n_t$. 0 is set as the coefficient for basis vectors $n_t$+1, ..., $n_t$+$u_t$+$w_t$. $\eta_{i,1}$, ..., $\eta_{i,zt}$ (where zt represents $z_t$) are each set as the coefficient for basis vectors $n_t$+$u_t$+$w_t$+1, ..., $n_t$+$u_t$+$w_t$+$z_t$.

When ρ(i) is a negative tuple ¬(t, $\vec{v}_i$), $s_i v_{i,1}$, ..., $s_i v_{i,nt}$ (where nt represents $n_t$) are each set as the coefficient for the basis vectors $1, \ldots, n_t$. 0 is set as the coefficient for basis vectors $n_t+1, \ldots, n_t+u_t+w_t$. $\eta_{i,1}, \ldots, \eta_{i,zt}$ (where zt represents $z_t$) are each set as the coefficient for basis vectors $n_t+u_t+w_t+1, \ldots, n_t+u_t+w_t+z_t$.

Note that $\theta_i$ and $\eta_{i,i'}$ (i'=1, . . . , $z_t$) are uniform random numbers generated by the random number generation part 233.

(S408: Signature Element L+1 Generation Step)

With the processing device, the verification element L+1 generation part 336 generates a verification element $c_{L+1}$, which is an element of the verification key, as indicated in Formula 157.

$$c_{L+1} := (s_{L+1} - \theta_{L+1} H_{hk}^{\lambda,D}(m\|\mathbb{S}), \theta_{L+1},$$
$$\overbrace{0^{u_{d+1}}, 0^{w_{d+1}}}^{u_{d+1}, w_{d+1}}, \overbrace{\eta_{L+1,1}, \ldots, \eta_{L+1,z_{d+1}}}^{z_{d+1}}) \mathbb{B}_{d+1}$$

[Formula 157]

In brief, as Formula 155 does, Formula 157 means that the coefficient for the basis vector of the basis $\mathbb{B}_{d+1}$ is set as described below. For the purpose of simple representation, a basis vector $b_{d+1,i}$ is specified only by its i portion. For example, a basis vector 1 signifies a basis vector $b_{d+1,i}$. Basis vectors $1, \ldots, 3$ signify basis vectors $b_{d+1,1}, \ldots, b_{d+1,3}$, respectively.

$s_{L+1} - \theta_{L+1} \cdot H_{hk}^{\lambda,D}(m\|\mathbb{S})$ is set as the coefficient for the basis vector 1. $\delta_{L+1}$ is set as the coefficient for the basis vector 2. 0 is set as the coefficient for basis vectors $2+1, \ldots, 2+u_{d+1}+w_{d+1}$. Random numbers $\eta_{L+1,zd+1}$ (where zd+1 represents $z_{d+1}$) are each set as the coefficient for basis vectors $2+u_{d+1}+w_{d+1}+1, \ldots, 2+u_{d+1}+w_{d+1}+z_{d+1}$.

(S409: First Pairing Operation Step)

With the processing device, the pairing operation part 340 conducts a pairing operation $e(b_{0,1}, s^*_0)$.

If the calculation result of the pairing operation $e(b_{0,1}, s^*_0)$ is value 1, the pairing operation part 340 outputs value 0 indicating failure of the signature verification, and ends the process. If the calculation result of the pairing operation $e(b_{0,1}, s^*_0)$ is not value 1, the pairing operation part 340 advances the process to S410.

(S410: Second Pairing Operation Step)

With the processing device, the pairing operation part 340 conducts a pairing operation indicated in Formula 158.

$$\Pi_{i=0}^{L+1} e(c_i, s_i^*)$$ [Formula 158]

If the calculation result of the pairing operation indicated in Formula 158 is value 1, the pairing operation part 340 outputs value 1 indicating success of the signature verification; and otherwise value 0 indicating failure of the signature verification.

If the signature data σ is authentic, as the consequence of calculating Formula 158, value 1 is obtained, as indicated in Formula 159.

$$\Pi_{i=0}^{L+1} e(c_i, s_i^*) = e(c_0, k_0^*)^\xi \cdot \Pi_{i \in I} e(c_i, k_i^*)^{\gamma_i \xi} \cdot$$ [Formula 159]
$$= \Pi_{i=1}^{L} \Pi_{t=1}^{n_t} e(c_i, b_{t,i}^*)^{y_{i,t}} \cdot e(c_{L+1}, s_{L+1}^*)$$
$$= g_T^{\xi\delta(-s_0 - s_{L+1})} \cdot \Pi_{i \in I} g_T^{\xi\delta\alpha_i s_i} \Pi_{i=1}^{L} g_T^{\beta_i s_i} \cdot g_T^{\xi\delta s_{L+1}}$$
$$= g_T^{\xi\delta(-s_0 - s_{L+1})} \cdot g_T^{\xi\delta s_0} \cdot g_T^{\xi\delta s_{L+1}} = 1.$$

In brief, from (S401) through (S410), the verification device 300 verifies the signature data σ by executing the Ver algorithm indicated in Formula 160.

$$\text{Ver}(pk, m, \mathbb{S} := (M, \rho), \vec{s}^*)$$ [Formula 160]

$$\vec{f} \xleftarrow{U} \mathbb{F}_q^r, \vec{s}^T := (s_1, \ldots, s_L)^T := M \cdot \vec{f}^T,$$
$$s_0 := \vec{1} \cdot \vec{f}^T,$$
$$\vec{\eta}_0 \xleftarrow{U} \mathbb{F}_q^{z_0}, \eta_{L+1} \xleftarrow{U} \mathbb{F}_q^{z_{d+1}}, \theta_{L+1}, s_{L+1} \xleftarrow{U} \mathbb{F}_q,$$
$$c_0 := (-s_0 - s_{L+1}, \overbrace{0^{u_0}, 0^{w_0}}^{u_0, w_0},$$
$$\overbrace{\eta_{0,1}, \ldots, \eta_{0,z_0}}^{z_0}) \mathbb{B}_0,$$

for $1 \le i \le L$, if $\rho(i) = (t, \vec{v}_i := (v_{i,1}, \ldots, v_{i,n_t}) \in \mathbb{F}_q^{n_t})$, if $s_i^* \notin \mathbb{V}_t$ return 0, else $\theta_i \xleftarrow{U} \mathbb{F}_q, \vec{\eta}_i \xleftarrow{U} \mathbb{F}_q^{z_t}$, $$c_i := (\overbrace{s_i + \theta_i v_{i,1}, \theta_i v_{i,2}, \ldots, \theta_i v_{i,n_t}}^{n_t},$$
$$\overbrace{0^{u_t}, 0^{w_t}}^{u_t, w_t},$$
$$\overbrace{\eta_{i,1}, \ldots, \eta_{i,z_t}}^{z_t}) \mathbb{B}_t,$$

if $\rho(i) = \neg(t, \vec{v}_i := (v_{i,1}, \ldots, v_{i,n_t}) \in \mathbb{F}_q^{n_t})$, if $s_i^* \notin \mathbb{V}_t$ return 0, else $\vec{\eta}_i \xleftarrow{U} \mathbb{F}_q^{z_t}$, $$c_i := (\overbrace{s_i(v_{i,1}, \ldots, v_{i,n_t})}^{n_t}, \overbrace{0^{u_t}, 0^{w_t}}^{u_t, w_t},$$
$$\overbrace{\eta_{i,1}, \ldots, \eta_{i,z_t}}^{z_t}) \mathbb{B}_t,$$

$c_{L+1} :=$
$$(s_{L+1} - \theta_{L+1} H_{hk}^{\lambda,D}(m\|\mathbb{S}), \theta_{L+1}, \overbrace{0^{u_{d+1}}, 0^{w_{d+1}}}^{u_{d+1}, w_{d+1}},$$
$$\overbrace{\eta_{L+1,1}, \ldots, \eta_{L+1,z_{d+1}}}^{z_{d+1}}) \mathbb{B}_{d+1}$$

return 0 if $e(b_{0,1}, s_0^*) = 1$, return 1 if $\Pi_{i=0}^{L+1} e(c_i, s_i^*) = 1$, return 0 otherwise.

As described above, the signature processing system 10 according to Embodiment 1 implements the attribute-based signature scheme using the access structure S constructed using the span program, inner-product predicate, and secret distribution. In particular, as the signature processing system 10 according to Embodiment 1 uses a non-monotone span program, it implements an attribute-based signature scheme with a non-monotone predicate.

The attribute-based signature scheme implemented by the signature processing system 10 according to Embodiment 1 is highly secure and satisfies privacy requirements. Being highly secure signifies that the signature is not likely to be forged by others.

The pairing operation $e(b_{0,1}, s^*_0)$ in (S409) is to check that the signature data σ is not signature data generated without using the basis vector $b^*_{0,1}$ which is secret (which is the master key sk).

The pairing operation $e(b_{0,1}, s^*_0)$ is an operation to check whether the signature element $s^*_0$ includes the basis vector $b^*_{0,1}$, namely, whether a value other than 0 is set as the coefficient for the basis vector $b^*_{0,1}$. If pairing operation $e(b_{0,1}, s^*_0)=1$, then in the signature element $s^*_0$, 0 is set as the coefficient for the basis vector $b^*_{0,1}$, signifying that the signature data σ is signature data generated without using the basis vector $b^*_{0,1}$. Therefore, in this case, the signature data σ is determined as fake.

In the above description, the dimensions $u_t$, $w_t$, and $z_t$ (t=0, ..., d+1) are provided to enhance the security. Therefore, if $u_t$, $w_t$, and $z_t$ (t=0, ..., d+1) are each set to 0, the dimensions $u_t$, $w_t$, and $z_t$ (t=0, ..., d+1) need not be provided, although the security may be degraded.

In the above description, in (S101), $n_t+u_t+w_t+z_t$ is set in $N_t$. Alternatively, $n_t+u_t+w_t+z_t$ may be replaced by $n_t+n_t+n_t+1$, and $3n_t+1$ may be set in $N_t$. Note that $n_0$ is 1 and that $n_t$ (t=1, ..., d+1) is 2.

In this case, the Setup algorithm indicated in Formula 135 is rewritten as indicated in Formula 161. Note that $G_{ob}$ is written as indicated in Formula 162.

$$\text{Setup}(1^\lambda, \vec{n} := (d; 2, ..., 2)) \quad [\text{Formula 161}]$$

$$hk \xleftarrow{R} KH_\lambda, n_0 := 1, n_{d+1} := 2,$$

$$(param_{\vec{n}}, \{\mathbb{B}_t, \mathbb{B}^*_t\}_{t=0,...,d+1}) \xleftarrow{R} \mathcal{G}_{ob}(1^\lambda, \vec{n}),$$

$$\hat{\mathbb{B}}_0 := (b_{0,1}, b_{0,4}),$$

$$\hat{\mathbb{B}}_t := (b_{t,1}, b_{t,2}, b_{t,7}) \text{ for } t = 1, ..., d+1,$$

$$\hat{\mathbb{B}}^*_t := (b^*_{t,1}, b^*_{t,2}, b^*_{t,5}, b^*_{t,6}) \text{ for } t = 1, ..., d+1,$$

$$sk := b^*_{0,1},$$

$$pk := (1^\lambda, hk, param_{\vec{n}}, \{\hat{\mathbb{B}}_t\}_{t=0,...,d+1},$$

$$\{\hat{\mathbb{B}}^*_t\}_{t=1,...,d+1}, b^*_{0,3}).$$

return $sk, pk$.

$$\mathcal{G}_{ob}(1^\lambda, \vec{n} := (d; 2, ..., 2)): \quad [\text{Formula 162}]$$

$$param_\mathbb{G} := (q, \mathbb{G}, \mathbb{G}_T, g, e) \xleftarrow{R} \mathcal{G}_{bpg}(1^\lambda),$$

$$\psi \xleftarrow{U} \mathbb{F}^x_q,$$

$$n_0 := 1, n_{d+1} := 2,$$

$$N_t := 3n_t + 1 \text{ for } t = 0, ..., d+1,$$

For $t = 0, ..., d+1$, $$param_{\mathbb{V}_i} := (q, \mathbb{V}_t, \mathbb{G}_T, \mathbb{A}_t, e) :=$$

$$\mathcal{G}_{dpvs}(1^\lambda, N_t, param_\mathbb{G}),$$

$$X_t := (\chi_{t,i,j})_{i,j} \xleftarrow{U}$$

$$GL(N_t, \mathbb{F}_q)(v_{t,i,j})_{i,j} := \psi \cdot (X_t^T)^{-1},$$

$$b_{t,i} := (\chi_{t,i,1}, ..., \chi_{t,i,N_t})_{\mathbb{A}_t} = \Sigma^{N_t}_{j=1} \chi_{t,i,j} a_{t,j},$$

$$\mathbb{B}_t := (b_{t,1}, ..., b_{t,N_t}),$$

$$b^*_{t,i} := (v_{t,i,1}, ..., v_{t,i,N_t})_{\mathbb{A}_t} = \Sigma^{N_t}_{j=1} v_{t,i,j} a_{t,j},$$

$$\mathbb{B}^*_t := (b^*_{t,1}, ..., b^*_{t,N_t}),$$

$$g_T := e(g, g)^\psi$$

$$param_{\vec{n}} := (\{param_{\mathbb{V}_t}\}_{t=0,...,d+1}, g_T)$$

return $(param_{\vec{n}}, \{\mathbb{B}_t, \mathbb{B}^*_t\}_{t=0,...,d+1})$.

The KeyGen algorithm indicated in Formula 140 is rewritten as indicated in Formula 163.

$$\text{KeyGen}(pk, sk, \Gamma := \{(t, x_t) \mid 1 \le t \le d\}) \quad [\text{Formula 163}]$$

$$\delta \xleftarrow{U} \mathbb{F}^x_q,$$

$$\varphi_0, \varphi_{t,l}, \varphi_{d+1,1,t}, \varphi_{d+1,2,t} \xleftarrow{U} \mathbb{F}_q \text{ for } t = 1, ..., d; l = 1, 2$$

$$k^*_0 := (\delta, 0, \varphi_0, 0)_{\mathbb{B}^*_0},$$

$$k^*_t := (\overbrace{\delta(1, x_t)}^{2}, \overbrace{0, 0}^{2}, \overbrace{\varphi_{t,1}, \varphi_{t,2}}^{2}, \overbrace{0}^{1})_{\mathbb{B}^*_t} \text{ for } (t, x_t) \in \Gamma,$$

$$k^*_{d+1,1} := (\overbrace{\delta(1, 0)}^{2}, \overbrace{0, 0}^{2}, \overbrace{\varphi_{d+1,1,1}, \varphi_{d+1,1,2}}^{2}, \overbrace{0}^{1})_{\mathbb{B}^*_{d+1}},$$

$$k^*_{d+1,2} := (\overbrace{\delta(0, 1)}^{2}, \overbrace{0, 0}^{2}, \overbrace{\varphi_{d+1,2,1}, \varphi_{d+1,2,2}}^{2}, \overbrace{0}^{1})_{\mathbb{B}^*_{d+1}},$$

$$T := \{0, (d+1, 1), (d+1, 2)\} \cup$$

$$\{t \mid 1 \le t \le d, (t, x_t) \in \Gamma\},$$

return $sk_\Gamma := (\Gamma, \{k^*_t\}_{t \in T})$.

The Sig algorithm indicated in Formula 150 is rewritten as indicated in Formula 164.

$$\text{Sig}(pk, sk_\Gamma, m, \mathbb{S} := (M, \rho)) \quad [\text{Formula 164}]$$

If $\mathbb{S} := (M, \rho)$ accepts $\Gamma := \{(t, x_t)\}$, then compute $I$ and $\{\alpha_i\}_{i \in I}$ such that $$\Sigma_{i \in I} \alpha_i M_i := \vec{1}$$

and $I \subseteq \{i \in \{1, ..., L\} \mid [\rho(i) =$ $(t, v_i) \wedge (t, x_t) \in \Gamma \wedge v_i = x_t]$ $\vee [\rho(i) = \neg(t, v_i) \wedge (t, x_t) \in \Gamma \wedge v_i \ne x_t]\}$, $$\xi \xleftarrow{U} \mathbb{F}^x_q, (\beta_i) \xleftarrow{U} \{(\beta_1, ..., \beta_L) \mid \Sigma^L_{i=1} \beta_i M_i = \vec{0}\},$$

$$s^*_0 := \xi k^*_0 + r^*_0, \text{ where } r^*_0 \xleftarrow{U} \text{span} < b^*_{0,3} >,$$

$$s^*_i := \gamma_i \cdot \xi k^*_t + \Sigma^2_{i=1} y_{i,l} \cdot b^*_{t,l} + r^*_i, \text{ for } 1 \le i \le L,$$

where $r^*_i \xleftarrow{U} \text{span} < b^*_{t,5}, b^*_{t,6} >$, and $\gamma_i, \vec{y}_i := (y_{i,1}, y_{i,2})$ are defined as if $i \in I \wedge \rho(i) = (t, v_i), \gamma_i := \alpha_i, \vec{y}_i := \beta_i(1, v_i),$ if $i \in I \wedge \rho(i) = \neg(t, v_i), \gamma_i := \dfrac{\alpha_i}{v_i - x_t},$ $$\vec{y}_i := \dfrac{\beta_i}{v_i - y_i}(1, y_i) \quad (y_i \xleftarrow{U} \mathbb{F}_q \setminus \{v_i\}),$$

if $i \notin I \wedge \rho(i) = (t, v_i), \gamma_i := 0, \vec{y}_i := \beta_i(1, v_i),$ if $i \notin I \wedge \rho(i) = \neg(t, v_i), \gamma_i := 0,$ $$\vec{y}_i := \dfrac{\beta_i}{v_i - y_i}(1, y_i) \quad (y_i \xleftarrow{U} \mathbb{F}_q \setminus \{v_i\}),$$

$$s^*_{L+1} := \xi(k^*_{d+1,1} + H^{\lambda,D}_{hk}(m \| \mathbb{S}) \cdot k^*_{d+1,2}) + r^*_{L+1},$$

where $r^*_{L+1} \xleftarrow{U} \text{span} < b^*_{d+1,5}, b^*_{d+1,6} >$, return $\vec{s}^* := (s^*_0, ..., s^*_{L+1})$.

The Ver algorithm indicated in Formula 159 is rewritten as indicated in Formula 165.

$$\text{Ver}(pk, m, \mathbb{S} := (M, \rho), \vec{s}^*) \quad [\text{Formula 165}]$$

$$\vec{f} \xleftarrow{U} \mathbb{F}^r_q, \vec{s}^T := (s_1, ..., s_L)^T := M \cdot \vec{f}^T,$$

$$s_0 := \vec{1} \cdot \vec{f}^T,$$

-continued $\eta_0, \eta_{L+1}, \theta_{L+1}, s_{L+1} \xleftarrow{U} \mathbb{F}_q,$ $c_0 := (-s_0 - s_{L+1}, 0, 0, \eta_0)_{\mathbb{B}_0},$ for $1 \le i \le L$, if $\rho(i) = (t, v_i)$, return 0 if $s_i^* \notin \mathbb{V}_t$, else $\theta_i, \eta_i \xleftarrow{U} \mathbb{F}_q$, $c_i := (\overbrace{s_i + \theta_i v_i, -\theta_i}^{2}, \overbrace{0, 0, 0, 0}^{2}, \overbrace{\frac{1}{\eta_i}}^{1})_{\mathbb{B}_t},$ if $\rho(i) = \neg(t, v_i)$, return 0 if $s_i \notin \mathbb{V}_t$, else $\eta_i \xleftarrow{U} \mathbb{F}_q$, $c_i := (\overbrace{s_i(v_i, -1)}^{2}, \overbrace{0, 0, 0, 0}^{2}, \overbrace{\frac{1}{\eta_i}}^{1})_{\mathbb{B}_t},$ $c_{L+1} :=$ $(\overbrace{s_{L+1} - \theta_{L+1} H_{hk}^{\lambda,D}(m\|\mathbb{S}), \theta_{L+1}}^{2},$ $\overbrace{0, 0}^{2}, \overbrace{0, 0}^{2}, \overbrace{\frac{1}{\eta_{L+1}}}^{1})_{\mathbb{B}_{d+1}}$ return 0 if $e(b_{0,1}, s_0^*) = 1$, return 1 if $\Pi_{i=0}^{L+1} e(c_i, s_i^*) = 1$, return 0 otherwise.

The Setup algorithm may be executed only once at the setup of the signature processing system 10, and need not be executed every time a signing key is to be generated. In the above description, the Setup algorithm and the KeyGen. algorithm are executed by the key generation device 100. Alternatively, the Setup algorithm and the KeyGen algorithm may be executed by different devices.

Embodiment 2

This embodiment describes the "decentralized multi-authority attribute-based signature scheme".

First, the notion "decentralized multi-authority" will be explained.

Second, the "decentralized multi-authority attribute-based signature scheme" according to this embodiment will be explained. Initially, the basic structure of the "decentralized multi-authority attribute-based signature scheme" will be explained. Then, the basic structure of the "signature processing system 10" which implements the "decentralized multi-authority attribute-based signature scheme" will be explained. After that, the "decentralized multi-authority attribute-based signature scheme" and the "signature processing system 10" according to this embodiment will be explained in detail.

<1. The Notion of Decentralized Multi-Authority>

Initially, the "multi-authority" will be explained. Multi-authority signifies the presence of a plurality of authorities who generate the signing key.

In a general signature processing system, the security of the whole system depends on one certain party (authority). For example, in the signature processing system 10 described in Embodiment 1, the security of the whole system depends on the key generation device 100 which generates the master key sk. If the security of the key generation device 100 is breached or the master key sk leaks, the whole signature processing system 10 no longer functions.

With the multi-authority scheme, however, even if the security of some authority is breached or the secret key (master key) of some authority leaks, only part of the signature processing system stops functioning, and the remaining portion of the system can function normally.

Figure 13:
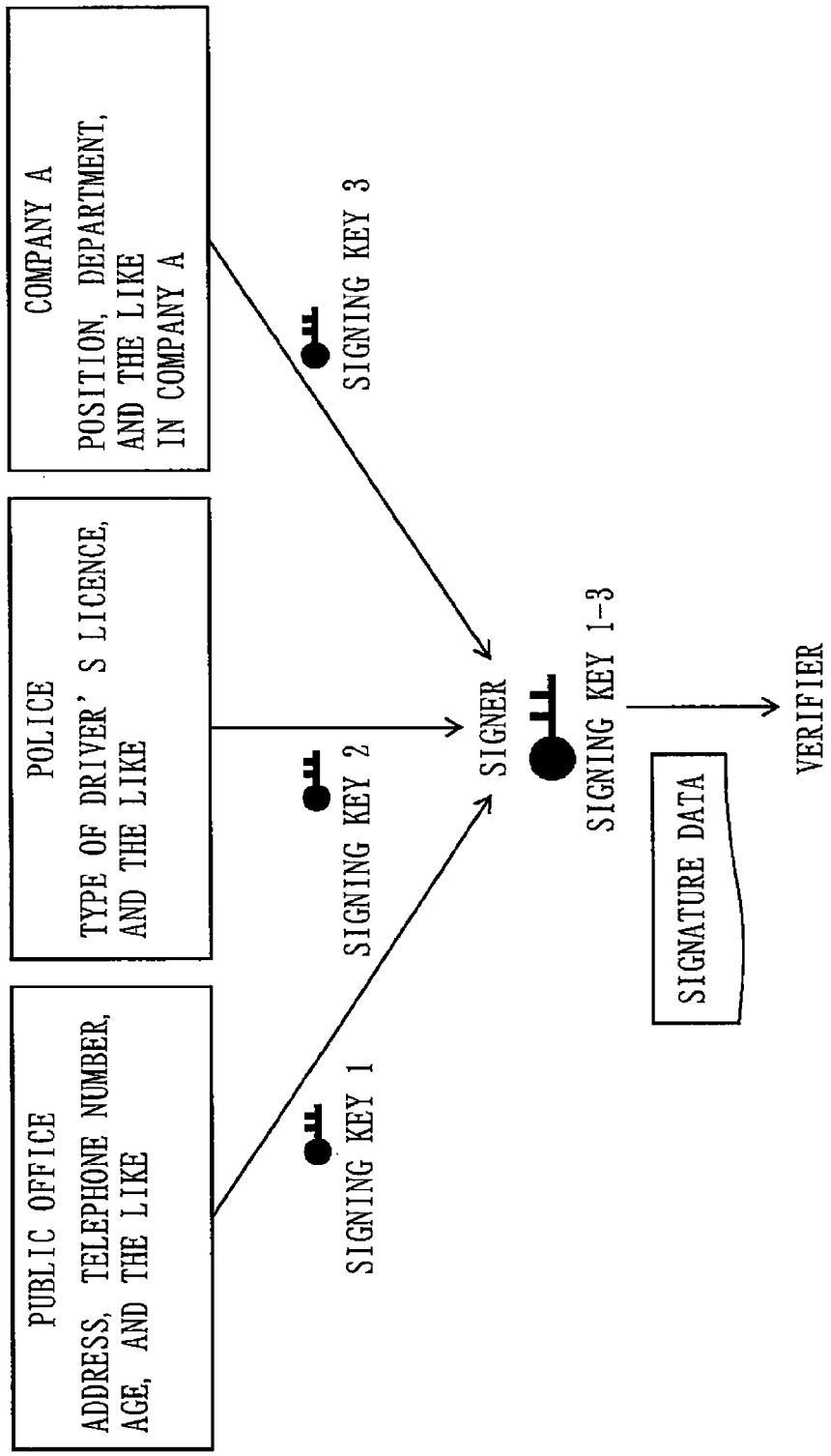
FIG. 13 is an explanatory drawing of multi-authority.

FIG. 13 is an explanatory drawing of the multi-authority.

In FIG. 13, a public office manages attributes such as the address, telephone number, and age. The police manage attributes such as the type of the driver's license. A company A manages attributes such as the position in the company A and the belonging department in the company A. A signing key 1 to indicate the attributes managed by the public office is issued by the public office. A signing key 2 to indicate the attributes managed by the police is issued by the police. A signing key 3 to indicate the attributes managed by the company A is issued by the company A.

The signer who signs generates signature data using a signing key formed by putting together the signing keys 1, 2, and 3 issued by the respective authorities such as the public office, the police, and the company A. Namely, when seen from the signer, a signing key formed by putting together the signing keys issued by the respective authorities is the single signing key issued to himself or herself.

For example, in a case where the master key of the company A leaks, although the signature processing system does not function regarding the attributes on the company A, it functions regarding the attributes managed by the other authorities. Namely, if the signature data is verified, although the attributes managed by the company A cannot be trusted, the other attributes can be trusted.

As is seen from the example of FIG. 13, according to the attribute-based signature, it is normal that a plurality of authorities are present, and that each authority manages a certain category (subspace) or definition range in the attributes and issues (a part of) a signing key regarding the attribute of the user in this category.

The notion "decentralized" will be explained. Being decentralized means that any party can serve as an authority and issue (a part of) the signing key without interacting with the other parties, and that each user can acquire (a part of) the signing key without interacting with the other parties.

For example, if a central authority exists, the system is not decentralized. A central authority is an authority superior to the other authorities. If the security of the central authority is breached, the security of every authority will be breached.

<2. Structure of Decentralized Multi-Authority Attribute-Based Signature Scheme>

<2-1. Basic Structure of Decentralized Multi-Authority Attribute-Based Signature Scheme>

A decentralized multi-authority attribute-based signature scheme consists of five algorithms: GSetup, ASetup, AttrGen, Sig, and Ver.

(GSetup)

A GSetup algorithm is a randomized algorithm that takes as input a security parameter $\lambda$ and outputs a public parameter gparam.

(ASetup)

An ASetup algorithm is a randomized algorithm that takes as input the public parameter gparam and authority identification information t, and outputs an authority secret key $ask_t$ and an authority public parameter $apk_t$.

(AttrGen)

An AttrGen algorithm is a randomized algorithm that takes as input the public parameter gparam, the authority identification information t, the authority secret key $ask_t$, user identification information gid, and an attribute $\vec{x}_t := (x_{i,j})$ ($i=1, \ldots, n_t) \in \mathbb{F}_q$, and outputs a signing key $usk_{gid(t,xt)}$.

(Sig)

A Sig algorithm is a randomized algorithm that takes as input the public parameter gparam, the signing key $usk_{gid,(t,xt)}$, a message m, and an access structure S:=(M, ρ), and outputs signature data σ including: a signature $\vec{s}^*$; the message m; and the access structure S.

(Ver)

A Ver algorithm is an algorithm that takes as input the signature data σ, the public parameter gparam, and the authority public parameter $apk_t$, and outputs Boolean value 1 (accept) or 0 (reject).

<2-2 Signature Processing System 10>

A signature processing system 10 that executes the algorithms of the decentralized multi-authority signature-based signature scheme described above will be described.

Figure 14:
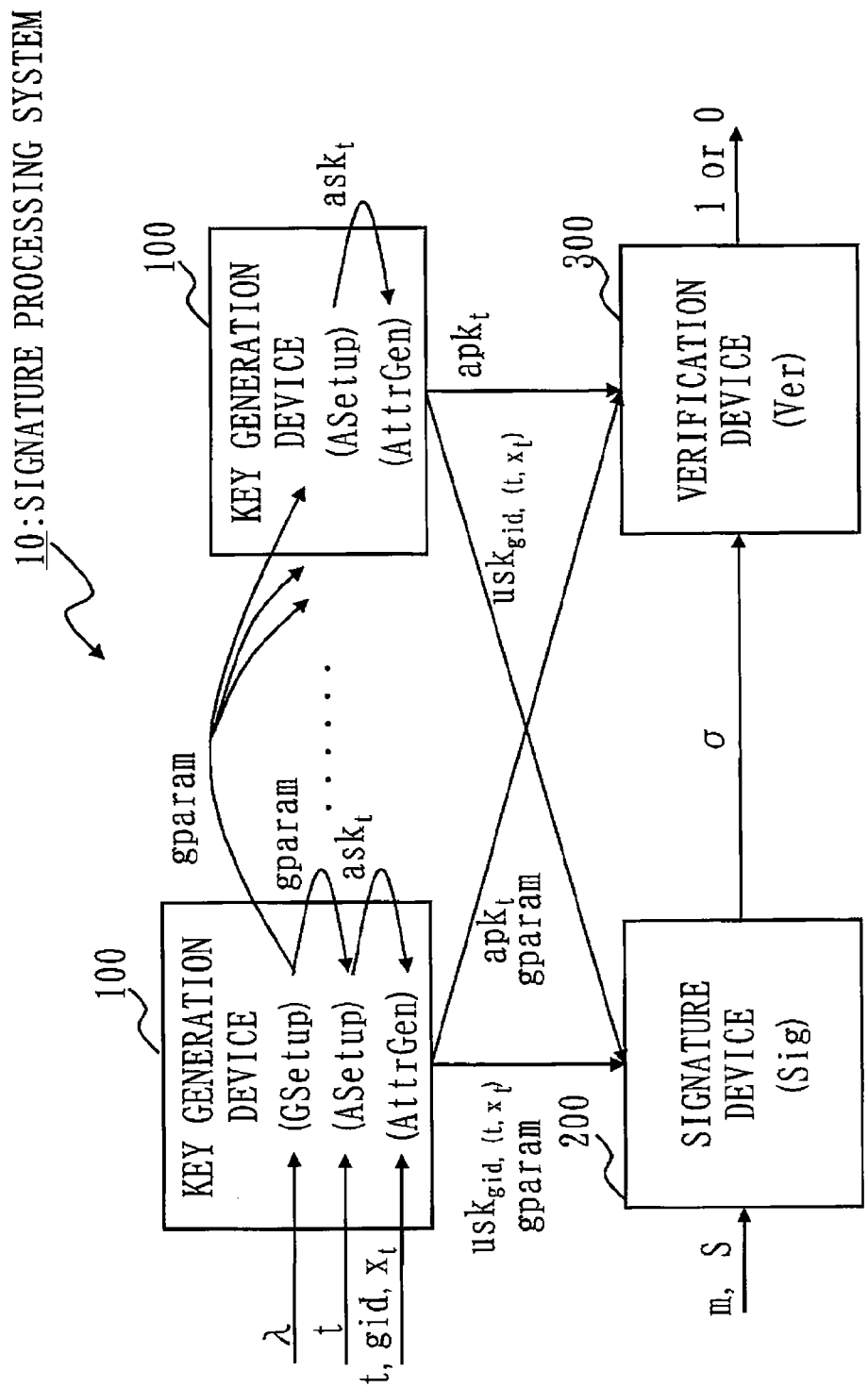
FIG. 14 is a configuration diagram of a signature processing system 10 which executes a decentralized multi-authority attribute-based signature scheme.

FIG. 14 is a configuration diagram of the signature processing system 10 which executes the algorithms of the decentralized multi-authority attribute-based signature scheme.

The signature processing system 10 is provided with a plurality of key generation devices 100, a signature device 200, and a verification device 300.

One (single) key generation device 100 executes the GSetup algorithm by taking as input the security parameter λ, and generates the public parameter gparam. This key generation device 100 publicizes the generated public parameter gparam.

Each key generation device 100 executes the ASetup algorithm by taking as input the public parameter gparam and the authority identification information t assigned to this key generation device 100, and generates the authority secret key $ask_t$ and the authority public parameter $apk_t$. Each key generation device 100 executes the AttrGen algorithm by taking as input the public parameter gparam, the authority identification information t assigned to this key generation device 100, the authority secret key $ask_t$, the user identification information gid, and the attribute $\vec{x}_t:=(x_{t,i})$ (i=1, ..., $n_t$)∈$F_q$, and generates the signing key $usk_{gid,(t,xt)}$ and distributes it to the signature device 200 in secrecy.

The signature device 200 executes the Sig algorithm by taking as input the public parameter gparam, the signing key $usk_{gid,(t,xt)}$, the message in, and the access structure S:=(M, ρ), and generates the signature data σ including: the signature $\vec{s}^*$; the message m; and the access structure S. The signature device 200 transmits the generated signature data σ to the verification device 300.

The verification device 300 executes the Ver algorithm by taking as input the signature data σ, the public parameter gparam, and the authority public parameter $apk_t$, and outputs Boolean value 1 (accept) or 0 (reject).

<2-3. Decentralized Multi-Authority Attribute-Based Signature Scheme and Signature Processing System 10 in Detail>

The decentralized multi-authority attribute-based signature scheme, and the function and operation of the signature processing system 10 which executes the decentralized multi-authority attribute-based signature scheme will be described with reference to FIGS. 15 to 22.

Figure 15:
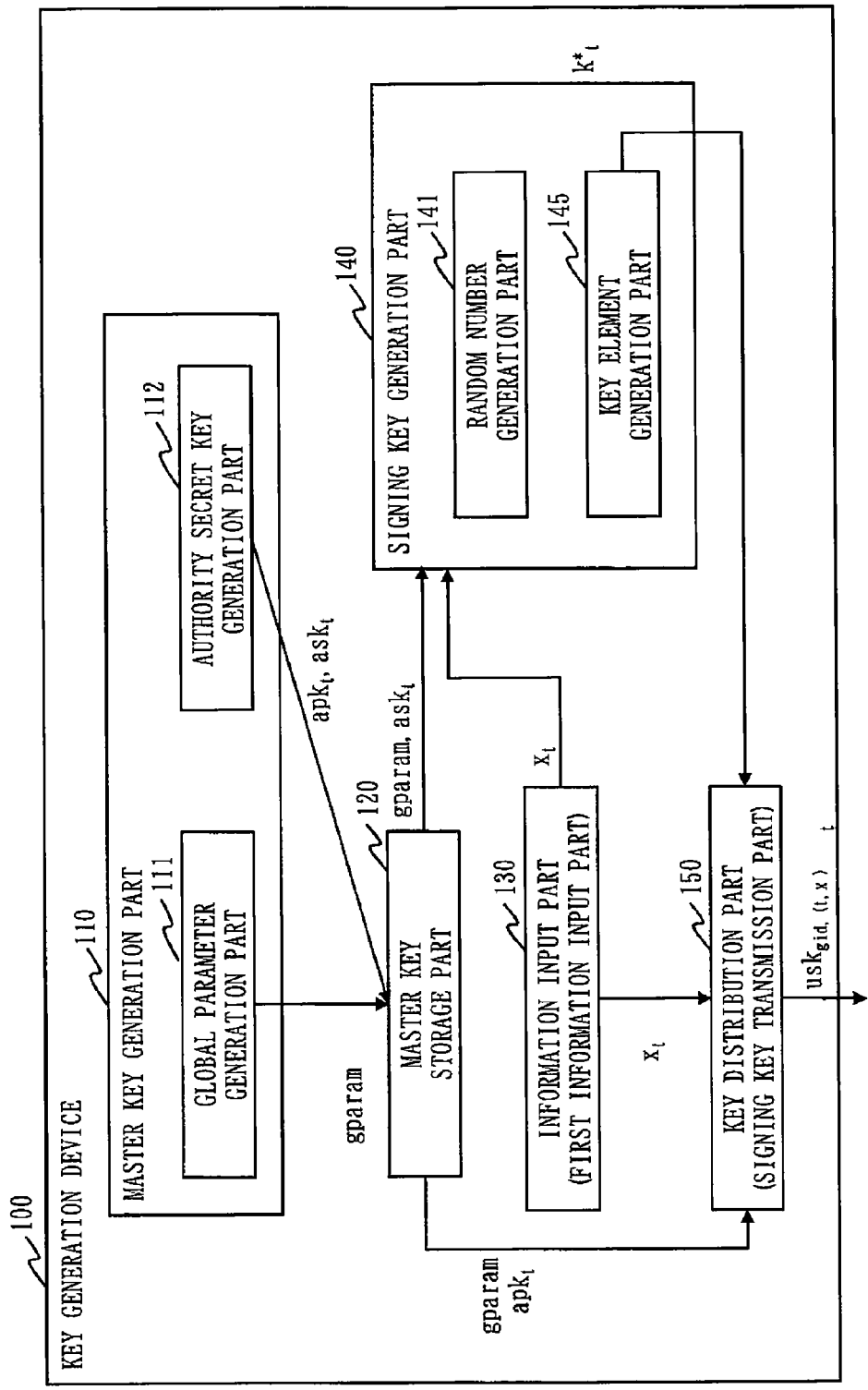
FIG. 15 is a function block diagram showing a function of each key generation device 100.
Figure 16:
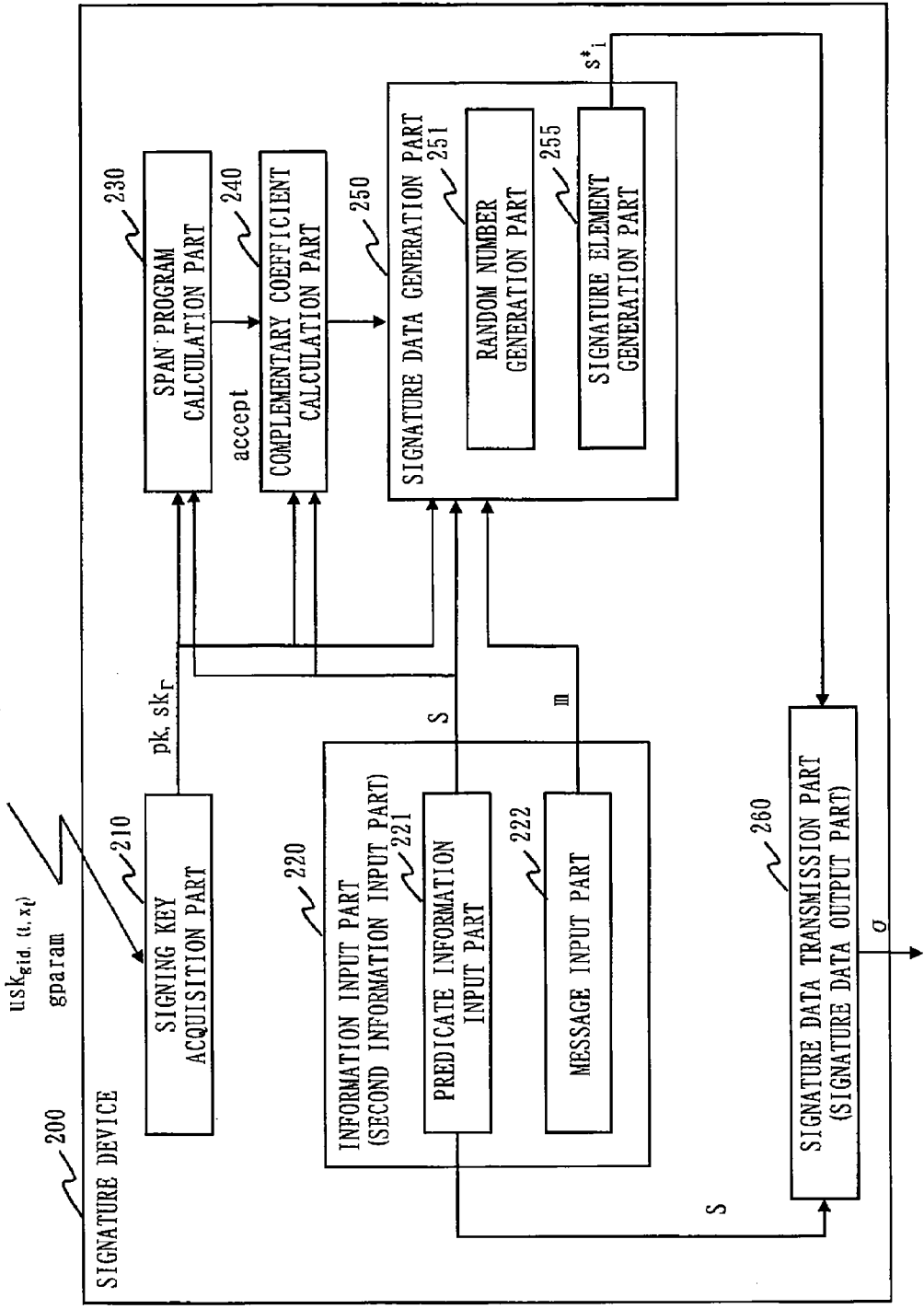
FIG. 16 is a function block diagram showing a function of a signature device 200.
Figure 17:
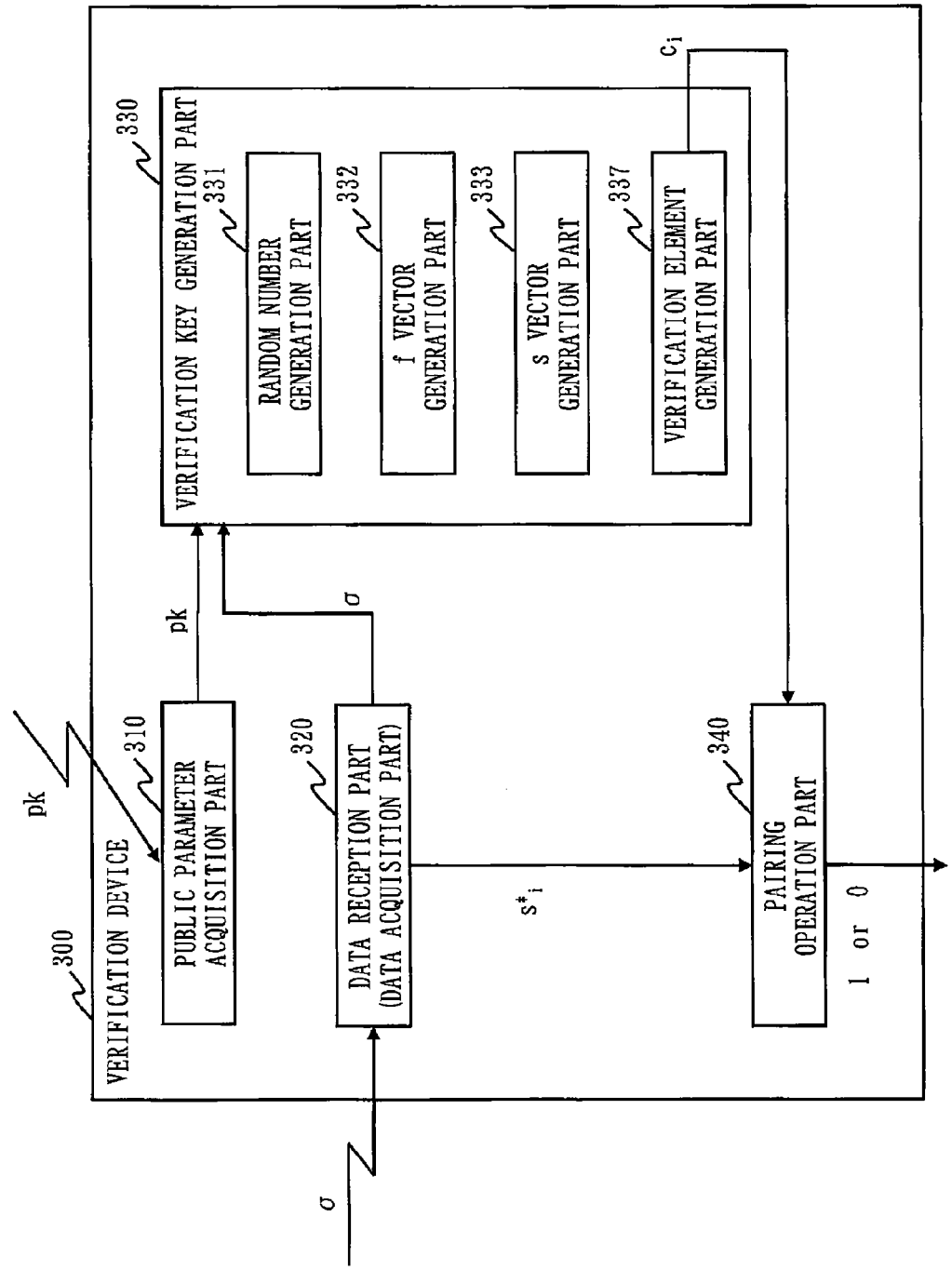
FIG. 17 is a function block diagram showing the function of a verification device 300.

FIG. 15 is a function block diagram showing the function of each key generation device 100. FIG. 16 is a function block diagram showing the function of the signature device 200. FIG. 17 is a function block diagram showing the function of the verification device 300.

Figure 18:
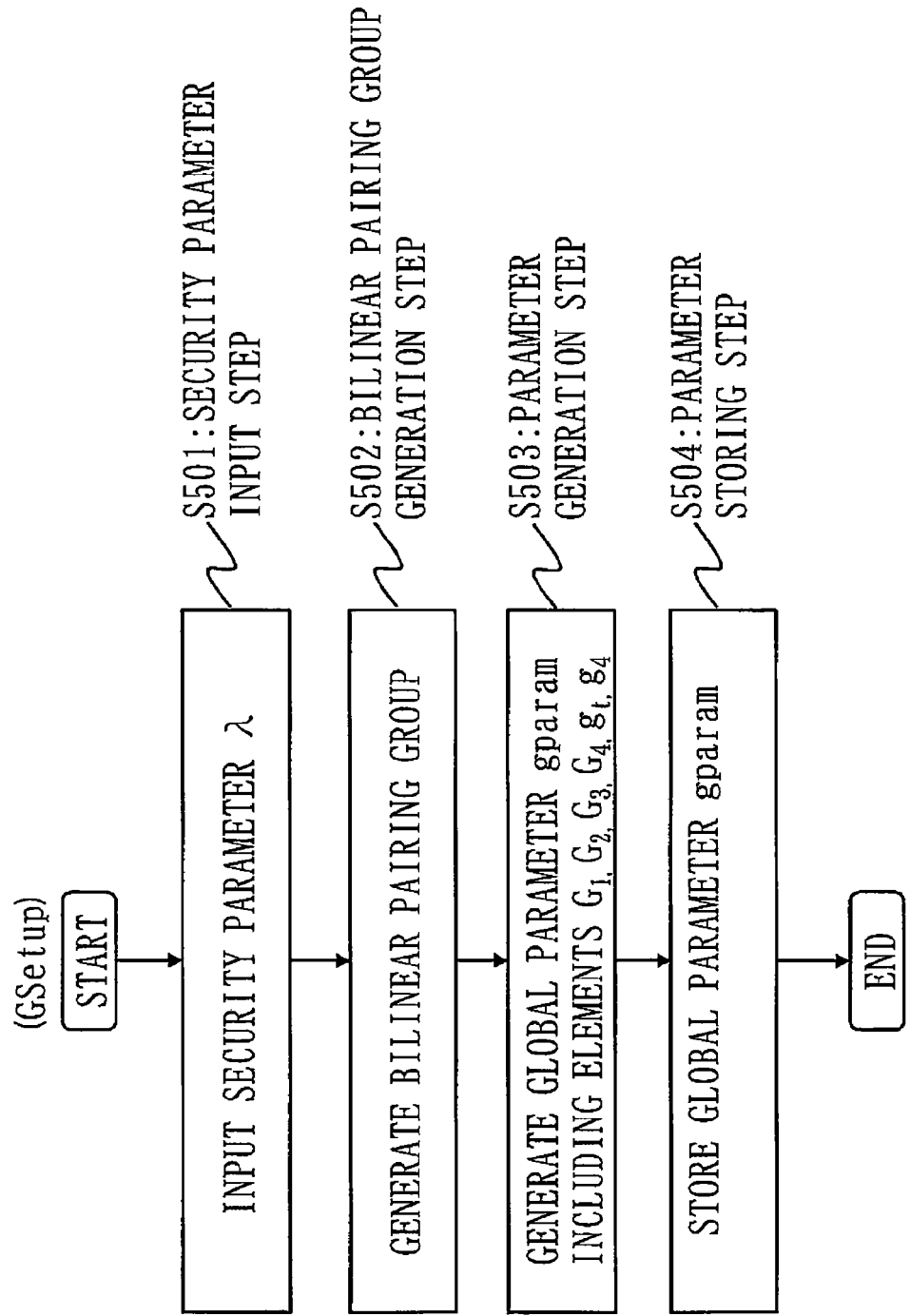
FIG. 18 is a flowchart showing the process of GSetup algorithm.
Figure 19:
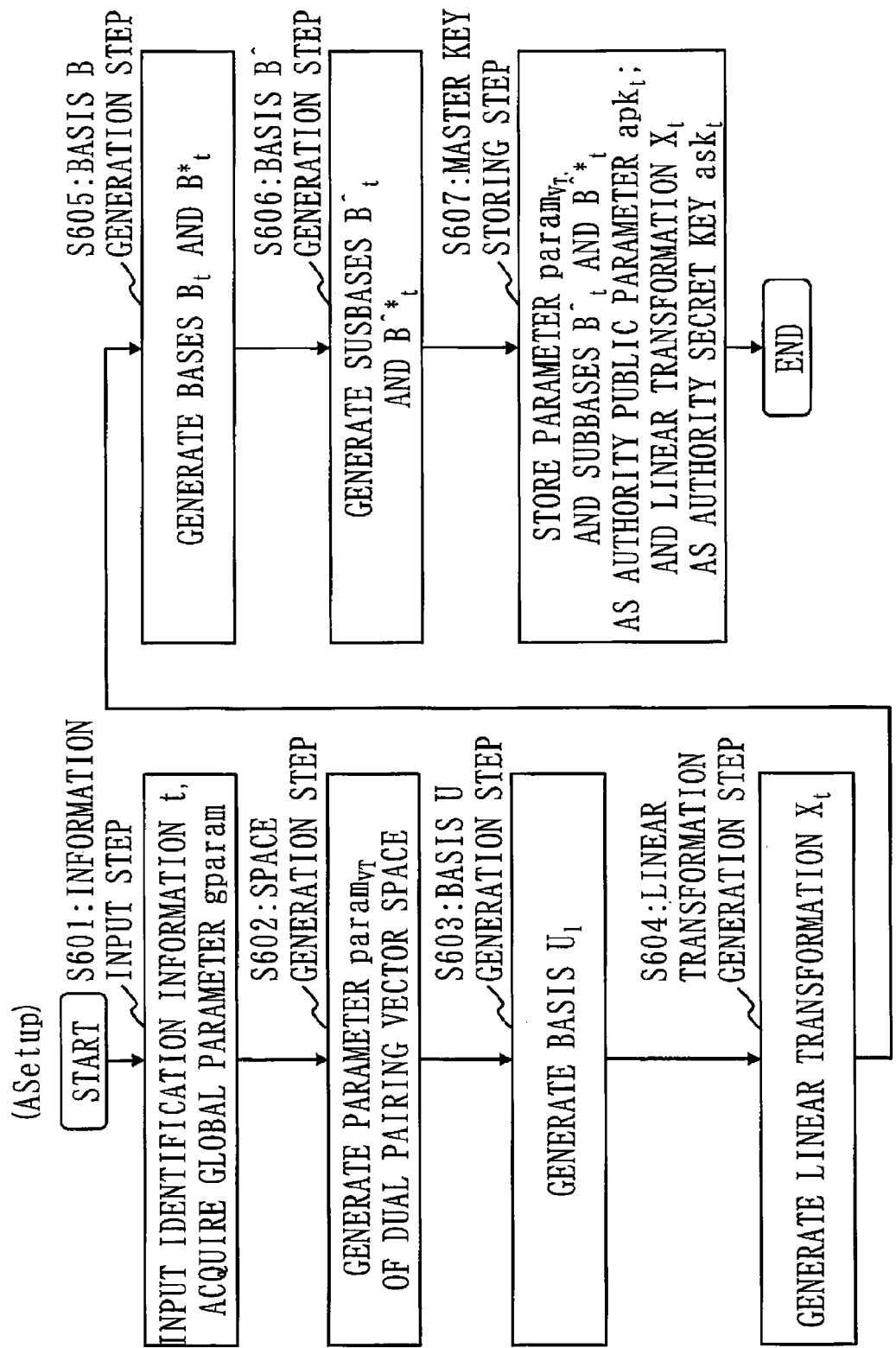
FIG. 19 is a flowchart showing the process of ASetup algorithm.
Figure 20:
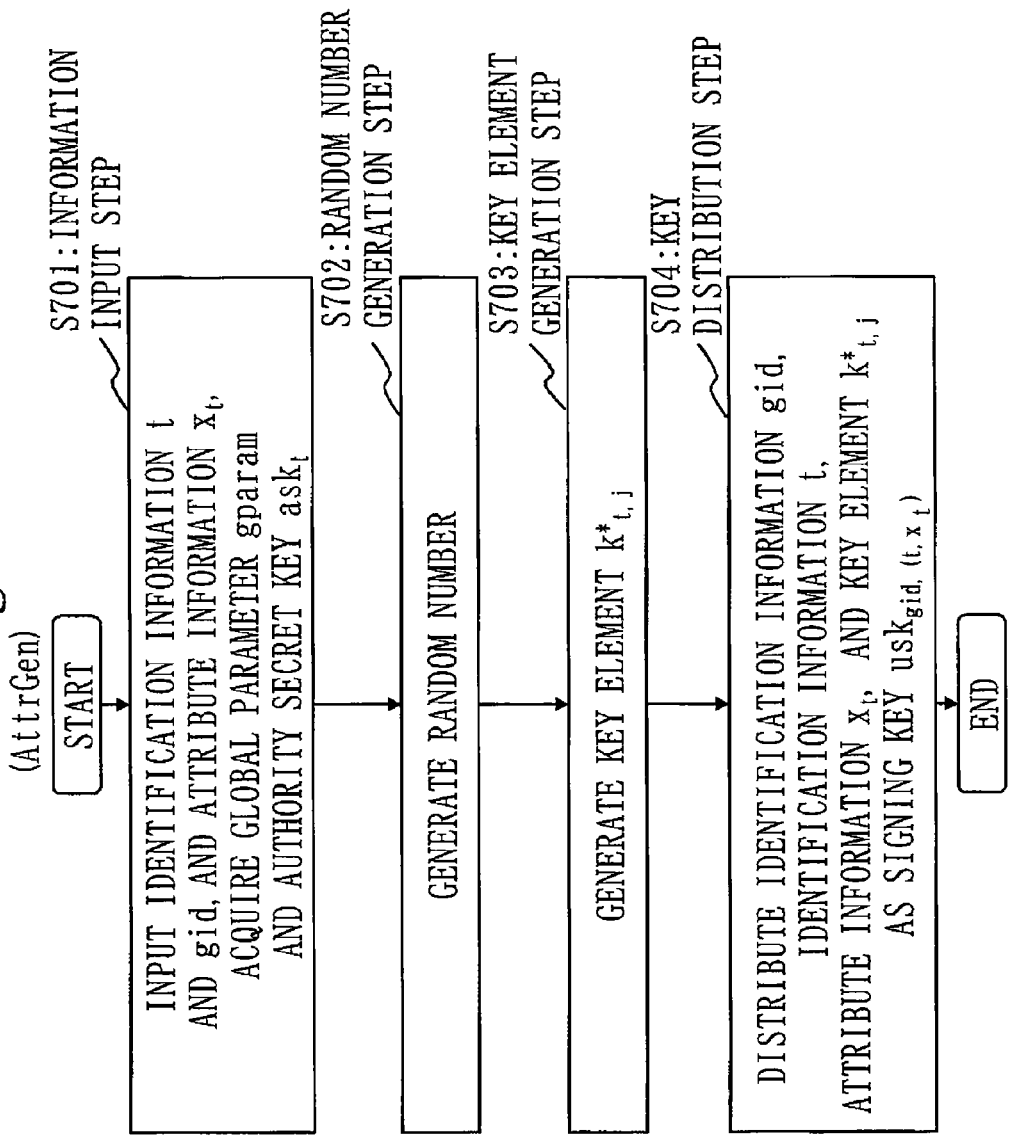
FIG. 20 is a flowchart showing the process of AttrGen algorithm.
Figure 21:
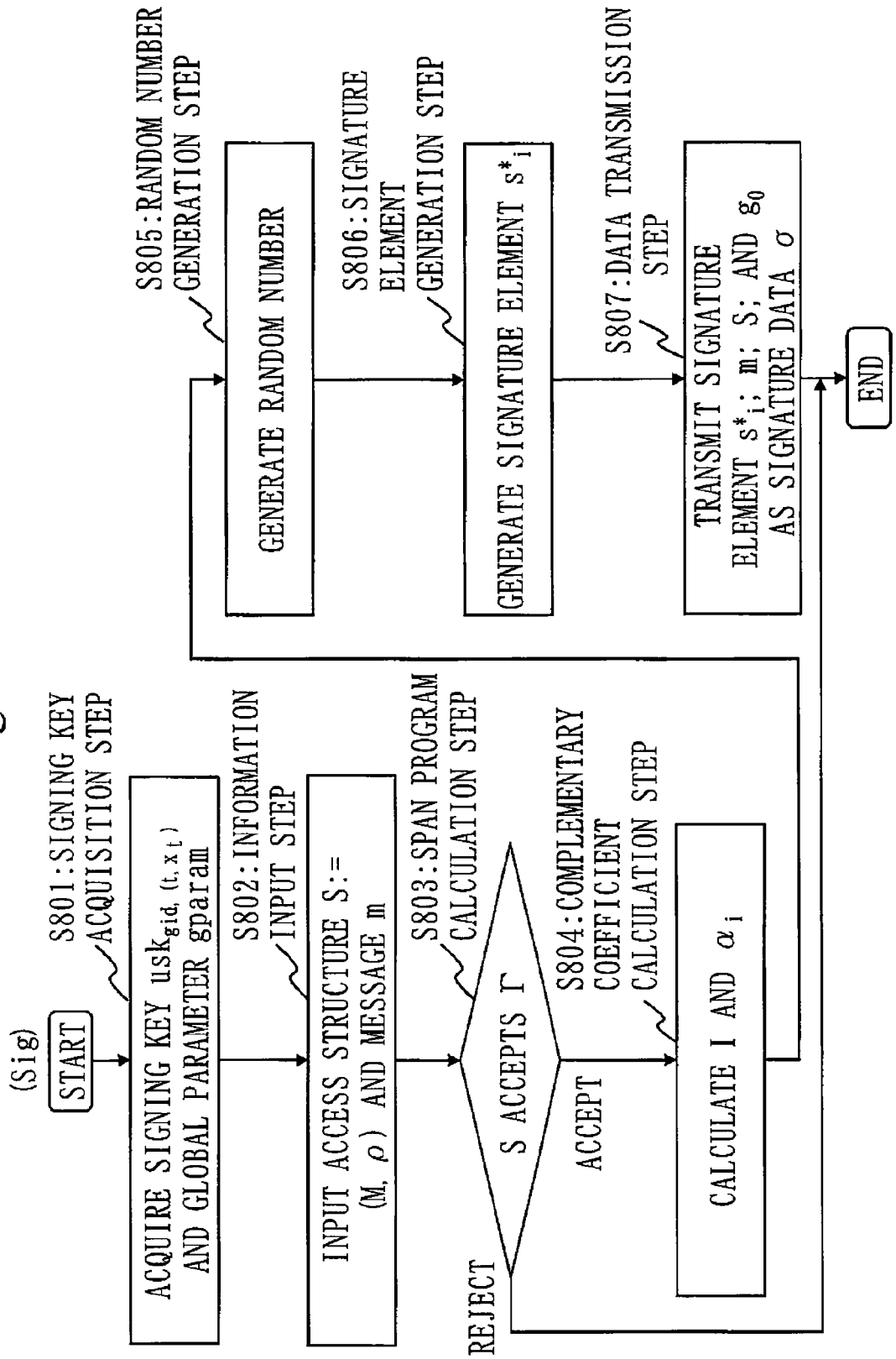
FIG. 21 is a flowchart showing the process of Sig algorithm.
Figure 22:
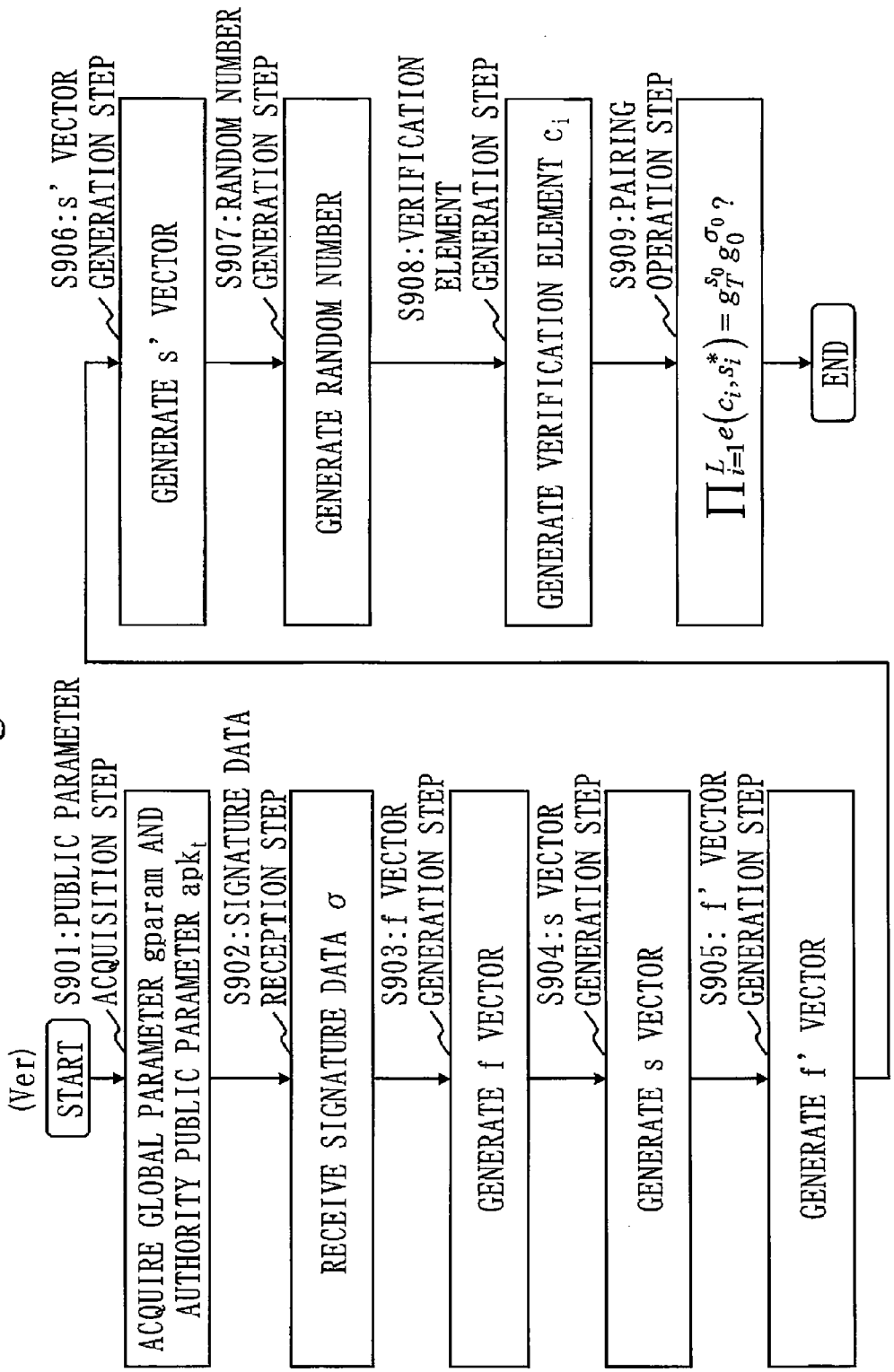
FIG. 22 is a flowchart showing the process of Ver algorithm.

FIGS. 18 to 20 are flowcharts showing the operation of the key generation device 100. Note that FIG. 18 is a flowchart showing the process of the GSetup algorithm, that FIG. 19 is a flowchart showing the process of the ASetup algorithm, and that FIG. 20 is a flowchart showing the process of the AttrGen algorithm. FIG. 21 is a flowchart showing the operation of the signature device 200 and the process of the Sig algorithm. FIG. 22 is a flowchart showing the operation of the verification device 300 and the process of the Ver algorithm.

The function and operation of the key generation device 100 will be described.

As shown in FIG. 15, the key generation device 100 is provided with a master key generation part 110, a master key storage part 120, an information input part 130 (first information input part), a signing key generation part 140, and a key distribution part 150 (signing key transmission part).

The master key generation part 110 is provided with a global parameter generation part 111 and an authority secret key generation part 112. The signing key generation part 140 is provided with a random number generation part 141 and a key element generation part 145.

The process of the GSetup algorithm executed by the key generation device 100 will be described first with reference to FIG. 18. As described above, the GSetup algorithm may be executed by one key generation device 100 out of the plurality of key generation devices 100.

(S501: Security Parameter Input Step)

With the input device, the global parameter generation part 111 takes as input a security parameter λ ($1^λ$).

(S502: Bilinear Pairing Group Generation Step)

With the processing device, the global parameter generation part 111 executes algorithm $G_{bpg}$ by taking as input the security parameter λ ($1^λ$) inputted in S501, and randomly generates the values of a parameter $param_G:=(q, G, G_T, g, e)$ of the bilinear pairing group.

(S503: Parameter Generation Step)

Hash functions $H_1$ and $H_2$ are determined as hash functions indicated in Formula 166.

$$H_1:\{0,1\}^* \to \mathbb{G},$$

$$H_2:\{0,1\}^* \to \mathbb{F}_q \quad \text{[Formula 166]}$$

With the processing device, the global parameter generation part 111 generates elements $G_0, G_1, G_2, G_3$, and $G_4$ of the global parameter gparam indicated in Formula 167.

$$G_0:=H_1(0^λ)\in\mathbb{G},$$

$$G_1:=H_1(1^λ)\in\mathbb{G},$$

$$G_2:=H_1(1,0^{λ-1})\in\mathbb{G},$$

$$G_3:=H_1(0,1,0^{λ-2})\in\mathbb{G},$$

$$G_4:=H_1(1,1,0^{λ-2})\in\mathbb{G} \quad \text{[Formula 167]}$$

The global parameter generation part 111 also sets $g_t:=e(G_0, G_1)$ and $g_4:=e(G_0, G_4)$.

(S504: Parameter Storing Step)

The master key storage part 120 stores $param_G$ generated in (S502), the hash functions $H_1$ and $H_2$ set in (S503) by the global parameter generation part 111, the generated elements $G_0, G_1, G_3$, and $G_4$, and the set values $g_t$ and $g_4$, as a global parameter gparam in the storage device.

In brief, from (S501) through (S503), the key generation device 100 generates the global parameter gparam by executing the GSetup algorithm indicated in Formula 168. Then, in (S504), the key generation device 100 stores the generated public global parameter gparam, in the storage device.

Note that the global parameter gparam is publicized via, e.g., a network, so that other key generation devices 100, the signature device 200, and the verification device 300 can acquire it.

$GSetup(1^\lambda)$: $param_\mathbb{G}$ := [Formula 168]

$(q, \mathbb{G}, \mathbb{G}_T, g, e) \xleftarrow{R} \mathcal{G}_{bpg}(1^\lambda)$, $H_1:\{0, 1\}^* \to \mathbb{G}$; $H_2:\{0, 1\}^* \to \mathbb{F}_q$;

$G_0 := H_1(0^\lambda) \in \mathbb{G}$, $G_1 := H_1(1^\lambda) \in \mathbb{G}$, $G_2 := H_1(1, 0^{\lambda-1}) \in \mathbb{G}$, $G_3 := H_1(0, 1, 0^{\lambda-2}) \in \mathbb{G}$, $G_4 := H_1(1, 1, 0^{\lambda-2}) \in \mathbb{G}$, $g_T := e(G_0, G_1)$, $g_4 := e(G_0, G_4)$, return $gparam$ :=

$(param_\mathbb{G}, H_1, H_2, G_0, G_1, G_2, G_3, G_4, g_T, g_4)$.

The process of the ASetup algorithm executed by the key generation device 100 will be described with reference to FIG. 19. As described above, the ASetup algorithm may be executed by all of the plurality of key generation devices 100, or only some of the plurality of key generation devices 100.

(S601: Information Input Step)

With the input device, the information input part 130 takes as input the identification information t assigned to itself (its key generation device 100). Note that different identification information t are assigned to the respective key generation devices 100.

For example, with the communication device, the information input part 130 acquires the global parameter gparam via the network. If this information input part 130 belongs to the key generation device 100 that has generated the global parameter gparam, the information input part 130 may read the global parameter gparam from the master key generation part 120.

(S602: Space Generation Step)

With the processing device, the authority secret key generation part 112 executes the algorithm $G_{dpvs}$ by taking as input the security parameter $\lambda$ ($1^\lambda$), $N_t = 2n_t + 2 + u_t + w_t + z_t$, and the values of $param_G := (q, G, G_T, g, e)$, to generate the values of a parameter $param_{V_t} := (q, V_t, G_T, A_t, e)$ of the dual pairing vector spaces.

Note that $n_t$, $u_t$, $w_t$, and $z_t$ are each an integer of 1 or more.

(S603) Basis U Generation Step)

With the processing device, the authority secret key generation part 112 generates a basis $U_l$ for each integer $l=1, \ldots, 4$, as indicated in Formula 169.

$\mathbb{U}_l := (u_{l,1}, \ldots, u_{l,N_t})$, [Formula 169]

where $u_{l,i} := (\overbrace{0, \ldots, 0}^{i-1}, G_l, \overbrace{0, \ldots, 0}^{N_t-i})$ for $l = 0, \ldots, 4$; $i = 1, \ldots, N_t$ (S604: Linear Transformation Generation Step)

With the processing device, the authority secret key generation part 112 takes as input $n_t + u_t + w_t + z_t$, and $F_q$, and generates linear transformation $X_t := (\chi_{t,i,j})_{i,j}$ randomly, as indicated in Formula 170.

$X_t \xleftarrow{U} GL(N_t, \mathbb{F}_q)$ [Formula 170]

(S605: Basis B Generation Step)

With the processing device, the authority secret key generation part 112 generates a basis $B_t$ and a basis $B^*_t$, as indicated in Formula 171.

$(\mathbb{B}_t, \mathbb{B}^*_t) := (X_t)(\mathbb{U}_0), (X_t^T)^{-1}(\mathbb{U}_1))$ [Formula 171]

The authority secret key generation part 112 determines $\pi$, $\pi'$ and $\mu \in F_q$, as values that satisfy $G_2 = \pi G_1$, $G_3 = \pi' G_1$, and $G_3 = \mu G_t$. Then, Formula 172 is established.

$(\pi \mathbb{B}^*_t, \pi' \mathbb{B}^*_t, \mu \mathbb{B}^*_t) = ((X_t^T)^{-1}(\mathbb{U}_2), (X_t^T)^{-1}(\mathbb{U}_3),$
$(X_t^T)^{-1}(\mathbb{U}_4))$ [Formula 172]

(S606: Basis B^ Generation Step)

With the processing device, the authority secret key generation part 112 generates a subbasis $BA_t$ of the basis $B_t$ and a subbasis $BA^*_t$ of the basis $B^*$ as indicated in Formula 173.

$\hat{\mathbb{B}}_t := (b_{t,1}, \ldots, b_{t,2n_t+2}, b_{t,2n_t+2+u_t+w_t+1}, \ldots, b_{t,2n_t+2+u_t+w_t+z_t})$, $\hat{\mathbb{B}}^*_t := (\pi(b_{t,1}^*, \ldots, b_{t,n_t}^*), \pi'(b_{t,n_t+1}^*, \ldots, b_{t,2n_t}^*), \mu(b_{t,2n_t+1}^*, b_{t,2n_t+2}^*), b_{t,2n_t+2+u_t+1}, \ldots, b_{t,2n_t+2+u_t+w_t})$ [Formula 173]

(S607: Master Key Storing Step)

The master key storage part 120 stores the parameter $param_{V_t}$ generated in (S602), and the subbasis $\hat{B}_t$ and the subbasis $\hat{B}^*_t$ generated in (S606), in the storage device as an authority public parameter $apk_t$. The master key storage part 120 also stores the linear transformation $X_t$ generated in (S604), in the storage device as the authority secret key $ask_t$.

In brief, from (S601) through (S606), the key generation device 100 generates the authority public parameter $apk_t$ and the authority secret key $ask_t$ by executing the ASetup algorithm indicated in Formula 174. Then, in (S607), the key generation device 100 stores the generated authority public parameter $apk_t$ and authority secret key $ask_t$, in the storage device.

Note that the authority public parameter $apk_t$ is publicized via, e.g., a network, so that the signature device 200 and the verification device 300 can acquire it.

$ASetup(gparam, t)$: [Formula 174]

$N_t := 2n_t + 2 + u_t + w_t + z_t$, $param_{V_t} := (q, V_t, G_T, A_t, e) :=$ $\mathcal{G}_{dpvs}(1^\lambda, N_t, param_G)$, $\mathbb{U}_l := (u_{l,1}, \ldots, u_{l,N_t})$, where $u_{l,i} := (\overbrace{0, \ldots, 0}^{i-1}, G_l, \overbrace{0, \ldots, 0}^{N_t-i})$ for $l = 0, \ldots, 4$; $i = 1, \ldots, N_t$, $X_t \xleftarrow{U} GL(N_t, \mathbb{F}_q)(\mathbb{B}_t, \mathbb{B}_t^*) := (X_t(\mathbb{U}_0),$ $(X_t^T)^{-1}(\mathbb{U}_1))$, Let $\pi, \pi', \mu \in \mathbb{F}_q$ s.t.

$G_2 = \pi G_1$, $G_3 = \pi' G_1$, $G_4 = \mu G_1$, then $(\pi \mathbb{B}_t^*, \pi' \mathbb{B}_t^*, \mu \mathbb{B}_t^*) =$ $((X_t^T)^{-1}(\mathbb{U}_2), (X_t^T)^{-1}(\mathbb{U}_3), (X_t^T)^{-1}(\mathbb{U}_4))$, $\hat{\mathbb{B}}_t := (b_{t,1}, \ldots, b_{t,2n_t+2}, b_{t,2n_t+2+u_t+w_t+1}, \ldots,$ $b_{t,2n_t+2+u_t+w_t+z_t})$, $\hat{\mathbb{B}}_t^* := (\pi(b_{t,1}^*, \ldots, b_{t,n_t}^*), \pi'(b_{t,n_t+1}^*, \ldots, b_{t,2n_t}^*),$ $\mu(b_{t,2n_t+1}^*, b_{t,2n_t+2}^*),$ -continued $b_{t,2n_t+2+u_t+1}, \ldots, b_{t,2n_t+2+u_t+w_t}$), $ask_t := X_t, apk_t := (param_{\mathbb{V}_t}, \hat{\mathbb{B}}_t, \hat{\mathbb{B}}_t^*)$, return $(ask_t, apk_t)$.

The process of the AttrGen algorithm executed by the key generation device 100 will be described with reference to FIG. 20. Note that, as described above, the AttrGen algorithm is executed by the key generation device 100, among the plurality of key generation devices 100, that has executed the ASetup algorithm.

(S701: Information Input Step)

With the input device, the information input part 130 takes as input the identification information t assigned to itself (its key generation device 100), the identification information gid of the user whom the signing key is to be issued for, and the attribute information $\vec{x}_t := (i=1, \ldots, n_t)$.

For example, with the communication device, the information input part 130 also acquires the global parameter gparam via the network. If this information input part 130 belongs to the key generation device 100 that has generated the global parameter gparam, the information input part 130 may read the global parameter gparam from the master key storage part 120.

The information input part 130 also reads the authority secret key $ask_s$ from the master key storage part 120.

(S702: Random Number Generation Step)

With the processing device, the random number generation part 141 generates a random number $\vec{\phi}_{t,j}$ for the identification information t and each integer j=1, 2, as indicated in Formula 175.

$$\vec{\varphi}_{t,j} := (\varphi_{t,j,1}, \ldots, \varphi_{t,j,w_t}) \overset{U}{\leftarrow} \mathbb{F}_q^{w_t}, \text{ for } j = 1, 2, \quad \text{[Formula 175]}$$

(S703: Key Element Generation Step)

Assume that Formula 176 is established.

$G_{gid,j}(=\delta_j G_1):=H_1(j,gid) \in \mathbb{G}$ [Formula 176]

With the processing device, the key element generation part 145 generates a key element $k^*_{t,j}$, which is an element of the signing key $usk_{gid,(t,xt)}$, for the identification information t and each integer j=1, 2, as indicated in Formula 177.

$$k^*_{t,j} := (X_t^T)^{-1}((G_{gid,j}+G_1)\vec{x}_t, -\vec{x}_t G_{gid,j}, \quad \text{[Formula 177]}$$

$0^{2+u_t}, \varphi_{t,j,1}G_1, \ldots, \varphi_{t,j,w_t}G_1, 0^{z_t})$ i.e., $k^*_{t,j} :=$ $\overline{((\delta_j+1)(x_{t,1}, \ldots, x_{t,n_t})}^{n_t}$, $\overline{-\delta_j(x_{t,1}, \ldots, x_{t,n_t})}^{n_t}, \overline{0^2, 0^{u_t}}^{u_t}$, $\overline{\varphi_{t,j,1}, \ldots, \varphi_{t,j,w_t}}^{w_t}, \overline{0^{z_t}}^{z_t})\mathbb{B}^*_t$, for j = 1, 2

As described above, for the bases B and B* indicated in Formula 113, Formula 114 is established. Hence, Formula 177 means that the coefficient for the basis vector of a basis $\mathbb{B}^*_t$ is set as described below. For the purpose of simple representation, a basis vector $b^*_{t,i}$ is specified only by its i portion. For example, a basis vector 1 signifies a basis vector $b^*_{t,1}$. Basis vectors 1, ..., 3 signify basis vectors $b^*_{t,1}, \ldots, b^*_{t,3}$, respectively.

$(\delta_j+1)x_{t,1}, \ldots, (\delta_j+1)x_{t,nt}$ (where nt represents $n_t$) are each set as the coefficient for the basis vectors 1, ..., $n_t$. $\delta_j x_{t,1}, \ldots, -\delta_j x_{t,nt}$ (where nt represents $n_t$) are each set as the coefficient for the basis vectors $n_t+1, \ldots, 2n_t$. 0 is set as the coefficient for basis vectors $2n_t+1, \ldots, 2n_t+2+u_t$. Random numbers $\phi_{t,j,1}, \ldots, \phi_{t,j,wt}$ (where wt represents $w_t$) are each set as the coefficient for basis vectors $2n_t+2+u_t+1, \ldots, 2n_t+2+u_t+w_t$. 0 is set as the coefficient for basis vectors $2n_t+2+u_t+w_t+1, \ldots, 2n_t+2+u_t+w_t+z_t$.

(S704: Key Distribution Step)

For example, with the communication device, the key distribution part 150 distributes the signing key $usk_{gid,(t,xt)}$, constituted as elements by the user identification information gid, the identification information t and the attribute information $\vec{x}_t$, and the key element $k^*_{t,j}$, to the signature device 200 in secrecy via the network. As a matter of course, the signing key $usk_{gid,(t,xt)}$ may be distributed to the signature device 200 by another method.

In brief, from (S701) through (S703), the key generation device 100 generates the signing key $usk_{gid,(t,xt)}$ by executing the AttrGen algorithm indicated in Formula 178. In (S704), the key generation device 100 distributes the generated signing key $usk_{gid,(t,xt)}$ to the signature device 200.

$AttrGen(gparam, t, ask_t, gid, \vec{x}_t := (x_{t,1}, \ldots, x_{t,n_t}) \in \mathbb{F}_q)$: [Formula 178]

$G_{gid,j}(=\delta_j G_1) := H_1(j, gid) \in \mathbb{G}$, $\vec{\varphi}_{t,j} \overset{U}{\leftarrow} \mathbb{F}_q^{w_t}$, for $j = 1, 2$, $k^*_{t,j} := k^*_{t,j} := (X_t^T)^{-1}((G_{gid,j}+G_1)\vec{x}_t, -\vec{x}_t G_{gid,j},$ $j, 0^{2+u_t}, \varphi_{t,j,1}G_1, \ldots, \varphi_{t,j,w_t}G_1, 0^{z_t})$ i.e., $k^*_{t,j} := (\overline{(\delta_j+1)(x_{t,1}, \ldots, x_{t,n_t})}^{n_t}, \overline{-\delta_j(x_{t,1}, \ldots, x_{t,n_t})}^{n_t},$ $\overline{0^2, 0^{u_t}}^{u_t}, \overline{\varphi_{t,j,1}, \ldots, \varphi_{t,j,w_t}}^{w_t}, \overline{0^{z_t}}^{z_t})\mathbb{B}^*_t$, for $j = 1, 2$, return $(usk_{gid,(t,xt)} := (gid, (t, \vec{x}_t), \{k^*_{t,j}\}_{j=1,2}))$.

The function and operation of the signature device 200 will be described.

As shown in FIG. 16, the signature device 200 is provided with a signing key acquisition part 210, an information input part 220 (second information input part), a span program calculation part 230, a complementary coefficient calculation part 240, a signature data generation part 250, and a signature data transmission part 260 (signature data output part).

The information input part 220 is provided with a predicate information input part 221 and a message input part 222. The signature data generation part 250 is provided with a random number generation part 251 and a signature element generation part 255.

The process of the Sig algorithm executed by the signature device 200 will be described with reference to FIG. 21.

(S801: Signing Key Acquisition Step)

For example, with the communication device, the signing key acquisition part 210 acquires the signing key $usk_{gid,(t,xt)}$ generated by each key generation device 100, via the network. The signing key acquisition part 210 also acquires the public parameter gparam generated by the key generation device 100.

(S802: Information Input Step)

With the input device, the predicate information input part 221 takes as input the access structure S:=(M, ρ). The matrix M is a matrix of L rows×r columns. L and r are each an integer of 1 or more.

With the input device, the message input part 220 takes as input the message m to be signed.

The matrix M of the access structure S is to be set depending on the condition of the system to be implemented.

(S803: Span Program Calculation Step)

With the processing device, the span program calculation part 230 checks whether or not the access structure S inputted in (S802) accepts the set Γ of the attribute information $\vec{x}_t$ included in the signing key $usk_{gid,(t,xt)}$ acquired in (S801).

The method of checking whether or not the access structure accepts the attribute set is the same as that described in "3. Concept for Implementing Attribute-Based Signature Scheme" in Embodiment 1.

If the access structure S accepts the attribute set Γ (accept in S803), the span program calculation part 230 advances the process to (S804). If the access structure S rejects the set Γ of the attribute information $\vec{x}_t$ (reject in S803), the span program calculation part 230 ends the process.

(S804: Complementary Coefficient Calculation Step)

With the processing device, the complementary coefficient calculation part 430 calculates I and a constant (complementary coefficient) $\alpha_i$ for each integer i included in I, which I and $\alpha_i$ satisfying Formula 179.

$$\vec{1} := \sum_{i \in I} \alpha_i M_i,$$

and $$I \subseteq \{i \in \{1, \ldots, L\} | [\rho(i)=(t, \vec{v}_i) \wedge (t, \vec{x}_t) \in \Gamma \wedge \vec{v}_i \cdot \vec{x}_t = 0]$$
$$\vee [\rho(i)=\neg(t, \vec{v}_i) \wedge (t, \vec{x}_t) \in \Gamma \wedge \vec{v}_i \cdot \vec{x}_t \neq 0]\}$$  [Formula 179]

Note that $M_i$ signifies the i-th row of the matrix M.

(S805: Random Number Generation Step)

With the processing device, the random number generation part 251 generates random numbers $\xi_1$ and $\xi_2$, and random numbers $\beta_i$ and $\beta_i'$ (i=1, ..., L), as indicated in Formula 180.

$$\xi_1, \xi_2 \xleftarrow{U} \mathbb{F}_q,$$  [Formula 180]

$$(\beta_i), (\beta_i') \xleftarrow{U} \left\{ (\beta_1, \ldots, \beta_L) \left| \sum_{i=1}^{L} \beta_i M_i = \vec{0} \right. \right\}$$

(S806: Signature Element Generation Step)

With the processing device, the signature element generation part 255 generates a signature element $s^*_i$ which is an element of the signature data σ, for each integer i=1, ..., L, as indicated in Formula 181.

$$s^*_i := \gamma_i \cdot (\xi_1 k^*_{t,1} + (1-\xi_1) k^*_{t,2}) +$$  [Formula 181]
$$\sum_{i'=1}^{n_t} y_{i,i'} (\pi b^*_{t,i'}) + \sum_{i'=1}^{n_t} y'_{i,i'} (\pi' b^*_{t,n_t+i'}) +$$
$$\xi_2((\mu b^*_{t,2n_t+1}) + H_2(m, \mathbb{S})(\mu b^*_{t,2n_t+2})) + r^*_i,$$

for $1 \leq i \leq L$

Note that $r^*_i$ is defined by Formula 182 (see Formulas 110 through 112 and their explanations).

$$r^*_i \xleftarrow{U} \text{span} \langle b^*_{t,2n_t+2+u_t+1}, \ldots, b^*_{t,2n_t+2+u_t+w_t} \rangle$$  [Formula 182]

Note that $\gamma_i$, $\vec{y}_i := (y_{i,i'})$ (i'=1, ..., $n_t$), and $\vec{y}'_i := (y'_{i,i'})$ (i'=1, ..., $n_t$) are defined by Formula 183.

if $i \in I \wedge \rho(i) = (t, \vec{v}_i)$,  [Formula 183]

$\gamma_i := \alpha_i,$ $\vec{y}_i \xleftarrow{U} \{\vec{y}_i | \vec{y}_i \cdot \vec{v}_i = 0 \wedge y_{i,1} = \beta_i\},$ $\vec{y}'_i \xleftarrow{U} \{\vec{y}'_i | \vec{y}'_i \cdot \vec{v}_i = 0 \wedge y'_{i,1} = \beta'_i\},$ if $i \in I \wedge \rho(i) = \neg(t, \vec{v}_i)$, $\gamma_i := \dfrac{\alpha_i}{\vec{v}_i \cdot \vec{x}_t},$ $\vec{y}_i \xleftarrow{U} \{\vec{y}_i | \vec{y}_i \cdot \vec{v}_i = \beta_i\},$ $\vec{y}'_i \xleftarrow{U} \{\vec{y}'_i | \vec{y}'_i \cdot \vec{v}_i = \beta'_i\},$ if $i \notin I \wedge \rho(i) = (t, \vec{v}_i)$, $\gamma_i := 0,$ $\vec{y}_i \xleftarrow{U} \{\vec{y}_i | \vec{y}_i \cdot \vec{v}_i = 0 \wedge y_{i,1} = \beta_i\},$ $\vec{y}'_i \xleftarrow{U} \{\vec{y}'_i | \vec{y}'_i \cdot \vec{v}_i = 0 \wedge y'_{i,1} = \beta'_i\},$ if $i \notin I \wedge \rho(i) = \neg(t, \vec{v}_i)$, $\gamma_i := 0,$ $\vec{y}_i \xleftarrow{U} \{\vec{y}_i | \vec{y}_i \cdot \vec{v}_i = \beta_i\},$ $\vec{y}'_i \xleftarrow{U} \{\vec{y}'_i | \vec{y}'_i \cdot \vec{v}_i = \beta'_i\}$ (S807: Data Transmission Step)

For example, with the communication device, the signature data transmission part 260 transmits the signature data σ, including the signature element $s^*_i$ (i=1, ..., L), the message m, the access structure S:=(M, ρ), and $g_0:=g_4^{\xi_2}$ (where ξ2 represents $\xi_2$), to the verification device 300 via the network. As a matter of course, the signature data σ may be transmitted to the verification device 300 by another method.

In brief, from (S801) through (S806), the signature device 200 generates the signature data σ by executing the Sig algorithm indicated in Formula 184. In (S807), the signature device 200 distributes the generated signature data σ to the verification device 300.

$$Sig(gparam, \{apk_t, usk_{gid,(t,x_t)} := (gid, (t, \vec{x}_t), \{k^*_{t,j}\}_{j=1,2}\},$$  [Formula 184]
$$m, \mathbb{S} := (M, \rho))$$

If $\mathbb{S} := (M, \rho)$ accepts $\Gamma := \{(t, \vec{x}_t) \in usk_{gid,(t,x_t)}\}$, then compute I and $\{\alpha_i\}_{i \in I}$ such that $$\vec{1} := \sum_{i \in I} \alpha_i M_i \text{ where } M_i \text{ is the } i\text{-}th \text{ row of } M,$$

and $I \subseteq \{i \in \{1, \ldots, L\} |$ $[\rho(i) = (t, \vec{v}_i) \wedge (t, \vec{x}_t) \in \Gamma \wedge \vec{v}_i \cdot \vec{x}_t = 0] \vee$ $[\rho(i) = \neg(t, \vec{v}_i) \wedge (t, \vec{x}_t) \in \Gamma \wedge \vec{v}_i \cdot \vec{x}_t \neq 0]\},$ $\xi_1, \xi_2 \xleftarrow{U} \mathbb{F}_q, (\beta_i),$ -continued $$(\beta_i') \xleftarrow{U} \left\{ (\beta_1, \ldots, \beta_L) \middle| \sum_{i=1}^{L} \beta_i M_i = \vec{0} \right\},$$

$$g_0 := g_T^{\xi_2},$$

$$s_i^* := \gamma_i \cdot (\xi_1 k_{t,1}^* + (1-\xi_1) k_{t,2}^*) +$$

$$\sum_{t=1}^{n_t} y_{i,t} (\pi b_{t,t}^*) + \sum_{t=1}^{n_t} y_{i,t}' (\pi' b_{t,n_t+t}^*) +$$

$$\xi_2 ((\mu b_{t,2n_t+1}^*) + H_2(m, \mathbb{S})(\mu b_{t,2n_t+2}^*)) + r_i^*,$$

for $1 \le i \le L$, where $$r_i^* \xleftarrow{U} \text{span} \langle b_{t,2n_t+2+u_t+1}^*, \ldots, b_{t,2n_t+2+u_t+w_t}^* \rangle,$$

and $\gamma_i, \vec{y}_i := (y_{i,1}, \ldots, y_{i,n_t}),$ $\vec{y}_i' := (y_{i,1}', \ldots, y_{i,n_t}')$ are defined as if $i \in I \land \rho(i) = (t, \vec{v}_i), \gamma_i := \alpha_i,$ $\vec{y}_i \xleftarrow{U} \{\vec{y}_i \mid \vec{y}_i \cdot \vec{v}_i = 0 \land y_{i,1} = \beta_i\},$ $\vec{y}_i' \xleftarrow{U} \{\vec{y}_i' \mid \vec{y}_i' \cdot \vec{v}_i = 0 \land y_{i,1}' = \beta_i'\},$ if $i \in I \land \rho(i) = \neg(t, \vec{v}_i),$ $\gamma_i := \dfrac{\alpha_i}{\vec{v}_i \cdot \vec{x}_t},$ $\vec{y}_i \xleftarrow{U} \{\vec{y}_i \mid \vec{y}_i \cdot \vec{v}_i = \beta_i\},$ $\vec{y}_i' \xleftarrow{U} \{\vec{y}_i' \mid \vec{y}_i' \cdot \vec{v}_i = \beta_i'\},$ if $i \notin I \land \rho(i) = (t, \vec{v}_i),$ $\gamma_i := 0,$ $\vec{y}_i \xleftarrow{U} \{\vec{y}_i \mid \vec{y}_i \cdot \vec{v}_i = 0 \land y_{i,1} = \beta_i\},$ $\vec{y}_i' \xleftarrow{U} \{\vec{y}_i' \mid \vec{y}_i' \cdot \vec{v}_i = 0 \land y_{i,1}' = \beta_i'\},$ if $i \notin I \land \rho(i) = \neg(t, \vec{v}_i),$ $\gamma_i := 0,$ $\vec{y}_i \xleftarrow{U} \{\vec{y}_i \mid \vec{y}_i \cdot \vec{v}_i = \beta_i\},$ $\vec{y}_i' \xleftarrow{U} \{\vec{y}_i' \mid \vec{y}_i' \cdot \vec{v}_i = \beta_i'\},$ return $\vec{s}^* := (s_0^*, \ldots, s, g_0).$ The function and operation of the verification device 300 will be described.

As shown in FIG. 17, the verification device 300 is provided with a public parameter acquisition part 310, a data reception part 320 (data acquisition part), a verification key generation part 330, and a pairing operation part 340.

The verification key generation part 330 is provided with a random number generation part 331, an f vector generation part 332, an s vector generation part 333, and a verification element generation part 337.

The process of the Ver algorithm executed by the verification device 300 will be described with reference to FIG. 22.

(S901: Public Parameter Acquisition Step)

For example, with the communication device, the public parameter acquisition part 310 acquires the global parameter gparam and authority public parameter apk$_t$ generated by each key generation device 100, via the network.

(S902: Signature Data Reception Step)

For example, with the communication device, the data reception part 320 receives the signature data σ transmitted by the signature device 200, via the network.

(S903: f Vector Generation Step)

With the processing device, the f vector generation part 332 generates a vector f$^\rightarrow$ having r pieces of elements, randomly as indicated in Formula 185.

$$\vec{f} \xleftarrow{U} \mathbb{F}_q^r \qquad \text{[Formula 185]}$$

(S904: s Vector Generation Step)

With the processing device, the s vector generation part 333 generates a vector s$^{\rightarrow T}$ as indicated in Formula 186, based on the (L rows×r columns) matrix M of the access structure S included in the signature data σ received in (S902), and the vector f$^\rightarrow$ generated in (S403) and having r pieces of elements, x.

$$\vec{s}^T := (s_1, \ldots, s_L)^T := M \cdot \vec{f}^T \qquad \text{[Formula 186]}$$

With the processing device, the s vector generation part 333 generates a value s$_0$, based on the vector f$^\rightarrow$ generated in (S903), as indicated in Formula 187. Note that 1$^\rightarrow$ is a vector which has a value 1 in all its elements.

$$s_0 := \vec{1} \cdot \vec{f}^T \qquad \text{[Formula 187]}$$

(S905: f′ Vector Generation Step)

With the processing device, the f vector generation part 332 generates a vector f$^{\rightarrow\prime}$ having r pieces of elements, randomly as indicated in Formula 188.

$$\vec{f}\,' \xleftarrow{R} \mathbb{F}_q^r, \qquad \text{[Formula 188]}$$

s.t. $s_0 = \vec{1} \cdot \vec{f}'^T$ (S906: s′ Vector Generation Step)

With the processing device, the s vector generation part 333 generates a vector (s$^{\rightarrow\prime}$)$^T$, based on the (L rows×r columns) matrix M and the vector f$^{\rightarrow\prime}$ having r pieces of elements, as indicated in Formula 189.

$$\vec{s}\,'^T := (s_1', \ldots, s_L')^T := M \cdot \vec{f}\,'^T \qquad \text{[Formula 189]}$$

(S907: Random Number Generation Step)

With the processing device, the random number generation part 331 generates a random number σ$^\rightarrow$ and a value σ$_0$, as indicated in Formula 190.

$$\vec{\sigma} := (\sigma_1, \ldots, \sigma_L) \xleftarrow{U} \mathbb{F}_q^L, \qquad \text{[Formula 190]}$$

$$\sigma_0 := \vec{1} \cdot \vec{\sigma}^T$$

(S908: Verification Element Generation Step)

With the processing device, the verification element generation part 337 generates a verification element which is an element of the verification key, for each integer i=1, ..., L, as indicated in Formula 191.

for $1 \le i \le L,$  [Formula 191]

if $\rho(i) = (t, \vec{v}_i),$ $\theta_i, \theta_i', \theta_i'' \xleftarrow{U} \mathbb{F}_q, \vec{\eta}_i := (\eta_{i,1}, \ldots, \eta_{i,z_t}) \xleftarrow{U} \mathbb{F}_q^{z_t}$ -continued $$c_i := \overline{(s_i + \theta_i v_{i,1}, \overset{n_t}{\theta_i v_{i,2}, \ldots, \theta_i v_{i,n_t}},}$$

$$\overline{s_i' + \theta_i' v_{i,1}, \overset{n_t}{\theta_i' v_{i,2}, \ldots, \theta_i' v_{i,n_t}},}$$

$$\overline{\sigma_i - \theta_i'' H_2(m, \mathbb{S}), \overset{2}{\theta_i'', 0^{u_t}, 0^{w_t}}, \overset{z_t}{\eta_{i1}, \ldots, \eta_{i,z_t}})\mathbb{B}_t^-,$$

if $\rho(i) = \neg\, (t, \vec{v}_i)$, $$\theta_i'' \overset{U}{\leftarrow} \mathbb{F}_q, \vec{\eta}_i := (\eta_{i,1}, \ldots, \eta_{i,z_t}) \overset{U}{\leftarrow} \mathbb{F}_q^{z_t},$$

$$c_i := \overline{(s_i(v_{i,1}, \ldots, \overset{n_t}{v_{i,n_t}}), s_i'(v_{i,1}, \ldots, \overset{n_t}{v_{i,n_t}}),}$$

$$\overline{\sigma_i - \theta_i'' H_2(m, \mathbb{S}), \overset{2}{\theta_i'', 0^{u_t}, 0^{w_t}}, \overset{z_t}{\eta_{i1}, \ldots, \eta_{i,z_t}})\mathbb{B}_t$$

As described above, Formula 114 is established for the bases B and B* indicated in Formula 113. Hence, Formula 191 means that the coefficient for the basis vector of the basis $B_t$ is set as described below. For the purpose of simple representation, a basis vector $b_{t,i}$ is specified only by its i portion. For example, a basis vector 1 signifies a basis vector $b_{t,1}$. Basis vectors 1, ..., 3 signify basis vectors $b_{t,1}, \ldots, b_{t,3}$, respectively.

When $\rho(i)$ is a positive tuple $(t, \vec{v}_i)$, $s_i+\theta_i v_{i,1}$ is set as the coefficient for the basis vector 1. $\theta_i v_{i,2}, \ldots, \theta_i v_{i,n_t}$ (where nt represents $n_t$) are each set as the coefficient for basis vectors 2, ..., $n_t$. $s_i'+\theta_i' v_{i,1}$ is set as the coefficient for a basis vector $n_t+1$. $\theta_i' v_{i,2}, \ldots, \theta_i' v_{i,n_t}$ (where nt represents $n_t$) are each set as the coefficient for basis vectors $n_t+2, \ldots, 2n_t$. $\sigma_i-\theta_i'' H_2(m, S)$ is set as the coefficient for a basis vector $2n_t+1$. Note that $H_2(m, S)$ means that the message m and the access structure S are given as input to the hash function $H_2$. For example, $H_2(m\|S)$ may be possible. $\theta_i''$ is set as the coefficient for a basis vector $2n_t+2$. 0 is set as the coefficient for basis vectors $2n_t+2+1, \ldots, 2n_t+2+u_t+w_t$. $\eta_{i,1}, \ldots, \eta_{i,zt}$ (where zt represents $z_t$) are each set as the coefficient for basis vectors $2n_t+2+u_t+w_t+1, \ldots, 2n_t+2+u_t+w_t+z_t$.

When $\rho(i)$ is a negative tuple $\neg\,(t, \vec{v}_i)$, $s_i v_{i,1}, \ldots, s_i v_{i,nt}$ (where nt represents $n_t$) are each set as the coefficient for the basis vectors 1, ..., $n_t$. $s_i' v_{i,1}, \ldots, s_i' v_{i,nt}$ (where nt represents $n_t$) are each set as the coefficient for basis vectors $n_t+1, \ldots, 2n_t$. $\sigma_i-\theta_i'' H_2(m, S)$ is set as the coefficient for the basis vector $2n_t+1$. $\theta_i''$ is set as the coefficient for the basis vector $2n_t+2$. 0 is set as the coefficient for the basis vectors $2n_t+2+1, \ldots, 2n_t+2+u_t+w_t$. $\eta_{i,1}, \ldots, \eta_{i,zt}$ (where zt represents $z_t$) are each set as the coefficient for the basis vectors $2n_t+2+u_t+w_t+1, \ldots, 2n_t+2+u_t+w_t+z_t$.

(S909: Pairing Operation Step)

With the processing device, the pairing operation part 340 conducts a pairing operation indicated in Formula 192.

$$\prod_{i=1}^{L} e(c_i, s_i^*) \qquad \text{[Formula 192]}$$

If the calculation result of the pairing operation indicated in Formula 192 is a value $g_T^{s0} g_0^{\sigma 0}$ (where s0 represents $s_0$ and $\sigma 0$ represents $\sigma_0$), the pairing operation part 340 outputs value 1 indicating success of the signature verification; otherwise value 0 indicating failure of the signature verification.

If the signature data σ is authentic, as the consequence of calculating Formula 192, value 1 is obtained, as indicated in Formula 193.

$$\prod_{i=1}^{L} e(c_i, s_i^*) = \prod_{i \in I} e(c_i, k_{t,1}^*)\gamma_i \qquad \text{[Formula 193]}$$

$$\xi_1 \cdot \prod_{i \in I} e(c_i, k_{t,2}^*)\gamma_i (1-\xi_1) \cdot \prod_{i=1}^{L} \prod_{t=1}^{n_t} e(c_i, b_{t,t}^*)^{\pi \gamma_{i,t}} \cdot$$

$$\prod_{i=1}^{L} \prod_{t=1}^{n_t} e(c_i, b_{t,n_t+t}^*)^{\pi' \gamma_{i,t}} \cdot$$

$$\prod_{i=1}^{L} e(c_i, b_{t,2n_t+1}^*)\xi_2 \mu \cdot$$

$$\prod_{i=1}^{L} e(c_i, b_{t,2n_t+2}^*)\xi_2 \mu H_2(m,$$

$$\mathbb{S}) = \prod_{i \in I} g_T^{\alpha_i s_i} \cdot \prod_{i=1}^{L} g_T^{\pi \beta_i s_i} \cdot$$

$$\prod_{i=1}^{L} g_T^{\pi' \beta_i' s_i} \cdot \prod_{i=1}^{L} g_T^{\xi_2 \mu \sigma_i} =$$

$$g_T^{s_0} \cdot 1 \cdot 1 \cdot g_4^{\xi_2 \sigma_0} = g_T^{s_0} \cdot g_0^{\sigma_0}$$

In brief from (S901) through (S909), the verification device 300 verifies the signature data σ by executing the Ver algorithm indicated in Formula 194.

$$Ver(gparam, apk_t, m, \mathbb{S} := (M, \rho), \vec{s}^*) \qquad \text{[Formula 194]}$$

$$\vec{f} \overset{U}{\leftarrow} \mathbb{F}_q^r, \vec{s}^T := (s_1, \ldots, s_L)^T := M \cdot \vec{f}^T, s_0 := \vec{1} \cdot \vec{f}^T,$$

$$\vec{f}' \overset{R}{\leftarrow} \mathbb{F}_q^r, \text{ s.t. } s_0 = \vec{1} \cdot \vec{f}'^T,$$

$$\vec{s}'^T := (s_1', \ldots, s_L')^T := M \cdot \vec{f}'^T,$$

$$\vec{\sigma} := (\sigma_1, \ldots, \sigma_L) \overset{U}{\leftarrow} \mathbb{F}_q^L, \sigma_0 := \vec{1} \cdot \vec{\sigma}^T,$$

for $1 \le i \le L$, if $\rho(i) = (t, \vec{v}_i)$, if $s_i^* \notin \mathbb{V}_t$ return 0, else $\theta_i, \theta_i', \theta_i'' \overset{U}{\leftarrow} \mathbb{F}_q, \vec{\eta}_i \overset{U}{\leftarrow} \mathbb{F}_q^{z_t}$ $$c_i := \overline{(s_i + \theta_i v_{i,1}, \overset{n_t}{\theta_i v_{i,2}, \ldots, \theta_i v_{i,n_t}},}$$

$$\overline{s_i' + \theta_i' v_{i,1}, \overset{n_t}{\theta_i' v_{i,2}, \ldots, \theta_i' v_{i,n_t}},}$$

$$\overline{\sigma_i - \theta_i'' H_2(m, \mathbb{S}), \overset{2}{\theta_i'', 0^{u_t}, 0^{w_t}}, \overset{z_t}{\eta_{i1}, \ldots, \eta_{i,z_t}})\mathbb{B}_t,$$

if $\rho(i) = \neg\,(t, \vec{v}_i)$, if $s_i^* \notin \mathbb{V}_t$ return 0, else $\theta_i'' \overset{U}{\leftarrow} \mathbb{F}_q, \vec{\eta}_i \overset{U}{\leftarrow} \mathbb{F}_q^{z_t}$ $$c_i := \overline{(s_i(v_{i,1}, \ldots, \overset{n_t}{v_{i,n_t}}), s_i'(v_{i,1}, \ldots, \overset{n_t}{v_{i,n_t}}),}$$

$$\overline{\sigma_i - \theta_i'' H_2(m, \mathbb{S}), \overset{2}{\theta_i'', 0^{u_t}, 0^{w_t}}, \overset{z_t}{\eta_{i1}, \ldots, \eta_{i,z_t}})\mathbb{B}_t$$

-continued return 1 if $\prod_{i=1}^{L} e(c_i, s_i^*) = g_T^{s_0} g_0^{\sigma_0}$, return 0 otherwise.

As described above, the signature processing system 10 according to Embodiment 2 implements the multi-authority attribute-based signature scheme in which the plurality of key generation devices 100 generate signing keys. In particular, the signature scheme implemented by the signature processing system 10 is a decentralized multi-authority attribute-based signature scheme with no central authority.

Note that the signature processing system 10 according to Embodiment 2 implements an attribute-based signature scheme with a non-monotone predicate, as the signature processing system 10 according to Embodiment 1 does.

The attribute-based signature scheme implemented by the signature processing system 10 according to Embodiment 2 is highly secure and satisfies privacy requirements.

In the above description, the dimensions $u_t$, $w_t$, and $z_t$ (t=0, ..., d) are provided to enhance the security. Therefore, if $u_t$, $w_t$, and $z_t$ (t=1, ..., d) are each set to 0, the dimensions $u_t$, $w_t$, and $z_t$ (t=1, ..., d) need not be provided, although the security may be degraded.

In the above description, the number of dimensions of each of the basis $B_t$ and the basis $B^*_t$ is set to $2n_t+2+u_t+w_t+z_t$. Alternatively, $2n_t+2+u_t+w_t+z_t$ may be replaced by $2+2+2+6+4+1$, and the number of dimensions of each of the basis $B_t$ and the basis $B^*_t$ may be set to 17.

In this case, the GSetup algorithm indicated in Formula 168 is rewritten as Formula 195.

$GSetup(1^\lambda): param_\mathbb{G} := (q, \mathbb{G}, \mathbb{G}_T, g, e) \xleftarrow{R} \mathcal{G}_{bpg}(1^\lambda),$ [Formula 195]

$H_1: \{0, 1\}^* \to \mathbb{G}; H_2: \{0, 1\}^* \to \mathbb{F}_q;$ $G_0 := H_1(0^\lambda) \in \mathbb{G}, G_1 := H_1(1^\lambda) \in \mathbb{G},$ $G_2 := H_1(1, 0^{\lambda-1}) \in \mathbb{G},$ $G_3 := H_1(0, 1, 0^{\lambda-2}) \in \mathbb{G},$ $G_4 := H_1(1, 1, 0^{\lambda-2}) \in \mathbb{G},$ $g_T := e(G_0, G_1), g_4 := e(G_0, G_4),$ return $gparam :=$ $(param_\mathbb{G}, H_1, H_2, G_0, G_1, G_2, G_3, G_4, g_T, g_4).$ The ASetup algorithm indicated in Formula 174 is rewritten as Formula 196.

$ASetup(gparam, t): param_{\mathbb{V}_t} :=$ [Formula 196]

$(q, \mathbb{V}_t, \mathbb{G}_T, \mathbb{A}_t, e) := \mathcal{G}_{dpvs}(1^\lambda, 17, param_\mathbb{G}),$ $\mathbb{U}_l := (u_{l,1}, \ldots, u_{l,17}),$ where $u_{l,i} := (\overbrace{0, \ldots, 0}^{i-1}, G_l, \overbrace{0, \ldots, 0}^{17-i})$ for $l = 0, \ldots, 4; i = 1, \ldots, 17,$ $X_t \xleftarrow{U} GL(17, \mathbb{F}_q), (\mathbb{B}_t, \mathbb{B}^*_t) := (X_t \mathbb{U}_0, (X_t^T)^{-1} \mathbb{U}_1),$ Let $\pi, \pi', \mu \in \mathbb{F}_q$ s.t. $G_2 = \pi G_1, G_3 = \pi' G_1, G_4 = \mu G_1,$ -continued then $(\pi \mathbb{B}^*_t, \pi' \mathbb{B}^*_t, \mu \mathbb{B}^*_t) =$ $((X_t^T)^{-1}\mathbb{U}_2, (X_t^T)^{-1}\mathbb{U}_3, (X_t^T)^{-1}\mathbb{U}_4),$ $\hat{\mathbb{B}}_t := (b_{t,1}, \ldots, b_{t,6}, b_{t,17}),$ $\hat{\mathbb{B}}^*_t := (\pi b^*_{t,1}, \pi b^*_{t,2}, \pi' b^*_{t,3},$ $\pi' b^*_{t,4}, \mu b^*_{t,5}, \mu b^*_{t,6}, b^*_{t,13}, \ldots, b^*_{t,16}),$ $ask_t := X_t, apk_t := (param_{\mathbb{V}_t}, \hat{\mathbb{B}}_t, \hat{\mathbb{B}}^*_t),$ return $(ask_t, apk_t).$ The AttrGen algorithm indicated in Formula 178 is rewritten as Formula 197.

$AttrGen(gparam, t, ask_t, gid, x_t \in \mathbb{F}_q):$ [Formula 197]

$G_{gid,j}(=\delta_j G_1) := H_1(j, gid) \in \mathbb{G},$ $\vec{\varphi}_{t,j} := (\varphi_{t,j,1}, \ldots, \varphi_{t,j,4}) \xleftarrow{U} \mathbb{F}_q^4$, for $j = 1, 2,$ $k^*_{t,j} := (X_t^T)^{-1}((G_{gid,j} + G_1), x_t(G_{gid,j} + G_1), -G_{gid,j},$ $-x_t G_{gid,j}, 0^8, \varphi_{t,j,1} G_1, \ldots, \varphi_{t,j,4} G_1, 0)$ i.e., $k^*_{t,j} := (\overbrace{(\delta_j+1)(1, x_t)}^{2}, \overbrace{-\delta_j(1, x_t)}^{2}, \overbrace{0^2}^{2}, \overbrace{0^6}^{6}, \overbrace{\vec{\varphi}_{t,j}}^{4}, \overbrace{0}^{1}) \mathbb{B}^*_t,$ for $j = 1, 2,$ return $(usk_{gid,(t,x_t)} := (gid, (t, x_t), \{k^*_{t,j}\}_{j=1,2})).$ The Sig algorithm indicated in Formula 184 is rewritten as Formula 198.

$Sig(gparam, \{apk_t, usk_{gid,(t,x_t)} := (gid, (t, x_t), \{k^*_{t,j}\}_{j=1,2}\},$ [Formula 198]

$m, \mathbb{S} := (M, \rho))$ If $\mathbb{S} :=$ $(M, \rho)$ accepts $\Gamma := \{(t, x_t) \in usk_{gid,(t,x_t)}\},$ then compute $I$ and $\{\alpha_i\}_{i \in I}$ such that $\vec{1} :=$ $\sum_{i \in I} \alpha_i M_i$ where $M_i$ is the $i$-th row of $M$, and $I \subseteq$ $\{i \in \{1, \ldots, L\} \mid [\rho(i) = (t, v_i) \land (t, x_t) \in \Gamma \land v_i = x_t] \lor$ $[\rho(i) = \neg(t, v_i) \land (t, x_t) \in \Gamma \land v_i \neq x_t]\},$ $\xi_1, \xi_2 \xleftarrow{U} \mathbb{F}_q, (\beta_i),$ $(\beta'_i) \xleftarrow{U} \{(\beta_1, \ldots, \beta_L) \mid \sum_{i=1}^{L} \beta_i M_i = \vec{0}\},$ $g_0 := g_4^{\xi_2}, s^*_i := \gamma_i \cdot (\xi_1 k^*_{t,1} + (1-\xi_1) k^*_{t,2}) +$ $\sum_{t=1}^{2} y_{i,t}(\pi b^*_{t,l}) + \sum_{l=3}^{4} y_{i,l}(\pi' b^*_{t,l}) +$ $\xi_2((\mu b^*_{t,5}) + H_2(m, \mathbb{S})(\mu b^*_{t,6})) + r^*_i$, for $1 \leq$ $i \leq L$, where $r^*_i \xleftarrow{U} span\langle b^*_{t,13}, \ldots, b^*_{t,16}\rangle,$ and $\gamma_i, \vec{y}_i := (y_{i,1}, \ldots, y_{i,4})$ are defined as if $i \in I \land \rho(i) = (t, v_i), \gamma_i := \alpha_i,$ $\vec{y}_i := (\beta_i(1, v_i), \beta'_i(1, v_i)),$ if $i \in I \land \rho(i) = \neg(t, v_i), \gamma_i := \frac{\alpha_i}{v_i - x_t},$ -continued $$\vec{y}_i := \left(\frac{\beta_i}{v_i - y_i}(1, y_i), \frac{\beta'_i}{v_i - y'_i}(1, y'_i)\right)$$

$$\left(y_i, y'_i \xleftarrow{U} \mathbb{F}_q \setminus \{v_i\}\right),$$

if $i \notin I \wedge \rho(i) = (t, v_i), \gamma_i := 0,$ $$\vec{y}_i := (\beta_i(1, v_i), \beta'_i(1, v_i)),$$

if $i \notin I \wedge \rho(i) = \neg (t, v_i), \gamma_i := 0, \vec{y}_i := \left(\frac{\beta_i}{v_i - y_i}(1, y_i),\right.$ $$\left.\frac{\beta'_i}{v_i - y'_i}(1, y'_i)\right) \left(y_i, y'_i \xleftarrow{U} \mathbb{F}_q \setminus \{v_i\}\right),$$

$$\text{return } \vec{s}^* := (s_0^*, \ldots, s_L^*, g_0).$$

The Ver algorithm indicated in Formula 194 is rewritten as Formula 199.

$$Ver(gparam, apk_t, m, \mathbb{S} := (M, \rho), \vec{s}^*) \vec{f} \xleftarrow{U} \mathbb{F}_q^r, \quad [\text{Formula 199}]$$

$$\vec{s}^T := (s_1, \ldots, s_L)^T := M \cdot \vec{f}^T, s_0 := \vec{1} \cdot \vec{f}^T, \vec{f}' \xleftarrow{R} \mathbb{F}_q^r,$$

$$\text{s.t. } s_0 = \vec{1} \cdot \vec{f}'^T, \vec{s}'^T := (s'_1, \ldots, s'_L)^T := M \cdot \vec{f}'^T,$$

$$\vec{\sigma} := (\sigma_1, \ldots, \sigma_L) \xleftarrow{U} \mathbb{F}_q^L, \sigma_0 := \vec{1} \cdot \vec{\sigma}^T, \text{ for } 1 \leq i \leq L,$$

if $\rho(i) = (t, v_i)$, return 0 if $s_i^* \notin \mathbb{V}_t$, else $\theta_i, \theta'_i, \theta''_i, \eta_i \xleftarrow{U} \mathbb{F}_q$, $$c_i := \left(\frac{2}{s_i + \theta_i v_i}, -\theta_i, \frac{2}{s'_i + \theta'_i v_i}, -\theta'_i,\right.$$

$$\left.\frac{2}{\sigma_i - \theta''_i H_2(m, \mathbb{S})}, \theta''_i, 0^6, 0^4, \frac{1}{\eta_i}\right) \mathbb{B}_t,$$

if $\rho(i) = \neg (t, v_i)$, return 0 if $s_i^* \notin \mathbb{V}_t$, else $\theta''_i \xleftarrow{U} \mathbb{F}_q, \eta_i \xleftarrow{U} \mathbb{F}_q,$ $$c_i := \left(\frac{2}{s_i(v_i, -1)}, \frac{2}{s'_i(v_i, -1)}, \frac{2}{\sigma_i - \theta''_i H_2(m, \mathbb{S})}, \theta''_i, 0^6,\right.$$

$$\left.0^4, \frac{1}{\eta_i}\right) \mathbb{B}_t, \text{ return } 1$$

if $\prod_{i=1}^L e(c_i, s_i^*) = g_T^{s_0} g_0^{\sigma_0}$, return 0 otherwise.

The GSetup algorithm may be executed only once by one generation device 100 at the setup of the signature processing system 10, and need not be executed every time a signing key is to be generated. Likewise, the ASetup algorithm may be executed only once by each key generation device 100 at the setup of the signature processing system 10, and need not be executed every time a signing key is to be generated.

In the above explanation, the GSetup algorithm, the ASetup algorithm, and the KeyGen algorithm are executed by the key generation device 100. Alternatively, the GSetup algorithm, the ASetup algorithm, and the KeyGen algorithm may be executed by different devices.

Embodiment 3

In the above embodiments, the method of implementing the signature process in the dual vector spaces has been described. In Embodiment 3, a method of implementing a signature process in dual additive groups will be described.

More specifically, in the above embodiments, the signature process is implemented in the cyclic group of the prime order q. When a ring R is expressed as indicated in Formula 200 using a composite number M, the signature process described in the above embodiments can also be applied to a module having the ring R as a coefficient.

$$\mathbb{R} := \mathbb{Z}/M\mathbb{Z} \quad [\text{Formula 200}]$$

where $\mathbb{Z}$: an integer; and

M: a composite number

When the attribute-based signature scheme described in Embodiment 1 is implemented in the additive group having the ring R as a coefficient, then Formulas 201 to 205 are resulted.

[Formula 201]

$$Setup(1^\lambda, \vec{n} := (d; n_t, u_t, w_t, z_t)(t = 0, \ldots, d+1))$$

$$hk \xleftarrow{R} KH_\lambda, n_0 := 1, n_{d+1} := 2,$$

$$hk \xleftarrow{R} KH_\lambda, n_0 := 1, n_{d+1} := 2,$$

$$\left(\text{param}_{\vec{n}}, \{\mathbb{B}_t, \mathbb{B}_t^*\}_{t=0,\ldots,d+1}\right) \xleftarrow{R} \mathcal{G}_{ob}(1^\lambda, \vec{n}),$$

$$\hat{\mathbb{B}}_t := (b_{t,1}, \ldots, b_{t,n_t}, b_{t,n_t+u_t+w_t+1}, \ldots, b_{t,n_t+u_t+w_t+z_t})$$

for $t = 0, \ldots, d+1,$ $$\hat{\mathbb{B}}_t^* := (b_{t,1}^*, \ldots, b_{t,n_t}^*, b_{t,n_t+u_t+1}^*, \ldots, b_{t,n_t+u_t+w_t}^*)$$

for $t = 1, \ldots, d+1, sk := b_{0,1}^*,$ $pk :=$ $$\left(1^\lambda, hk, \text{param}_{\vec{n}}, \{\hat{\mathbb{B}}_t\}_{t=0,\ldots,d+1}, \{\hat{\mathbb{B}}_t^*\}_{t=1,\ldots,d+1}, b_{0,1+u_0+1}^*, \ldots, b_{0,1+u_0+w_0}^*\right).$$

return $sk, pk.$

[Formula 202]

$$\mathcal{G}_{ob}(1^\lambda, \vec{n} := (d; n_t, u_t, w_t, z_t)(t = 0, \ldots, d+1)):$$

$$\text{param}_\mathbb{G} := (q, \mathbb{G}, \mathbb{G}_T, g, e) \xleftarrow{R} \mathcal{G}_{bpg}(1^\lambda),$$

$$\psi \xleftarrow{U} \mathbb{R}^\times,$$

$$N_t := n_t + u_t + w_t + z_t \text{ for } t = 0, \ldots, d+1,$$

For $t = 0, \ldots, d+1,$ $$\text{param}_{\mathbb{V}_t} := (q, \mathbb{V}_t, \mathbb{G}_T, \mathbb{A}_t, e) := \mathcal{G}_{dpvs}(1^\lambda, N_t, \text{param}_\mathbb{G}),$$

$$X_t := (\chi_{t,i,j})_{i,j} \xleftarrow{U} GL(N_t, \mathbb{R}), (v_{t,i,j})_{i,j} := \psi \cdot (X_t^T)^{-1},$$

$$b_{t,i} := (\chi_{t,i,1}, \ldots, \chi_{t,i,N_t})_{\mathbb{A}_t} = \sum_{j=1}^{N_t} \chi_{t,i,j} a_{t,j},$$

$$\mathbb{B}_t := (b_{t,1}, \ldots, b_{t,N_t}), b_{t,i}^* := (v_{t,i,1}, \ldots, v_{t,i,N_t})_{\mathbb{A}_t} = \sum_{j=1}^{N_t} v_{t,i,j} a_{t,j},$$

$$\mathbb{B}_t^* := (b_{t,1}^*, \ldots, b_{t,N_t}^*),$$

$$g_T := e(g, g)^\psi, \text{param}_{\vec{n}} := \left(\{\text{param}_{\mathbb{V}_t}\}_{t=0,\ldots,d+1}, g_T\right)$$

$$\text{return}\left(\text{param}_{\vec{n}}, \{\mathbb{B}_t, \mathbb{B}_t^*\}_{t=0,\ldots,d+1}\right).$$

[Formula 203]

$$KeyGen(pk, sk, \Gamma := \{(t, \vec{x}_t := (x_{t,1}, \ldots, x_{t,n_t}) \in \mathbb{R}^{n_t}) \mid 1 \leq t \leq d\})$$

$$\delta \xleftarrow{U} \mathbb{R}^\times,$$

$$\vec{\varphi}_0 \xleftarrow{U} \mathbb{R}^{w_0},$$

$$\vec{\varphi}_t \xleftarrow{U} \mathbb{R}^{w_t} \text{ for } t = 1, \ldots, d,$$

-continued $\vec{\varphi}_{d+1,1}, \vec{\varphi}_{d+1,2} \xleftarrow{U} \mathbb{R}^{w_{d+1}},$ $k_0^* := \left(\delta, \dfrac{u_0}{0^{u_0}}, \dfrac{w_0}{\varphi_{0,1}, \ldots, \varphi_{0,w_0}}, \dfrac{z_0}{0^{z_0}}\right)\mathbb{B}_0^*,$ $k_t^* := \left(\overline{\delta(x_{t,1}, \ldots, x_{t,n_t})}, \dfrac{u_t}{0^{u_t}}, \overline{\varphi_{t,1}, \ldots, \varphi_{t,w_t}}, \dfrac{z_t}{0^{z_t}}\right)\mathbb{B}_t^*$ for $(t, \vec{x}_t) \in \Gamma,$ $k_{d+1,1}^* := \left(\dfrac{2}{\delta(1,0), 0^{u_{d+1}}}, \dfrac{w_{d+1}}{\varphi_{d+1,1,1}, \ldots, \varphi_{d+1,1,w_{d+1}}}, \dfrac{z_{d+1}}{0^{z_{d+1}}}\right)\mathbb{B}_{d+1}^*,$ $k_{d+1,2}^* := \left(\dfrac{2}{\delta(0,1), 0^{u_{d+1}}}, \dfrac{w_{d+1}}{\varphi_{d+1,2,1}, \ldots, \varphi_{d+1,2,w_{d+1}}}, \dfrac{z_{d+1}}{0^{z_{d+1}}}\right)\mathbb{B}_{d+1}^*,$ $T := \{0, (d+1, 1), (d+1, 2)\} \cup \{t \mid 1 \leq t \leq d, (t, \vec{x}_t) \in \Gamma\},$ return $sk_\Gamma := (\Gamma, \{k_t^*\}_{t \in T}).$

[Formula 204]

$Sig(pk, sk_\Gamma, m, \mathbb{S} := (M, \rho))$

If $\mathbb{S} := (M, \rho)$ accepts $\Gamma := \{(t, \vec{x}_t)\},$ then compute $I$ and $\{\alpha_i\}_{i \in I}$ such that $\sum_{i \in I} \alpha_i M_i := \vec{1}$ and $I \subseteq \{i \in \{1, \ldots, L\} \mid [\rho(i) = (t, \vec{v}_i) \wedge (t, \vec{x}_t) \in \Gamma \wedge \vec{v}_i \cdot \vec{x}_t = 0] \vee [$ $\rho(i) = \neg(t, \vec{v}_i) \wedge (t, \vec{x}_t) \in \Gamma \wedge \vec{v}_i \cdot \vec{x}_t \neq 0]\},$ $\xi \xleftarrow{U} \mathbb{R}^\times, (\beta_i) \xleftarrow{U} \left\{(\beta_1, \ldots, \beta_L) \mid \sum_{i=1}^L \beta_i M_i = \vec{0}\right\},$ $s_0^* := \xi k_0^* + r_0^*,$ where $r_0^* \xleftarrow{U} \text{span}\langle b_{0,1+u_0+1}^*, \ldots, b_{0,1+u_0+w_0}^* \rangle$ $s_i^* := \gamma_i \cdot \xi k_t^* + \sum_{t=1}^{n_t} y_{i,t} \cdot b_{t,t}^* + r_i^*,$ for $1 \leq i \leq L,$ where $r_i^* \xleftarrow{U} \text{span}\langle b_{t,n_t+u_t+1}^*, \ldots, b_{t,n_t+u_t+w_t}^* \rangle,$ and $\gamma_i, \vec{y}_i := (y_{i,1}, \ldots, y_{i,n_t})$ are defined as if $i \in I \wedge \rho(i) = (t, v_i),$ $\gamma_i := \alpha_i, \vec{y}_i \xleftarrow{U} \{\vec{y}_i \mid \vec{y}_i \cdot \vec{v}_i = 0 \wedge y_{i,1} = \beta_i\},$ if $i \in I \wedge \rho(i) = \neg(t, v_i), \gamma_i := \dfrac{\alpha_i}{\vec{v}_i \cdot \vec{x}_t},$ $y_i \xleftarrow{U} \{\vec{y}_i \mid \vec{y}_i \cdot \vec{v}_i = \beta_i\},$ if $i \notin I \wedge \rho(i) = (t, v_i), \gamma_i := 0,$ $\vec{y}_i \xleftarrow{U} \{\vec{y}_i \mid \vec{y}_i \cdot \vec{v}_i = 0 \wedge y_{i,1} = \beta_i\},$ if $i \notin I \wedge \rho(i) = \neg(t, v_i), \gamma_i := 0,$ $\vec{y}_i \xleftarrow{U} \{\vec{y}_i \mid \vec{y}_i \cdot \vec{v}_i = \beta_i\},$ $s_{L+1}^* := \xi(k_{d+1,1}^* + H_{hk}^{\lambda,D}(m \| \mathbb{S}) \cdot k_{d+1,2}^*) + r_{L+1}^*,$ where $r_{L+1}^* \xleftarrow{U} \text{span}\langle b_{d+1,2+u_{d+1}+1}^*, \ldots, b_{d+1,2+u_{d+1}+w_{d+1}}^* \rangle,$ return $\vec{s}^* := (s_0^*, \ldots, s_{L+1}^*).$

[Formula 205]

$Ver(pk, m, \mathbb{S} := (M, \rho), \vec{s}^*)$ $\vec{f} \xleftarrow{U} \mathbb{R}^r, \vec{s}^T := (s_1, \ldots, s_L)^T := M \cdot \vec{f}^T, s_0 := \vec{1} \cdot \vec{f}^T,$ $\vec{\eta}_0 \xleftarrow{U} \mathbb{R}^{z_0}, \eta_{L+1} \xleftarrow{U} \mathbb{R}^{z_{d+1}}, \theta_{L+1}, s_{L+1} \xleftarrow{U} \mathbb{R},$ $c_0 := \left(-s_0 - s_{L+1}, \dfrac{u_0}{0^{u_0}}, \dfrac{w_0}{0^{w_0}}, \dfrac{z_0}{\eta_{0,1}, \ldots, \eta_{0,z_0}}\right)\mathbb{B}_0,$ for $1 \leq i \leq L,$ -continued if $\rho(i) = (t, \vec{v}_i := (v_{i,1}, \ldots, v_{i,n_t}) \in \mathbb{R}^{n_t}),$ if $s_i^* \notin \mathbb{V}_t$ return 0, else $\theta_i \xleftarrow{U} \mathbb{R}, \vec{\eta}_i \xleftarrow{U} \mathbb{R}^{z_t},$ $c_i :=$ $\left(\overline{s_i + \theta_i v_{i,1}, \theta_i v_{i,2}, \ldots, \theta_i v_{i,n_t}}, \dfrac{u_t}{0^{u_t}}, \dfrac{w_t}{0^{w_t}}, \overline{\eta_{i,1}, \ldots, \eta_{i,z_t}}\right)\mathbb{B}_t,$ if $\rho(i) = \neg(t, \vec{v}_i := (v_{i,1}, \ldots, v_{i,n_t}) \in \mathbb{R}^{n_t}),$ if $s_i^* \notin \mathbb{V}_t$ return 0, else $\vec{\eta}_i \xleftarrow{U} \mathbb{R}^{z_t},$ $c_i := \left(\overline{s_i(v_{i,1}, \ldots, v_{i,n_t})}, \dfrac{u_t}{0^{u_t}}, \dfrac{w_t}{0^{w_t}}, \overline{\eta_{i,1}, \ldots, \eta_{i,z_t}}\right)\mathbb{B}_t,$ $c_{L+1} :=$ $\left(\dfrac{2}{s_{L+1} - \theta_{L+1} H_{hk}^{\lambda,D}(m \| \mathbb{S}), \theta_{L+1}}, \dfrac{u_{d+1}}{0^{u_{d+1}}}, \dfrac{w_{d+1}}{0^{w_{d+1}}}, \dfrac{z_{d+1}}{\eta_{L+1,1}, \ldots, \eta_{L+1,z_{d+1}}}\right)\mathbb{B}_{d+1}$ return 0 if $e(b_{0,1}, s_0^*) = 1,$ return 1 if $\prod_{i=0}^{L+1} e(c_i, s_i^*) = 1,$ return 0 otherwise.

When the decentralized multi-authority attribute-based signature scheme described in Embodiment 2 is implemented in the additive group having the ring R as a coefficient, then Formulas 206 to 210 are resulted.

$GSetup(1^\lambda): param_\mathbb{G} := (q, \mathbb{G}, \mathbb{G}_T, g, e) \xleftarrow{R} \mathcal{G}_{bpg}(1^\lambda),$ [Formula 206]

$H_1 := \{0, 1\}^* \to \mathbb{G};$ $H_2 := \{0, 1\}^* \to \mathbb{R};$ $G_0 := H_1(0^\lambda) \in \mathbb{G},$ $G_1 := H_1(1^\lambda) \in \mathbb{G},$ $G_2 := H_1(1, 0^{\lambda-1}) \in \mathbb{G},$ $G_3 := H_1(0, 1, 0^{\lambda-2}) \in \mathbb{G},$ $G_4 := H_1(1, 1, 0^{\lambda-2}) \in \mathbb{G},$ $g_T := e(G_0, G_1),$ $g_4 := e(G_0, G_4),$ return $gparam :=$ $(param_\mathbb{G}, H_1, H_2, G_0, G_1, G_2, G_3, G_4, g_T, g_4).$ $ASetup(gparam, t): N_t := 2n_t + 2 + u_t + w_t + z_t,$ [Formula 207]

$param_{\mathbb{V}_t} := (q, \mathbb{V}_t, \mathbb{G}_T, \mathbb{A}_t, e) := \mathcal{G}_{dpvs}(1^\lambda, N_t, param_\mathbb{G}),$ $\mathbb{U}_l := (u_{l,1}, \ldots, u_{l,N_t}),$ where $u_{l,i} := \left(\overline{0, \ldots, 0}, G_l, \overline{0, \ldots, 0}\right)$ for $l = 0, \ldots, 4; \quad i = 1, \ldots, N_t,$ $X_t \xleftarrow{U} GL(N_t, \mathbb{R}),$ $(\mathbb{B}_t, \mathbb{B}_t^*) := (X_t(\mathbb{U}_0), (X_t^T)^{-1}(\mathbb{U}_1)),$ Let $\pi, \pi', \mu \in \mathbb{R}$ s.t.

$G_2 = \pi G_1,$ $G_3 = \pi' G_1,$ $G_4 = \mu G_1,$ then

-continued $(\pi \mathbb{B}_t^*, \pi' \mathbb{B}_t^*, \mu \mathbb{B}_t^*) =$
$\quad \left((X_t^T)^{-1}(\mathbb{U}_2), (X_t^T)^{-1}(\mathbb{U}_3), (X_t^T)^{-1}(\mathbb{U}_4)\right),$ $\hat{\mathbb{B}}_t := (b_{t,1}, \ldots, b_{t,2n_t+2}, b_{t,2n_t+2+u_t+w_t+1},$
$\quad \ldots, b_{t,2n_t+2+u_t+w_t+z_t}),$ $\hat{\mathbb{B}}_t^* := (\pi(b_{t,1}^*, \ldots, b_{t,n_t}^*), \pi'(b_{t,n_t+1}^*, \ldots, b_{t,2n_t}^*),$
$\quad \mu(b_{t,2n_t+1}^*, b_{t,2n_t+2}^*), b_{t,2n_t+2+u_t+1}^*, \ldots, b_{t,2n_t+2+u_t+w_t}^*),$ $ask_t := X_t, apk_t := (param_{\mathbb{V}_t}, \hat{\mathbb{B}}_t, \hat{\mathbb{B}}_t^*), \text{return}(ask_t, apk_t).$ $AttrGen(gparam, t, ask_t, gid, \vec{x}_t := (x_{t,1}, \ldots, x_{t,n_t}) \in \mathbb{R}):$ [Formula 208]

$\quad G_{gid,j}(=\delta_j G_1) := H_1(j, gid) \in \mathbb{G},$ $\quad \varphi_{t,j} \xleftarrow{U} \mathbb{R}^{w_t}, \text{for } j = 1, 2,$ $\quad k_{t,j}^* := k_{t,j}^* := (X_t^T)^{-1}((G_{gid,j} + G_1)\vec{x}_t, -\vec{x}_t G_{gid,j},$
$\quad 0^{2+u_t}, \varphi_{t,j,1} G_1, \ldots, \varphi_{t,j,w_t} G_1, 0^{z_t})$ i.e., $k_{t,j}^* := \left( \overbrace{(\delta_j + 1)(x_{t,1}, \ldots, x_{t,n_t})}^{n_t}, \overbrace{-\delta_j(x_{t,1}, \ldots, x_{t,n_t})}^{n_t}, \overbrace{0^2}^{2}, \right.$ $\quad \left. \overbrace{0^{u_t}}^{u_t}, \overbrace{\varphi_{t,j,1}, \ldots, \varphi_{t,j,w_t}}^{w_t}, \overbrace{0^{z_t}}^{z_t} \right) \mathbb{B}_t^*,$ for $j = 1, 2$, return $(usk_{gid,(t,x_t)} := (gid, (t, \vec{x}_t), \{k_{t,j}^*\}_{j=1,2})).$ $Sig(gparam, \{apk_t,$ [Formula 209]

$\quad usk_{gid,(t,x_t)} := (gid, (t, \vec{x}_t), \{k_{t,j}^*\}_{j=1,2}\}, m, \mathbb{S} := (M, \rho))$ If $\mathbb{S} := (M, \rho)$ accepts $\Gamma := \{(t, \vec{x}_t) \in usk_{gid,(t,x_t)}\},$ then compute $I$ and $\{\alpha_i\}_{i \in I}$ such that $\vec{1} := \sum_{i \in I} \alpha_i M_i$ where $M_i$ is the $i$-th row of $M$, and $I \subseteq \{i \in \{1, \ldots, L\} |$ $[\rho(i) = (t, \vec{v}_i) \wedge (t, \vec{x}_t) \in \Gamma \wedge \vec{v}_i \cdot \vec{x}_t = 0] \vee$ $[\rho(i) = \neg (t, \vec{v}_i) \wedge (t, \vec{x}_t) \in \Gamma \wedge \vec{v}_i \cdot \vec{x}_t \neq 0]\}, \xi_1,$ $\xi_2 \xleftarrow{U} \mathbb{R}, (\beta_i), (\beta_i') \xleftarrow{U} \left\{ (\beta_1, \ldots, \beta_L) \middle| \sum_{i=1}^{L} \beta_i M_i = \vec{0} \right\},$ $g_0 := g_4^{\xi_2},$ $s_i^* := \gamma_i \cdot (\xi_1 k_{t,1}^* + (1 - \xi_1) k_{t,2}^*) +$ $\quad \sum_{t=1}^{n_t} y_{i,t}(\pi b_{t,t}^*) + \sum_{t=1}^{n_t} y_{i,t}'(\pi' b_{t,n_t+t}^*) +$ $\quad \xi_2((\mu b_{t,2n_t+1}^*) + H_2(m, \mathbb{S})(\mu b_{t,2n_t+2}^*)) + r_i^*,$ for $1 \leq i \leq L$, where $r_i^* \xleftarrow{U} \text{span}\langle b_{t,2n_t+2+u_t+1}^*, \ldots, b_{t,2n_t+2+u_t+w_t}^* \rangle,$ and $\gamma_i, \vec{y}_i := (y_{i,1}, \ldots, y_{i,n_t}),$ $\quad \vec{y}_i' := (y_{i,1}', \ldots, y_{i,n_t}')$ are defined as if $i \in I \wedge \rho(i) = (t, \vec{v}_i), \gamma_i := \alpha_i,$ $\vec{y}_i \xleftarrow{U} \{\vec{y}_i \mid \vec{y}_i \cdot \vec{v}_i = 0 \wedge y_{i,1} = \beta_i\},$ $\vec{y}_i' \xleftarrow{U} \{\vec{y}_i' \mid \vec{y}_i' \cdot \vec{v}_i = 0 \wedge y_{i,1}' = \beta_i'\},$ if $i \in I \wedge \rho(i) = \neg (t, \vec{v}_i), \gamma_i := \dfrac{\alpha_i}{\vec{v}_i \cdot \vec{x}_t},$ $\vec{y}_i \xleftarrow{U} \{\vec{y}_i \mid \vec{y}_i \cdot \vec{v}_i = \beta_i\}, \vec{y}_i' \xleftarrow{U} \{\vec{y}_i' \mid \vec{y}_i' \cdot \vec{v}_i = \beta_i'\},$ -continued if $i \notin I \wedge \rho(i) = (t, \vec{v}_i), \gamma_i := 0,$ $\vec{y}_i \xleftarrow{U} \{\vec{y}_i \mid \vec{y}_i \cdot \vec{v}_i = 0 \wedge y_{i,1} = \beta_i\},$ $\vec{y}_i' \xleftarrow{U} \{\vec{y}_i' \mid \vec{y}_i' \cdot \vec{v}_i = 0 \wedge y_{i,1}' = \beta_i'\},$ if $i \notin I \wedge \rho(i) = \neg (t, \vec{v}_i), \gamma_i := 0, \vec{y}_i \xleftarrow{U} \{\vec{y}_i \mid \vec{y}_i \cdot \vec{v}_i = \beta_i\},$ $\vec{y}_i' \xleftarrow{U} \{\vec{y}_i' \mid \vec{y}_i' \cdot \vec{v}_i = \beta_i'\}, \text{ return } \vec{s}^* := (s_0^*, \ldots, s, g_0).$ $Ver(gparam, apk_t, m, \mathbb{S} := (M, \rho), \vec{s}^*) \vec{f} \xleftarrow{U} \mathbb{R}^r,$ [Formula 210]

$\vec{s}^T := (s_1, \ldots, s_L)^T := M \cdot \vec{f}^T, s_0 := \vec{1} \cdot \vec{f}^T, \vec{f}' \xleftarrow{R} \mathbb{R}^r,$ s.t. $s_0 = \vec{1} \cdot \vec{f}'^T, \vec{s}'^T := (s_1', \ldots, s_L')^T := M \cdot \vec{f}'^T,$ $\vec{\sigma} := (\sigma_1, \ldots, \sigma_L) \xleftarrow{U} \mathbb{R}^L, \sigma_0 := \vec{1} \cdot \vec{\sigma}^T, \text{ for } 1 \leq i \leq L,$ if $\rho(i) = (t, \vec{v}_i),$ if $s_i^* \notin \mathbb{V}_t$ return 0, else $\theta_i, \theta_i', \theta_i'' \xleftarrow{U} \mathbb{R}, \vec{\eta}_i \xleftarrow{U} \mathbb{R}^{z_t}$ $c_i := \left( \overbrace{s_i + \theta_i v_{i,1}, \theta_i v_{i,2}, \ldots, \theta_i v_{i,n_t}}^{n_t}, \right.$ $\quad \overbrace{s_i' + \theta_i' v_{i,1}, \theta_i' v_{i,2}, \ldots, \theta_i' v_{i,n_t}}^{n_t},$ $\quad \left. \overbrace{\sigma_i - \theta_i'' H_2(m, \mathbb{S}), \theta_i''}^{2}, \overbrace{0^{u_t}}^{u_t}, \overbrace{0^{w_t}}^{w_t}, \overbrace{\eta_{i,1}, \ldots, \eta_{i,z_t}}^{z_t} \right) \mathbb{B}_t,$ if $\rho(i) = \neg (t, \vec{v}_i),$ if $s_i^* \notin \mathbb{V}_t$ return 0, else $\theta_i'' \xleftarrow{U} \mathbb{R}, \vec{\eta}_i \xleftarrow{U} \mathbb{R}^{z_t}$ $c_i :=$ $\left( \overbrace{s_i(v_{i,1}, \ldots, v_{i,n_t})}^{n_t}, \overbrace{s_i'(v_{i,1}, \ldots, v_{i,n_t})}^{n_t}, \overbrace{\sigma_i - \theta_i'' H_2(m, \mathbb{S}), \theta_i''}^{2}, \right.$ $\quad \left. \overbrace{0^{u_t}}^{u_t}, \overbrace{0^{w_t}}^{w_t}, \overbrace{\eta_{i,1}, \ldots, \eta_{i,z_t}}^{z_t} \right) \mathbb{B}_t,$ return 1 if $\prod_{i=1}^{L} e(c_i, s_i^*) = g_T^{s_0} g_0^{\sigma_0}$, return 0 otherwise.

From the viewpoint of security proof, in the above embodiments, ρ(i) for each integer i=1, ..., L may be limited to a positive tuple (t, $\vec{v}_i$) or negative tuple ¬ (t, $\vec{v}_i$) for different identification information t.

In other words, when ρ(i)=(t, $\vec{v}_i$) or ρ(i)=¬ (t, $\vec{v}_i$), let a function ρ~ be map of {1, ..., L}→{1, ..., d} with which ρ~(i)=t is established. In this case, ρ~ may be limited to injection. Note that ρ(i) is ρ(i) in the access structure S:=(M, ρ(i)) described above.

In the above description, the span program M^ accepts the input sequence δ if and only if linear combination of the rows of the matrix $M_\delta$ obtained from the matrix^ by the input sequence δ gives $\vec{1}$. Alternatively, the span program M^ may accept the input sequence δ if and only if another vector $\vec{h}$ is obtained instead of $\vec{1}$.

In this case, in the KeyGen algorithm, $s_0 := \vec{h} \cdot \vec{f}^T$ may be set instead of $s_0 := \vec{1} \cdot \vec{f}^T$.

The hardware configuration of the signature processing system 10 (the key generation device 100, the signature device 200, and the verification device 300) in the above embodiments will be described.

Figure 23:
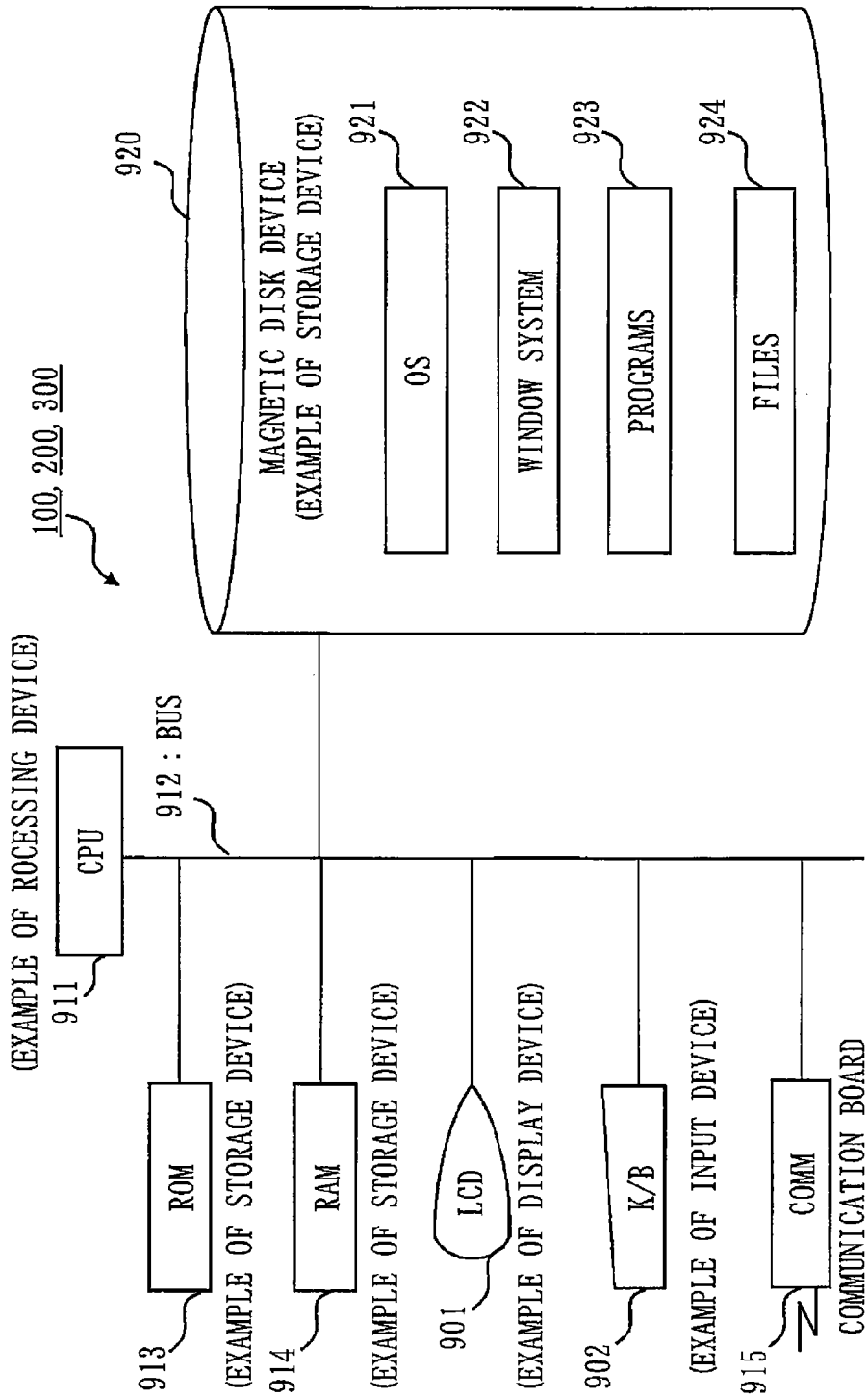
FIG. 23 is a diagram showing an example of the hardware configuration of the key generation device 100, the signature device 200, and the verification device 300.

FIG. 23 is a diagram showing an example of the hardware configuration of each of the key generation device 100, signature device 200, and verification device 300.

As shown in FIG. 23, each of the key generation device 100, signature device 200, and verification device 300 includes the CPU 911 (also referred to as a Central Processing Unit, central processing device, processing device, computation device, microprocessor, microcomputer, or processor) which executes programs. The CPU 911 is connected to the ROM 913, the RAM 914, an LCD 901 (Liquid Crystal Display), a keyboard 902 (K/B), the communication board 915, and the magnetic disk device 920 via a bus 912, and controls these hardware devices. In place of the magnetic disk device 920 (fixed disk device), a storage device such as an optical disk device or memory card read/write device may be employed. The magnetic disk device 920 is connected via a predetermined fixed disk interface.

The ROM 913 and the magnetic disk device 920 are examples of a nonvolatile memory. The RAM 914 is an example of a volatile memory. The ROM 913, the RAM 914, and the magnetic disk device 920 are examples of the storage device (memory). The keyboard 902 and the communication board 915 are examples of an input device. The communication board 915 is an example of a communication device. Furthermore, the LCD 901 is an example of a display device.

The magnetic disk device 920, ROM 913, or the like stores an operating system 921 (OS), a window system 922, programs 923, and files 924. The CPU 911, the operating system 921, and the window system 922 execute each program of the programs 923.

The programs 923 store software and programs that execute the functions described as the "master key generation part 110", "master key storage part 120", "information input part 130", "signing key generation part 140", "key distribution part 150", "signing key acquisition part 210", "information input part 220", "span program calculation part 230", "complementary coefficient calculation part 240", "signature data generation part 250", "signature data transmission part 260", "public parameter acquisition part 310", "data reception part 320", "verification key generation part 330", "pairing operation part 340", and the like in the above description. The programs 923 store other programs as well. The programs are read and executed by the CPU 911.

The files 924 store information, data, signal values, variable values, and parameters such as the "public parameter", "master key", "signature data σ", "signing key", "access structure S", "attribute information", "attribute set Γ", "message m", and the like of the above explanation, as the items of a "file" and "database". The "file" and "database" are stored in a recording medium such as a disk or memory. The information, data, signal values, variable values, and parameters stored in the recording medium such as the disk or memory are read out to the main memory or cache memory by the CPU 911 through a read/write circuit, and are used for the operations of the CPU 911 such as extraction, search, look-up, comparison, computation, calculation, process, output, print, and display. The information, data, signal values, variable values, and parameters are temporarily stored in the main memory, cache memory, or buffer memory during the operations of the CPU 1911 including extraction, search, look-up, comparison, computation, calculation, process, output, print, and display.

The arrows of the flowcharts in the above explanation mainly indicate input/output of data and signals. The data and signal values are stored in the memory of the RANI 914, the recording medium such as an optical disk, or in an IC chip. The data and signals are transmitted online via a transmission medium such as the bus 912, signal lines, or cables; or electric waves.

The "part" in the above explanation may be a "circuit", "device", "equipment", "means" or "function"; or a "step", "procedure", or "process". The "device" may be a "circuit", "equipment", "means", or "function"; or a "step", "procedure", or "process". The "process" may be a "step". Namely, the "part" may be implemented as firmware stored in the ROM 913. Alternatively, the "part" may be practiced as only software; as only hardware such as an element, a device, a substrate, or a wiring line; as a combination of software and hardware; or furthermore as a combination of software, hardware, and firmware. The firmware and software are stored, as programs, in the recording medium such as the ROM 913. The program is read by the CPU 911 and executed by the CPU 911. Namely, the program causes the computer to function as a "part" described above. Alternatively, the program causes the computer or the like to execute the procedure and method of the "part" described above.

REFERENCE SIGNS LIST

10: signature processing system; 100: key generation device; 110: master key generation part; 111: global parameter generation part; 112: authority secret key generation part; 120: master key storage part; 130: information input part; 140: signing key generation part; 141: random number generation part; 142: key element 0 generation part; 143: key element t generation part; 144: key element d+1 generation part; 145: key element generation part; 150: key distribution part; 200: signature device; 210: signing key acquisition part; 220: information input part; 221: predicate information input part; 222: message input part; 230: span program calculation part; 240: complementary coefficient calculation part; 250: signature data generation part; 251: random number generation part; 252: signature element 0 generation part; 253: signature element i generation part; 254: signature element L+1 generation part; 255: signature element generation part; 260: signature data transmission part; 300: verification device; 310: public parameter acquisition part; 320: data reception part; 330: verification key generation part; 331: random number generation part; 332: f vector generation part; 333: s vector generation part; 334: verification element 0 generation part; 335: verification element i generation part; 336: verification element L+1 generation part; 337: verification element generation part; 340: pairing operation part.

The invention claimed is:

1. A signature processing system comprising:
a key generation device, a signature device, and a verification device, and serving to execute a signature process using a basis $B_t$ and a basis $B^*_t$ for each integer $t=0, \ldots, d+1$ (d is an integer of 1 or more),
wherein the key generation device includes
a first information input part which takes as input an attribute set Γ including identification information t and attribute information $\vec{x}_t := (x_{t,i})$ ($i=1, \ldots, n_t$ where $n_t$ is an integer of 1 or more) for at least one integer $t=1, \ldots, d$,
a key element 0 generation part which generates a key element $k^*_0$ where a predetermined value δ is set as a coefficient for a basis vector $b^*_{0,1}$ of a basis $B^*_0$,
a key element t generation part which generates a key element $k^*_t$ where $\delta x_{t,i}$ ($i=1, \ldots, n_t$) obtained by multiplying the attribute information $\vec{x}_t$ by the predetermined value δ is set as a coefficient for a basis vector $b^*_{t,i}$ ($i=1, \ldots, n_t$) of the basis $B^*_t$, concerning each identification information t included in the attribute set Γ inputted by the first information input part, a key element d+1 generation part which generates a key element $k^*_{d+1,1}$ where the predetermined value $\delta$ is set as a coefficient for a basis vector $b^*_{d+1,1}$ of a basis $B^*_{d+1}$, and a key element $k^*_{d+1,2}$ where the predetermined value $\delta$ is set as a coefficient for a basis vector $b^*_{d+1,2}$ of the basis $B^*_{d+1}$, and a signing key transmission part which transmits, to the signature device, a signing key $sk_\Gamma$ including: the key element $k^*_0$ generated by the key element 0 generation part; the key element $k^*_t$ generated by the key element t generation part concerning each identification information t included in the attribute set $\Gamma$; the key element $k^*_{d+1,1}$ and the key element $k^*_{d+1,2}$ which are generated by the key element d+1 generation part; and the attribute set $\Gamma$, wherein the signature device includes a signature element 0 generation part which generates a signature element $s^*_0$ including the key element $k^*_0$ included in the signing key $sk_\Gamma$, a signature element i generation part which generates, for each integer i=1 ..., L, a signature element $s^*_i$ including $\gamma_i k^*_t$ obtained by multiplying the key element $k^*_t$ included in the signing key $sk_\Gamma$ by a value $\gamma_i$, by setting the value $\gamma_i$ to satisfy $\gamma_i := \alpha_i$ when the integer i is included in the set I specified by the complementary coefficient calculation part and the variable $\rho(i)$ is a positive tuple (t, $\vec{v}_i$); by setting the value $\gamma_i$ to satisfy $\gamma_i := \alpha_i / (\vec{v}_i \cdot \vec{x}_t)$ when the integer i is included in the set I and the variable $\rho(i)$ is a negative tuple $\neg$ (t, $\vec{v}_i$); and by setting the value $\gamma_i$ to satisfy $\gamma_i := 0$ when the integer i is not included in the set I, a signature element L+1 generation part which generates a signature element $s^*_{L+1}$ including a sum of the key element $k^*_{d+1,1}$ included in the signing key $sk_\Gamma$ and $m' \cdot k^*_{d+1,2}$ obtained by multiplying the key element $k^*_{d+1,2}$ by a value m' generated using the message m, and a signature data transmission part which transmits, to the verification device, signature data $\sigma$ including: the signature element $s^*_0$ generated by the signature element 0 generation part; the signature element $s^*_i$ generated for each integer i=1, ..., L by the signature element i generation part; the signature element $s^*_{L+1}$ generated by the signature element L+1 generation part; the message m; the variable $\rho(i)$; and the matrix M, and wherein the verification device includes a data acquisition part which acquires the signature data $\sigma$ transmitted by the signature data transmission part, a verification element 0 generation part which generates a verification element $c_0$ by setting, as a coefficient for a basis vector $b_{0,1}$ of a basis $B_0$, $-s_0 - s_{L+1}$ calculated from a value $s_0 := \vec{h} \cdot \vec{f}$ and a predetermined value $s_{L+1}$, the value $s_0 := \vec{h} \cdot \vec{f}$ being generated using a vector $\vec{f}$ having r pieces of elements, and the vector $\vec{h}$, a verification element i generation part which, for each integer i=1, ..., L and using a column vector $\vec{s}^T := (s_1, \ldots, s_L)^T := M \cdot \vec{f}^T$ generated based on the vector $\vec{f}$ and the matrix M which is included in the signature data $\sigma$ acquired by the data acquisition part, and a predetermined number $\theta_i$ for each integer i=1, ..., L, generates a verification element $c_i$, when the variable $\rho(i)$ is a positive tuple (t, $\vec{v}_i$), by setting $s_i + \theta_i v_{i,1}$ as a coefficient for a basis vector $b_{t,1}$ of the basis $B_t$ indicated by identification information t of the positive tuple and by setting $\theta_i v_{i,i'}$ (i'=2, ..., $n_t$) as a coefficient for a basis vector $b_{t,i'}$ (i'=2, ..., $n_t$), and generates a verification element $c_i$, when the variable $\rho(i)$ is a negative tuple $\neg$ (t, $\vec{v}_i$), by setting $s_i v_{i,i'}$ (i'=1, ..., $n_t$) as a coefficient for the basis vector $b_{t,i'}$ (i'=1, ..., $n_t$) indicated by identification information t of the negative tuple, a verification element L+1 generation part which generates a verification element $c_{L+1}$ by setting $s_{L+1} - \theta_{L+1} m'$ calculated from the predetermined value $s_{L+1}$, the value m', and a predetermined value $\theta_{L+1}$ as a coefficient for a basis vector $b_{d+1,1}$ of a basis $B_{d+1}$, and by setting the predetermined value $\theta_{L+1}$ as a coefficient for a basis vector $b_{d+1,2}$, and a pairing operation part which verifies an authenticity of the signature data $\sigma$ by conducting a pairing operation $\prod_{i=0}^{L+1} e(c_i, s^*_i)$ for the verification element $c_0$ generated by the verification element 0 generation part, the verification element $c_i$ generated by the verification element i generation part, the verification element $c_{L+1}$ generated by the verification element L+1 generation part, and the signature elements $s^*_0$, $s^*_i$, and $s^*_{L+1}$ included in the signature data $\sigma$.

2. The signature processing system according to claim 1, which executes the signature process using a basis $B_0$ having at least the basis vector $b_{t,i}$ (i=1, ..., 1+$u_0$, ..., 1+$u_0+w_0$, ..., 1+$u_0+w_0+z_0$), the basis $B_t$ (t=1, ..., d) having at least the basis vector $b_{t,i}$ (i=1, ..., $n_t$, $n_t+u_t$, ..., $n_t+u_t+w_t$, ..., $n_t+u_t+w_t+z_t$) ($u_t$, $w_t$, and $z_t$ are each an integer of 1 or more), the basis $B_{d+1}$ having at least the basis vector $b_{t,i}$ (i=1, 2, ..., $2+u_{d+1}$, ..., $2+u_{d+1}+w_{d+1}$, ..., $2+u_{d+1}+w_{d+1}+z_{d+1}$), the basis $B^*_0$ having at least a basis vector $b^*_{t,i}$ (i=1, ..., 1+$u_0$, ..., 1+$u_0+w_0$, ..., 1+$u_0+w_0+z_0$), the basis $B^*_t$ (t=1, ..., d) having at least the basis vector $b^*_{t,i}$ (i=1, ..., $n_t$, ..., $n_t+u_t$, ..., $n_t+u_t+w_t$, ..., $n_t+u_t+w_t+z_t$) ($u_t$, $w_t$, and $z_t$ are each an integer of 1 or more), and the basis $B^*_{d+1}$ having at least the basis vector $b^*_{t,i}$ (i=1, 2, ..., $2+u_{d+1}$, ..., $2+u_{d+1}+w_{d+1}$, ..., $2+u_{d+1}+w_{d+1}+z_{d+1}$), wherein, in the key generation device, the key element 0 generation part generates the key element $k^*_0$ indicated in Formula 1 based on a random number $\delta$ and a random number $\phi_{0,i}$ (i=1, ..., $w_0$), the key element t generation part generates the key element $k^*_t$ indicated in Formula 2 for each identification information t included in the attribute set $\Gamma$ based on the random number $\delta$ and a random number $\phi_{t,i}$ (i=1, ..., $w_t$), and the key element d+1 generation part generates the key element $k^*_{d+1,1}$ and the key element $k^*_{d+1,2}$ which are indicated in Formula 3 based on the random number $\delta$, a random number $\phi_{d+1,1,i}$ (i=1, ..., $w_{d+1}$), and a random number $\phi_{d+1,2,i}$ (i=1, ..., $w_{d+1}$), wherein, in the signature device, the signature element 0 generation part generates the signature element $s^*_0$ indicated in Formula 4 based on a random number $\xi$, the signature element i generation part generates the signature element $s^*_i$ indicated in Formula 5 for each integer i=1, ..., L based on the random number $\xi$, and the signature element L+1 generation part generates the signature element $s^*_{L+1}$ indicated in Formula 6 based on the random number $\xi$ and the value m', and wherein, in the verification device, the verification element 0 generation part generates the verification element $c_0$ indicated in Formula 7 based on the value $s_0$, the random number $s_{L+1}$, and a random number $\eta_{0,i}$ (i=1, ..., $z_0$), the verification element i generation part generates the verification element $c_i$ indicated in Formula 8 for each integer i=1, ..., L based on the column vector $\vec{s}^T$, the random number 74$_i$, and a random number $\eta_{i,i'}$ (i=1, ..., L; i'=1, ..., $z_t$), and the verification element L+1 generation part generates the element $c_{L+1}$ indicated in Formula 9 based on the random number $s_{L+1}$, the random number $\theta_{L+1}$, a random number $\eta_{L+1,i'}$ (i'=1, ..., $z_{d+1}$), and the value m', $$k_0^* := \left(\delta, \frac{u_0}{0^{u_0}}, \frac{w_0}{\varphi_{0,1}, \ldots, \varphi_{0,w_0}}, \frac{z_0}{0^{z_0}}\right)B_0^* \quad \text{[Formula 1]}$$

$$k_t^* := \left(\frac{n_t}{\delta(x_{t,1}, \ldots, x_{t,n_t})}, \frac{u_t}{0^{u_t}}, \frac{w_t}{\varphi_{t,1}, \ldots, \varphi_{t,w_t}}, \frac{z_t}{0^{z_t}}\right)B_t^* \quad \text{[Formula 2]}$$

$$k_{d+1,1}^* := \quad \text{[Formula 3]}$$
$$\left(\frac{2}{\delta(1,0)}, \frac{u_{d+1}}{0^{u_{d+1}}}, \frac{w_{d+1}}{\varphi_{d+1,1,1}, \ldots, \varphi_{d+1,1,w_{d+1}}}, \frac{z_{d+1}}{0^{z_{d+1}}}\right)B_{d+1}^*,$$

$$k_{d+1,2}^* := \left(\frac{2}{\delta(0,1)}, \frac{u_{d+1}}{0^{u_{d+1}}}, \frac{w_{d+1}}{\varphi_{d+1,2,1}, \ldots, \varphi_{d+1,2,w_{d+1}}}, \frac{z_{d+1}}{0^{z_{d+1}}}\right)B_{d+1}^*$$

$$s_0^* := \xi k_0^* + r_0^*, \text{ where } r_0^* \xleftarrow{U} \text{span}\langle b_{0,1+u_t+1}^*, \ldots, b_{0,1+u_t+w_t}^*\rangle \quad \text{[Formula 4]}$$

$$s_i^* := \gamma_i \cdot \xi k_t^* + \sum_{t=1}^{n_t} y_{i,t} \cdot b_{t,l}^* + r_i^* \text{ for } 1 \le i \le L, \quad \text{[Formula 5]}$$

where $r_i^* \xleftarrow{U} \text{span}\langle b_{t,n_t+u_t+1}^*, \ldots, b_{t,n_t+u_t+w_t}^*\rangle,$ $\gamma_i, \vec{y}_i := (y_{i,1}, \ldots, y_{i,n_t})$ are defined as if $i \in I \wedge \rho(i) = (t, \vec{v}_i)$, $\gamma_i := \alpha_i$,
$\vec{y}_i \xleftarrow{U} \{\vec{y}_i \mid \vec{y}_i \cdot \vec{v}_i = 0 \wedge y_{i,1} = \beta_i\}$, if $i \in I \wedge \rho(i) = \neg(t, \vec{v}_i)$,
$\gamma_i := \frac{\alpha_i}{\vec{v}_i \cdot \vec{x}_t}$, $\vec{y}_i \xleftarrow{U} \{\vec{y}_i \mid \vec{y}_i \cdot \vec{v}_i = \beta_i\}$, if $i \notin I \wedge \rho(i) = (t, \vec{v}_i)$, $\gamma_i := 0$,
$\vec{y}_i \xleftarrow{U} \{\vec{y}_i \mid \vec{y}_i \cdot \vec{v}_i = 0 \wedge y_{i,1} = \beta_i\}$, if $i \notin I \wedge \rho(i) = \neg(t, \vec{v}_i)$, $\gamma_i := 0$, $\vec{y}_i \xleftarrow{U} \{\vec{y}_i \mid \vec{y}_i \cdot \vec{v}_i = \beta_i\}$, $(\beta_i) \xleftarrow{U} \left\{(\beta_1, \ldots, \beta_L) \mid \sum_{i=1}^{L} \beta_i M_i = \vec{0}\right\}$ $$s_{L+1}^* := \xi(k_{d+1,1}^* + m' \cdot k_{d+1,2}^*) + r_{L+1}^*, \quad \text{[Formula 6]}$$

where $r_{L+1}^* \xleftarrow{U} \text{span}\langle b_{d+1,2+u_{d+1}+1}^*, \ldots, b_{d+1,2+u_{d+1}+w_{d+1}}^*\rangle$ $$c_0 := \left(-s_0 - s_{L+1}, \frac{u_0}{0^{u_0}}, \frac{w_0}{0^{w_0}}, \frac{z_0}{\eta_{0,1}, \ldots, \eta_{0,z_0}}\right)B_0 \quad \text{[Formula 7]}$$

if $\rho(i) = (t, \vec{v}_i)$, $c_i :=$ [Formula 8]

$\left(\frac{n_t}{s_i + \theta_i v_{i,1}, \theta_i v_{i,2}, \ldots, \theta_i v_{i,n_t}}, \frac{u_t}{0^{u_t}}, \frac{w_t}{0^{w_t}}, \frac{z_t}{\eta_{i,1}, \ldots, \eta_{i,z_t}}\right)B_t,$ if $\rho(i) = \neg(t, \vec{v}_i)$, $c_i := \left(\frac{n_t}{s_i(v_{i,1}, \ldots, v_{i,n_t})}, \frac{u_t}{0^{u_t}}, \frac{w_t}{0^{w_t}}, \frac{z_t}{\eta_{i,1}, \ldots, \eta_{i,z_t}}\right)B_t$ $$c_{L+1} := \left(\frac{2}{s_{L+1} - \theta_{L+1} m', \theta_{L+1}}, \quad \text{[Formula 9]}\right.$$
$$\left.\frac{u_{d+1}}{0^{u_{d+1}}}, \frac{w_{d+1}}{0^{w_{d+1}}}, \frac{z_{d+1}}{\eta_{L+1,1}, \ldots, \eta_{L+1,z_{d+1}}}\right)B_{d+1}.$$

3. The signature processing system according to claim 1, wherein, in the signature device,
the signature element L+1 generation part generates the signature element $s_{L+1}^*$ using a hash value obtained upon input of the message m, the matrix M, and the variable $\rho(i)$ for each integer i=1, ..., L, as the value m', and wherein, in the verification device,
the verification element L+1 generation part generates the verification element $c_{L+1}$ using the hash value as the value m'.

4. A signature processing system comprising:

d (d is an integer of 1 or more) units of key generation devices, a signature device, and a verification device, and serving to execute a signature process using a basis $B_t$ and a basis $B_t^*$ for at least one integer t=0, ..., d, wherein each of the d units of key generation devices includes a first information input part which takes as input attribute information $\vec{x}_t := (x_{t,i})$ (i=1, ..., $n_t$ where $n_t$ is an integer of 1 or more) for an integer t among integers t=1, ..., d which is predetermined for each of the key generation devices, a key element generation part which, for the integer t and each integer j=1, 2, generates a key element $k_{t,j}^*$ including a vector indicated in Formula 10 based on the attribute information $\vec{x}_t$ inputted by the first information input part, a predetermined value $\delta_j$, and a basis vector $b_{t,i}^*$ (i=1, ..., $2n_t$) of the basis $B_t^*$, and a signing key transmission part which transmits, to the signature device, a signing key usk including: the key element $k_{t,j}^*$ generated by the key element generation part; and the attribute information $\vec{x}_t$, a second information input part which takes as input a variable $\rho(i)$ for each integer i=1, ..., L (L is an integer of 1 or more), which variable $\rho(i)$ is either one of a positive tuple (t, $\vec{v}_i$) and a negative tuple $\neg$(t, $\vec{v}_i$) of the identification information t (t is any one integer of t=1, ..., d) and attribute information $\vec{v}_i := (v_{i,i'})$ (i'=1, ..., $n_t$); a predetermined matrix M having L rows and r columns (r is an integer of 1 or more); and a message m, a signing key acquisition part which acquires the signing key $sk_\Gamma$ transmitted by the signing key transmission part, a complementary coefficient calculation part which, based on the variable $\rho(i)$ inputted by the second information input part and the attribute set $\Gamma$ included in the signing key $sk_\Gamma$ acquired by the signing key acquisition part, specifies, among integers i=1, ..., L, a set I of an integer i for which the variable $\rho(i)$ is a positive tuple (t, $\vec{v}_i$) and with which an inner-product of $\vec{v}_i$ of the positive tuple and $\vec{x}_t$ included in the attribute set $\Gamma$ indicated by identification information t of the positive tuple becomes 0, and an integer i for which the variable $\rho(i)$ is a negative tuple $\neg$(t, $\vec{v}_i$) and with which an inner-product of $\vec{v}_i$ of the negative tuple and $\vec{x}_t$ included in the attribute set $\Gamma$ indicated by identification information t of the negative tuple does not become 0; and calculates, concerning i included in the set I specified, a complementary coefficient $\alpha_i$ with which a total of $\alpha_i M_i$ based on $M_i$ which is an element on an i-th row of the matrix M inputted by the second information input part becomes a predetermined vector $\vec{h}$, wherein the signature device includes a second information input part which takes as input a variable $\rho(i)$ for each integer i=1, ..., L (L is an integer of 1 or more), which variable $\rho(i)$ is either one of a positive tuple (t, $\vec{v}_i$) and a negative tuple $\neg$(t, $\vec{v}_i$) of the identification information t (t is any one integer of t=1, ..., d) and attribute information $\vec{v}_i := (v_{i,i'})$ (i'=1, ..., $n_t$); a predetermined matrix M having L rows and r columns (r is an integer of 1 or more); and a message m, a signing key acquisition part which acquires the signing key usk transmitted by the signing key transmission part of at least one key generation device among the d units of key generation devices, a complementary coefficient calculation part which, based on the variable ρ(i) inputted by the second information input part and the attribute information $\vec{x}_t$ included in the signing key usk acquired by the signing key acquisition part, specifies, among integers i=1, ..., L, a set I of an integer i for which the variable ρ(i) is a positive tuple (t, $\vec{v}_i$), the signing key usk including $\vec{x}_t$ indicated by identification information t of the positive tuple being acquired by the signing key acquisition part, and with which an inner-product of $\vec{v}_i$ of the positive tuple and the attribute information $\vec{x}_t$ indicated by the identification information t of the positive tuple becomes 0, and an integer i for which the variable ρ(i) is a negative tuple ¬ (t, $\vec{v}_i$), the signing key usk including $\vec{x}_t$ indicated by identification information t of the negative tuple being acquired by the signing key acquisition part, and with which an inner-product of $\vec{v}_i$ of the negative tuple and the attribute information $\vec{x}_t$ indicated by the identification information t of the negative tuple does not become 0; and calculates, concerning i included in the set I specified, a complementary coefficient $\alpha_i$ with which a total of $\alpha_i M_i$ based on $M_i$ which is an element on an i-th row of the matrix M inputted by the second information input part becomes a predetermined vector $\vec{h}$, a signature element generation part which generates, for each integer i=1, ..., L, a signature element $s^*_i$ including a vector indicated in Formula 11 using the basis vector $b^*_{t,i}$ (i=2n_t+1, 2n_t+2) of the basis $B^*_t$, based on a key element $k^*_{t,1}$ and a key element $k^*_{t,2}$ included in the signing key usk, predetermined values $\xi_1$, E, and μ, and a value m' calculated from the message m, by setting a value $\gamma_i$ to satisfy $\gamma_i := \alpha_i$ when the integer i is included in the set I specified by the complementary coefficient calculation part and the variable ρ(i) is a positive tuple (t, $\vec{v}_i$); by setting the value $\gamma_i$ to satisfy $\gamma_i := \alpha_i/(\vec{v}_i \cdot \vec{x}_t)$ when the integer i is included in the set I and the variable ρ(i) is a negative tuple ¬ (t, $\vec{v}_i$); and by setting the value $\gamma_i$ to satisfy $\gamma_i := 0$ when the integer i is not included in the set I, and a signature data transmission part which transmits, to the verification device, signature data σ including: the signature element $s^*_i$ generated for each integer i=1, ..., L by the signature element generation part; the message m; the variable ρ(i); and the matrix M, and wherein the verification device includes a data acquisition part which acquires the signature data σ transmitted by the signature data transmission part, a vector generation part which generates a column vector $\vec{s}^T := (s_1, ..., s_L)^T := M \cdot \vec{f}^T$ based on a vector $\vec{f}$ having r pieces of elements and the matrix M included in the signature data σ acquired by the data acquisition part, and generates a column vector $(\vec{s}')^T := (s_1', ..., s_L')^T := M \cdot (\vec{f}')^T$ based on the matrix M and a vector $\vec{f}'$ having r pieces of elements and satisfying $s_0 = \vec{h} \cdot (\vec{f}')^T$ where $s_0 = \vec{h} \cdot \vec{f}^T$, a verification element generation part which, for each integer i=1, ..., L and based on the column vector $\vec{s}^T$ and the column vector $(\vec{s}')^T$ which are generated by the vector generation part, and predetermined values $\theta_i$, $\theta_i'$, $\theta_i''$, and $\sigma_i$ for each integer i=1, ..., L, generates a verification element $c_i$ including a vector indicated in Formula 12, when the variable ρ(i) is a positive tuple (t, $\vec{v}_i$), using a basis vector $b_{t,i}$ (i=1, ..., 2n_t+2) of the basis $B_t$ indicated by identification information t of the positive tuple, and generates a verification element $c_i$ including a vector indicated in Formula 13, when the variable ρ(i) is a negative tuple ¬ (t, $\vec{v}_i$), using a basis vector $b_{t,i}$ (i=1, ..., 2n_t+2) indicated by identification information t of the negative tuple, and a pairing operation part which verifies an authenticity of the signature data σ by conducting a pairing operation $\prod_{i=1}^{L} e(c_i, s^*_i)$ for the verification element $c_i$ generated by the verification element generation part, and the signature element $s^*_i$ included in the signature data σ, $$\left(\overbrace{(\delta_j+1)(x_{t,1}, \ldots, x_{t,n_t})}^{n_t}, \overbrace{-\delta_j(x_{t,1}, \ldots, x_{t,n_t})}^{n_t}, 0, \ldots, 0\right) B^*_t \quad \text{[Formula 10]}$$

$$\gamma_i \cdot (\xi_1 k^*_{t,1} + (E-\xi_1) k^*_{t,2}) + (\mu b^*_{t,2n_t+1}) + m'(\mu b^*_{t,2n_t+2}) \quad \text{[Formula 11]}$$

$$\left(\overbrace{s_i + \theta_i v_{i,1}, \theta_i v_{i,2}, \ldots, \theta_i v_{i,n_t}}^{n_t},\right.$$
$$\left.\overbrace{s_i' + \theta_i' v_{i,1}, \theta_i' v_{i,2}, \ldots, \theta_i' v_{i,n_t}}^{n_t}, \overbrace{\sigma_i - \theta_i'' m', \theta_i''}^{2}, 0, \ldots, 0\right) B_t \quad \text{[Formula 12]}$$

$$\left(\overbrace{s_i(v_{i,1}, \ldots, v_{i,n_t})}^{n_t}, \overbrace{s_i'(v_{i,1}, \ldots, v_{i,n_t})}^{n_t},\right.$$
$$\left.\overbrace{\sigma_i - \theta_i'' m', \theta_i''}^{2}, 0, \ldots, 0\right) B_t. \quad \text{[Formula 13]}$$

5. The signature processing system according to claim 4, which executes the signature process using, for at least one integer t=1, ..., d, the basis $B_t$ having at least the basis vector $b_{t,i}$ (i=1, ..., 2n_t+2, ..., 2n_t+2+u_t, ..., 2n_t+2+u_t+w_t, ..., 2n_t+2+u_t+w_t+z_t)$ (where $u_t$, $w_t$, and $z_t$ are each an integer of 1 or more), and the basis $B^*_t$ having at least the basis vector $b^*_{t,i}$ (i=1, ..., 2n_t+2, ..., 2n_t+2+u_t, ..., 2n_t+2+u_t+w_t, ..., 2n_t+2+u_t+w_t+z_t)$, wherein, in the key generation device,
the key element $k^*_{t,j}$ indicated in Formula 14 is generated for the integer t and each integer j=1, 2 based on the attribute information $\vec{x}_t$, the predetermined values δ and Δ, and a random number $\phi_{t,j,i}$ (j=1, 2; i=1, ..., $w_t$), wherein, in the signature device,
the signature element generation part generates, for each integer i=1, ..., L, the signature element $s^*_i$ indicated in Formula 16 using $r^*_i$, $\gamma_i$, $\vec{y}_i := (y_{i,i})$ (i=1, ..., $n_t$), and $\vec{y}'_i := (y'_{i,i})$ (i=1, ..., $n_t$) indicated in Formula 15, based on the key element $k^*_{t,1}$ and the key element $k^*_{t,2}$, random numbers $\xi_1$ and $\xi_2$, predetermined values E, π, π', and μ, and the value m', and wherein, in the verification device,
the verification element generation part, for each integer i=1, ..., L and based on the column vector $\vec{s}^T$ and the column vector $(\vec{s}')^T$, random numbers $\theta_i$, $\theta_i'$, and $\theta_i''$, the predetermined value $\sigma_i$, and a random number $\eta_{i,i'}$ (i=1, ..., L; i'=1, ..., $z_t$), generates the verification element $c_i$ indicated in Formula 17 when the variable ρ(i) is a positive tuple (t, $\vec{v}_i$), and generates the verification element $c_i$ indicate in Formula 18 when the variable ρ(i) is a negative tuple ¬ (t, $\vec{v}_i$), $$k^*_{t,j} := \left(\overbrace{(\delta_j+\Delta)(x_{t,1}, \ldots, x_{t,n_t})}^{n_t}, \overbrace{-\delta_j(x_{t,1}, \ldots, x_{t,n_t})}^{n_t},\right.$$
$$\left.\overbrace{0^2}^{2}, \overbrace{0^{u_t}}^{u_t}, \overbrace{\varphi_{t,j,1}, \ldots, \varphi_{t,j,w_t}}^{w_t}, \overbrace{0^{z_t}}^{z_t}\right) B^*_t \quad \text{[Formula 14]}$$

-continued $$r_i^* \xleftarrow{U} \text{span} \langle b_{t,2n_t+2+u_t+1}^*, \ldots, b_{t,2n_t+2+u_t+w_t}^* \rangle \quad \text{[Formula 15]}$$

if $i \in I \wedge \rho(i) = (t, \vec{v}_i)$, $\gamma_i := \alpha_i$, $$\vec{y}_i \xleftarrow{U} \{\vec{y}_i \mid \vec{y}_i \cdot \vec{v}_i = 0 \wedge y_{i,1} = \beta_i\},$$

$$\vec{y}_i' \xleftarrow{U} \{\vec{y}_i' \mid \vec{y}_i' \cdot \vec{v}_i = 0 \wedge y_{i,1}' = \beta_i'\} \text{if } i \in I \wedge \rho(i) = \neg (t, \vec{v}_i),$$

$$\gamma_i := \frac{\alpha_i}{\vec{v}_i \cdot \vec{x}_t},$$

$$\vec{y}_i \xleftarrow{U} \{\vec{y}_i \mid \vec{y}_i \cdot \vec{v}_i = \beta_i\}, \vec{y}_i' \xleftarrow{U} \{\vec{y}_i' \mid \vec{y}_i' \cdot \vec{v}_i = \beta_i'\},$$

if $i \notin I \wedge \rho(i) = (t, \vec{v}_i)$, $\gamma_i := 0$, $$\vec{y}_i \xleftarrow{U} \{\vec{y}_i \mid \vec{y}_i \cdot \vec{v}_i = 0 \wedge y_{i,1} = \beta_i\},$$

$$\vec{y}_i' \xleftarrow{U} \{\vec{y}_i' \mid \vec{y}_i' \cdot \vec{v}_i = 0 \wedge y_{i,1}' = \beta_i'\}$$

if $i \notin I \wedge \rho(i) = \neg (t, \vec{v}_i)$, $\gamma_i := 0$, $$\vec{y}_i \xleftarrow{U} \{\vec{y}_i \mid \vec{y}_i \cdot \vec{v}_i = \beta_i\}, \vec{y}_i' \xleftarrow{U} \{\vec{y}_i' \mid \vec{y}_i' \cdot \vec{v}_i = \beta_i'\},$$

$$(\beta_i), (\beta_i') \xleftarrow{U} \left\{ (\beta_1, \ldots, \beta_L) \mid \sum_{i=1}^{L} \beta_i M_i = \vec{0} \right\}$$

$$s_i^* := \gamma_i \cdot (\xi_1 k_{t,1}^* + (1-\xi_1) k_{t,2}^*) + \sum_{t=1}^{n_t} y_{i,t}(\pi b_{t,t}^*) + \quad \text{[Formula 16]}$$

$$\sum_{t=1}^{n_t} y_{i,t}'(\pi' b_{t,n_t+t}^*) + \xi_2(\mu b_{t,2n_t+1}^* + m'(\mu b_{t,2n_t+2}^*)) + r_i^*$$

$$c_i := \quad \text{[Formula 17]}$$
$$\left( \overbrace{s_i + \theta_i v_{i,1}, \theta_i v_{i,2}, \ldots, \theta_i v_{i,n_t}}^{n_t}, \overbrace{s_i' + \theta_i' v_{i,1}, \theta_i' v_{i,2}, \ldots, \theta_i' v_{i,n_t}}^{n_t}, \right.$$
$$\left. \overbrace{\sigma_i - \theta_i'' m', \theta_i''}^{2}, \overbrace{0^{u_t}}^{u_t}, \overbrace{0^{w_t}}^{w_t}, \overbrace{\eta_{i,1}, \ldots, \eta_{i,z_t}}^{z_t} \right) \mathbb{B}_t$$

$$c_i := \left( \overbrace{s_i(v_{i,1}, \ldots, v_{i,n_t})}^{n_t}, \overbrace{s_i'(v_{i,1}, \ldots, v_{i,n_t})}^{n_t}, \overbrace{\sigma_i - \theta_i'' m', \theta_i''}^{2}, \overbrace{0^{u_t}}^{u_t}, \right. \quad \text{[Formula 18]}$$
$$\left. \overbrace{0^{w_t}}^{w_t}, \overbrace{\eta_{i,1}, \ldots, \eta_{i,z_t}}^{z_t} \right) \mathbb{B}_t.$$

6. The signature processing system according to claim 4, wherein, in the signature device,
the signature element generation part generates the signature element $s_i^*$ using a hash value obtained upon input of the message m, the matrix M, and the variable ρ(i) for each integer i=1, L, as the value m', and
wherein, in the verification device,
the verification element generation part generates the verification element $c_i$ using the hash value as the value m'.

7. A signature processing method of executing a signature process using a basis $B_t$ and a basis $B_t^*$ for each integer t=0, . . . , d+1 (d is an integer of 1 or more), comprising:
a first information input step of, with a key generation device, taking as input an attribute set Γ including identification information t and attribute information $\vec{x}_t := (x_{t,i})$ (i=1, . . . , $n_t$ where $n_t$ is an integer of 1 or more) for at least one integer t=1, . . . , d;
a key element 0 generation step of, with the key generation device, generating a key element $k_0^*$ where a predetermined value δ is set as a coefficient for a basis vector $b_{0,1}^*$ of a basis $B_0^*$;
a key element t generation step of, with the key generation device, generating a key element $k_t^*$ where $\delta x_{t,i}$ (i=1, . . . , $n_t$) obtained by multiplying the attribute information $\vec{x}_t$ by the predetermined value δ is set as a coefficient for a basis vector $b_{t,i}^*$ (i=1, . . . , $n_t$) of the basis $B_t^*$, concerning each identification information t included in the attribute set Γ inputted in the first information input step;
a key element d+1 generation step of, with the key generation device, generating a key element $k_{d+1,1}^*$ where the predetermined value δ is set as a coefficient for a basis vector $b_{d+1,1}^*$ of a basis $B_{d+1}^*$, and a key element $k_{d+1,2}^*$ where the predetermined value δ is set as a coefficient for a basis vector $b_{d+1,2}^*$ of the basis $B_{d+1}^*$;
a signing key transmission step of, with the key generation device, transmitting, to a signature device, a signing key $sk_\Gamma$ including: the key element $k_0^*$ generated in the key element 0 generation step; the key element $k_t^*$ generated in the key element t generation step concerning each identification information t included in the attribute set Γ; the key element $k_{d+1,1}^*$ and the key element $k_{d+1,2}^*$ which are generated in the key element d+1 generation step; and the attribute set Γ;
a second information input step of, with the signature device, taking as input a variable ρ(i) for each integer i=1, . . . , L (L is an integer of 1 or more), which variable ρ(i) is either one of a positive tuple (t, $\vec{v}_i$) and a negative tuple ¬ (t, $\vec{v}_i$) of the identification information t (t is any one integer of t=1, . . . , d) and attribute information $\vec{v}_i := (v_{i,i'})$(i'=1, . . . , $n_t$); a predetermined matrix M having L rows and r columns (r is an integer of 1 or more); and a message m;
a signing key acquisition step of, with the signature device, acquiring the signing key $sk_\Gamma$ transmitted in the signing key transmission step;
a complementary coefficient calculation step of, with the signature device, based on the variable ρ(i) inputted in the second information input step and the attribute set Γ included in the signing key $sk_\Gamma$ acquired in the signing key acquisition step, specifying, among integers i=1, . . . , L, a set I of an integer i for which the variable ρ(i) is a positive tuple (t, $\vec{v}_i$) and with which an inner-product of $\vec{v}_i$ of the positive tuple and $\vec{x}_t$ included in the attribute set Γ indicated by identification information t of the positive tuple becomes 0, and an integer i for which the variable ρ(i) is a negative tuple ¬ (t, $\vec{v}_i$) and with which an inner-product of $\vec{v}_i$ of the negative tuple and $\vec{x}_t$ included in the attribute set Γ indicated by identification information t of the negative tuple does not become 0; and calculating, concerning i included in the set I specified, a complementary coefficient $\alpha_i$ with which a total of $\alpha_i M_i$ based on $M_i$ which is an element on an i-th row of the matrix M inputted in the second information input step becomes a predetermined vector $\vec{h}$;
a signature element 0 generation step of, with the signature device, generating a signature element $s_0^*$ including the key element $k_0^*$ included in the signing key $sk_\Gamma$;
a signature element i generation step of, with the signature device, generating, for each integer i=1 . . . , L, a signature element $s_i^*$ including $\gamma_i k_t^*$ obtained by multiplying the key element $k_t^*$ included in the signing key $sk_\Gamma$ by a value $\gamma_i$, by setting the value $\gamma_i$ to satisfy $\gamma_i := \alpha_i$ when the integer i is included in the set I specified in the complementary coefficient calculation step and the variable ρ(i) is a positive tuple (t, $\vec{v}_i$); by setting the value $\gamma_i$ to satisfy $\gamma_i := \alpha_i/(\vec{v}_i \cdot \vec{x}_t)$ when the integer i is included in the set I and the variable ρ(i) is a negative tuple ¬ (t, $\vec{v}_i$); and by setting the value $\gamma_i$ to satisfy $\gamma_i := 0$ when the integer i is not included in the set I;
a signature element L+1 generation step of, with the signature device, generating a signature element $s_{L+1}^*$ including a sum of the key element $k^*_{d+1,1}$ included in the signing key $sk_\Gamma$ and $m' \cdot k^*_{d+1,2}$ obtained by multiplying the key element $k^*_{d+1,2}$ by a value $m'$ generated using the message $m$;

a signature data transmission step of, with the signature device, transmitting, to a verification device, signature data $\sigma$ including: the signature element $s^*_0$ generated in the signature element 0 generation step; the signature element $s^*_i$ generated for each integer $i=1, \ldots, L$ in the signature element i generation step; the signature element $s^*_{L+1}$ generated in the signature element L+1 generation step; the message $m$; the variable $\rho(i)$; and the matrix $M$;

a data acquisition step of, with the verification device, acquiring the signature data $\sigma$ transmitted in the signature data transmission step;

a verification element 0 generation step of, with the verification device, generating a verification element $c_0$ by setting, as a coefficient for a basis vector $b_{0,1}$ of a basis $B_0$, $-s_0 - s_{L+1}$ calculated from a value $s_0 := \vec{h} \cdot \vec{f}$ and a predetermined value $s_{L+1}$, the value $s_0 := \vec{h} \cdot \vec{f}$ being generated using a vector $\vec{f}$ having r pieces of elements, and the vector $\vec{h}$;

a verification element i generation step of, with the verification device, for each integer $i=1, \ldots, L$ and using a column vector $\vec{s}^T := (s_1, \ldots, s_L)^T := M \cdot \vec{f}^T$ generated based on the vector $\vec{f}$ and the matrix M which is included in the signature data $\sigma$ acquired in the data acquisition step, and a predetermined number $\theta_i$ for each integer $i=1, \ldots, L$, generating a verification element $c_i$, when the variable $\rho(i)$ is a positive tuple $(t, \vec{v}_i)$, by setting $s_i + \theta_i v_{i,1}$ as a coefficient for a basis vector $b_{t,1}$ of the basis $B_t$ indicated by identification information t of the positive tuple and by setting $\theta_i v_{i,i'}$ ($i'=2, \ldots, n_t$) as a coefficient for a basis vector $b_{t,i'}$ ($i'=2, \ldots, n_t$), and generating a verification element $c_i$, when the variable $\rho(i)$ is a negative tuple $\neg (t, \vec{v}_i)$, by setting $s_i v_{i,i'}$ ($i'=1, \ldots, n_t$) as a coefficient for the basis vector $b_{t,i'}$ ($i'=1, \ldots, n_t$) indicated by identification information t of the negative tuple;

a verification element L+1 generation step of, with the verification device, generating a verification element by setting $s_{L+1} - \theta_{L+1} m'$ calculated from the predetermined value $s_{L+1}$, the value $m'$, and a predetermined value $\theta_{L+1}$ as a coefficient for a basis vector $b_{d+1,1}$ of a basis $B_{d+1}$, and by setting the predetermined value $\theta_{L+1}$ as a coefficient for a basis vector $b_{d+1,2}$; and a pairing operation step of, with the verification device, verifying an authenticity of the signature data $\sigma$ by conducting a pairing operation $\Pi_{i=0}^{L+1} e(c_i, s^*_i)$ for the verification element $c_0$ generated in the verification element 0 generation step, the verification element $c_i$ generated in the verification element i generation step, the verification element $c_{L+1}$ generated in the verification element L+1 generation step, and the signature elements $s^*_0$, $s^*_i$, and $s^*_{L+1}$ included in the signature data $\sigma$.

8. A non-transitory computer readable medium including a signature processing program comprising:

a key generation program to run on a key generation device, a signature program to run on a signature device, and a verification program to run on a verification device, and serving to execute a signature process using a basis $B_t$ and a basis $B^*_t$ for each integer $t=0, \ldots, d+1$ (d is an integer of 1 or more), wherein the key generation program causes a computer to execute a first information input process of taking as input an attribute set $\Gamma$ including identification information t and attribute information $\vec{x}_t := (x_{t,i})$ ($i=1, \ldots, n_t$ where $n_t$ is an integer of 1 or more) for at least one integer $t=1, \ldots, d$, a key element 0 generation process of generating a key element $k^*_0$ where a predetermined value $\delta$ is set as a coefficient for a basis vector $b^*_{0,1}$ of a basis $B^*_0$, a key element t generation process of generating a key element $k^*_t$ where $\delta x_{t,i}$ ($i=1, \ldots, n_t$) obtained by multiplying the attribute information $\vec{x}_t$ by the predetermined value $\delta$ is set as a coefficient for a basis vector $b^*_{t,i}$ ($i=1, \ldots, n_t$) of the basis $B^*_t$, concerning each identification information t included in the attribute set $\Gamma$ inputted in the first information input process, a key element d+1 generation process of generating a key element $k^*_{d+1,1}$ where the predetermined value $\delta$ is set as a coefficient for a basis vector $b^*_{d+1,1}$ of a basis $B^*_{d+1}$, and a key element $k^*_{d+1,2}$ where the predetermined value $\delta$ is set as a coefficient for a basis vector $b^*_{d+1,2}$ of the basis $B^*_{d+1}$, and a signing key transmission process of transmitting, to a signature device, a signing key $sk_\Gamma$ including: the key element $k^*_0$ generated in the key element 0 generation process; the key element $k^*_t$ generated in the key element t generation process concerning each identification information t included in the attribute set $\Gamma$; the key element $k^*_{d+1,1}$ and the key element $k^*_{d+1,2}$ which are generated in the key element d+1 generation process; and the attribute set $\Gamma$, wherein the signature program causes the computer to execute a second information input process of taking as input a variable $\rho(i)$ for each integer $i=1, L$ (L is an integer of 1 or more), which variable $\rho(i)$ is either one of a positive tuple $(t, \vec{v}_i)$ and a negative tuple $\neg (t, \vec{v}_i)$ of the identification information t (t is any one integer of $t=1, \ldots, d$) and attribute information $\vec{v}_i := (v_{i,i'})$ ($i'=1, \ldots, n_t$); a predetermined matrix M having L rows and r columns (r is an integer of 1 or more); and a message m, a signing key acquisition process of acquiring the signing key $sk_\Gamma$ transmitted in the signing key transmission process, a complementary coefficient calculation process of, based on the variable $\rho(i)$ inputted in the second information input process and the attribute set $\Gamma$ included in the signing key $sk_\Gamma$ acquired in the signing key acquisition process, specifying, among integers $i=1, \ldots, L$, a set I of an integer i for which the variable $\rho(i)$ is a positive tuple $(t, \vec{v}_i)$ and with which an inner-product of $\vec{v}_i$ of the positive tuple and $\vec{x}_t$ included in the attribute set $\Gamma$ indicated by identification information t of the positive tuple becomes 0, and an integer i for which the variable $\rho(i)$ is a negative tuple $\neg (t, \vec{v}_i)$ and with which an inner-product of $\vec{v}_i$ of the negative tuple and $\vec{x}_t$ included in the attribute set $\Gamma$ indicated by identification information t of the negative tuple does not become 0; and calculating, concerning i included in the set I specified, a complementary coefficient $\alpha_i$ with which a total of $\alpha_i M_i$ based on $M_i$ which is an element on an i-th row of the matrix M inputted in the second information input process becomes a predetermined vector $\vec{h}$, a signature element 0 generation process of generating a signature element $s^*_0$ including the key element $k^*_0$ included in the signing key $sk_\Gamma$, a signature element i generation process of generating, for each integer $i=1 \ldots, L$, a signature element $s^*_i$ including $\gamma_i k^*_t$ obtained by multiplying the key element $k^*_t$ included in the signing key $sk_\Gamma$ by a value $\gamma_i$, by setting the value $\gamma_i$ to satisfy $\gamma_i := \alpha_i$ when the integer i is included in the set I specified in the complementary coefficient calculation process and the variable $\rho(i)$ is a positive tuple $(t, \vec{v}_i)$; by setting the value $\gamma_i$ to satisfy $\gamma_i := \alpha_i / (\vec{v}_i \cdot \vec{x}_t)$ when the integer i is included in the set I and the variable $\rho(i)$ is a negative tuple $\neg (t, \vec{v}_i)$; and by setting the value $\gamma_i$ to satisfy $\gamma_i := 0$ when the integer i is not included in the set I, a signature element L+1 generation process of generating a signature element $s^*_{L+1}$ including a sum of the key element $k^*_{d+1,1}$ included in the signing key $sk_\Gamma$ and m'·$k^*_{d+1,2}$ obtained by multiplying the key element $k^*_{d+1,2}$ by a value m' generated using the message m, and a signature data transmission process of transmitting, to a verification device, signature data σ including: the signature element $s^*_0$ generated in the signature element 0 generation process; the signature element $s^*_i$ generated for each integer i=1, . . . , L in the signature element i generation process; the signature element $s^*_{L+1}$ generated in the signature element L+1 generation process; the message m; the variable $\rho(i)$; and the matrix M, and wherein the verification program causes the computer to execute a data acquisition process of acquiring the signature data σ transmitted in the signature data transmission process, a verification element 0 generation process of generating a verification element $c_0$ by setting, as a coefficient for a basis vector $b_{0,1}$ of a basis $B_0$, $-s_0 - s_{L+1}$ calculated from a value $s_0 := \vec{h} \cdot \vec{f}$ and a predetermined value $s_{L+1}$, the value $s_0 := \vec{h} \cdot \vec{f}$ being generated using a vector $\vec{f}$ having r pieces of elements, and the vector $\vec{h}$, a verification element i generation process of, for each integer i=1, . . . , L and using a column vector $\vec{s}^T := (s_1, \ldots, s_L)^T := M \cdot \vec{f}^T$ generated based on the vector $\vec{f}$ and the matrix M which is included in the signature data σ acquired in the data acquisition process, and a predetermined number $\theta_i$ for each integer i=1, . . . L, generating a verification element $c_i$, when the variable $\rho(i)$ is a positive tuple $(t, \vec{v}_i)$, by setting $s_i + \theta_i v_{i,1}$ as a coefficient for a basis vector $b_{t,1}$ of the basis $B_t$ indicated by identification information t of the positive tuple and by setting $\theta_i v_{i,i'}$ (i'=2, . . . , $n_t$) as a coefficient for a basis vector $b_{t,i'}$ (i'=2, . . . , $n_t$), and generating a verification element $c_i$, when the variable $\rho(i)$ is a negative tuple $\neg (t, \vec{v}_i)$, by setting (i'=1, . . . , $n_t$) as a coefficient for the basis vector $b_{t,i'}$ (i'=1, . . . , $n_t$) indicated by identification information t of the negative tuple, a verification element L+1 generation process of generating a verification element $c_{L+1}$ by setting $s_{L+1} + \theta_{L+1} m'$ calculated from the predetermined value $s_{L+1}$, the value m', and a predetermined value $\theta_{L+1}$ as a coefficient for a basis vector $b_{d+1,1}$ of a basis $B_{d+1,2}$, and by setting the predetermined value $\theta_{L+1}$, as a coefficient for a basis vector $b_{d+1,2}$, and a pairing operation process of verifying an authenticity of the signature data σ by conducting a pairing operation $\Pi_0^{L+1} e(c_i, s^*_i)$ for the verification element $c_0$ generated in the verification element 0 generation process, the verification element $c_i$ generated in the verification element i generation process, the verification element $c_{L+1}$ generated in the verification element L+1 generation process, and the signature elements $s^*_0$, $s^*_i$, and $s^*_{L+1}$ included in the signature data σ.

9. A signature processing method of executing a signature process using a basis $B_t$ and a basis $B^*_t$ for at least one integer t=0, . . . , d (d is an integer of 1 or more), the signature processing method including:

a first information input step of, with at least one key generation device among d units of key generation devices, taking as input attribute information $\vec{x}_t := (x_{t,i})$ (i=1, . . . , $n_t$) for an integer t among t=1, . . . , d which is predetermined for each of the key generation devices;

a key element generation step of, with the at least one key generation device, for the integer t and each integer j=1, 2, generating a key element $k^*_{t,j}$ including a vector indicated in Formula 24 based on the attribute information $\vec{x}_t$ inputted in the first information input step, a predetermined value $\delta_j$, and a basis vector $b^*_{t,i}$ (i=1, . . . , $2n_t$) of the basis $B^*_t$;

a signing key transmission step of, with the at least one key generation device, transmitting, to a signature device, a signing key usk including: the key element $k^*_{t,j}$ generated in the key element generation step; and the attribute information $\vec{x}_t$;

a second information input step of, with the signature device, taking as input a variable $\rho(i)$ for each integer i=1, . . . , L (L is an integer of 1 or more), which variable $\rho(i)$ is either one of a positive tuple $(t, \vec{v}_i)$ and a negative tuple $\neg (t, \vec{v}_i)$ of the identification information t (t is any one integer of t=1, . . . , d) and attribute information $\vec{v}_i := (v_{i,i'})$(i'=1, . . . , $n_t$); a predetermined matrix M having L rows and r columns (r is an integer of 1 or more); and a message m;

a signing key acquisition step of, with the signature device, acquiring the signing key usk transmitted in the signing key transmission step of at least one key generation device among the d units of key generation devices;

a complementary coefficient calculation step of, with the signature device and based on the variable $\rho(i)$ inputted in the second information input step and the attribute information $\vec{x}_t$ included in the signing key usk acquired in the signing key acquisition step, specifying, among integers i=1, . . . , L, a set I of an integer i for which the variable $\rho(i)$ is a positive tuple $(t, \vec{v}_i)$, the signing key usk including $\vec{x}_t$ indicated by identification information t of the positive tuple being acquired in the signing key acquisition step, and with which an inner-product of $\vec{v}_i$ of the positive tuple and the attribute information $\vec{x}_t$ indicated by the identification information t of the positive tuple becomes 0, and an integer i for which the variable $\rho(i)$ is a negative tuple $\neg (t, \vec{v}_i)$, the signing key usk including $\vec{x}_t$ indicated by the identification information t of the negative tuple being acquired in the signing key acquisition step, and with which an inner-product of $\vec{v}_i$ of the negative tuple and the attribute information $\vec{x}_t$ indicated by the identification information t of the negative tuple does not become 0; and calculating, concerning i included in the set I specified, a complementary coefficient $\alpha_i$ with which a total of $\alpha_i M_i$ based on $M_i$ which is an element on an i-th row of the matrix M inputted in the second information input step becomes a predetermined vector $\vec{h}$;

a signature element generation step of, with the signature device, generating, for each integer i=1 . . . , L, a signature element $s^*_i$ including a vector indicated in Formula 25 using the basis vector $b^*_{t,i}$ (i=$2n_t+1$, $2n_t+2$) of the basis $B^*_t$, based on a key element $k^*_{t,1}$ and a key element $k^*_{t,2}$ included in the signing key usk, predetermined values $\xi_1$, E, and $\mu$, and a value m' calculated from the message m, by setting a value $\gamma_t$ to satisfy $\gamma_t := \alpha_t$ when the integer i is included in the set I specified in the complementary coefficient calculation step and the variable $\rho(i)$ is a positive tuple $(t, \vec{v}_i)$; by setting the value $\gamma_i$ to satisfy $\gamma_i := \alpha_i/(v_i \cdot x_t)$ when the integer i is included in the set I and the variable $\rho(i)$ is a negative tuple $\neg (t, \vec{v}_i)$; and by setting the value $\gamma_i$ to satisfy $\gamma_i := 0$ when the integer i is not included in the set I;

a signature data transmission step of, with the signature device, transmitting, to a verification device, signature data $\sigma$ including: the signature element $s^*_i$ generated for each integer $i=1, \ldots, L$ in the signature element generation step; the message m; the variable $\rho(i)$; and the matrix M;

a data acquisition step of, with the verification device, acquiring the signature data $\sigma$ transmitted in the signature data transmission step;

a vector generation step of, with the verification device, generating a column vector $\vec{s}^T := (s_1, \ldots, s_L)^T := M \cdot \vec{f}^T$ based on a vector $\vec{f}$ having r pieces of elements and the matrix M included in the signature data $\sigma$ acquired in the data acquisition step, and generating a column vector $(\vec{s}')^T := (s_1', \ldots, s_L')^T := M \cdot (\vec{f}')^T$ based on the matrix M and a vector $\vec{f}'$ having r pieces of elements and satisfying $s_0 = \vec{h} \cdot (\vec{f}')^T$ where $s_0 = \vec{h} \cdot \vec{f}^T$;

a verification element generation step of, with the verification device, for each integer $i=1, \ldots, L$ and based on the column vector $\vec{s}^T$ and the column vector $(\vec{s}')^T$ which are generated in the vector generation step, and predetermined values $\theta_i$, $\theta_i'$, $\theta_i''$, and $\sigma_i$ for each integer $i=1, \ldots, L$, generating a verification element $c_i$ including a vector indicated in Formula 26, when the variable $\rho(i)$ is a positive tuple $(t, \vec{v}_i)$, using a basis vector $b_{t,i'}$ ($i'=1, \ldots, 2n_t+2$) of the basis $B_t$ indicated by identification information t of the positive tuple, and generating a verification element $c_i$ including a vector indicated in Formula 27, when the variable $\rho(i)$ is a negative tuple $\neg (t, \vec{v}_i)$, using a basis vector $b_{t,i'}$ ($i'=1, \ldots, 2n_t+2$) indicated by identification information t of the negative tuple; and a pairing operation step of, with the verification device, verifying an authenticity of the signature data $\sigma$ by conducting a pairing operation $\Pi_{i=1}^{L} e(c_i, s^*_i)$ for the verification element $c_i$ generated in the verification element generation step and the signature element $s^*_i$ included in the signature data $\sigma$, $$\left(\overbrace{(\delta_j+1)(x_{t,1}, \ldots, x_{t,n_t})}^{n_t}, \overbrace{-\delta_j(x_{t,1}, \ldots, x_{t,n_t})}^{n_t}, 0, \ldots, 0\right) B^*_t \quad \text{[Formula 24]}$$

$$\gamma_i \cdot (\xi_1 k^*_{t,1} + (E-\xi_1) k^*_{t,2}) + (\mu b^*_{t,2n_t+1}) + m'(\mu b^*_{t,2n_t+2}) \quad \text{[Formula 25]}$$

$$\left(\overbrace{s_i + \theta_i v_{i,1}, \theta_i v_{i,2}, \ldots, \theta_i v_{i,n_t}}^{n_t},\right.$$
$$\left.\overbrace{s_i' + \theta_i' v_{i,1}, \theta_i' v_{i,2}, \ldots, \theta_i' v_{i,n_t}}^{n_t}, \overbrace{\sigma_i - \theta_i'' m', \theta_i''}^{2}, 0, \ldots, 0\right) B_t \quad \text{[Formula 26]}$$

$$\left(\overbrace{s_i(v_{i,1}, \ldots, v_{i,n_t})}^{n_t}, \overbrace{s_i'(v_{i,1}, \ldots, v_{i,n_t})}^{n_t},\right.$$
$$\left.\overbrace{\sigma_i - \theta_i'' m', \theta_i''}^{2}, 0, \ldots, 0\right) B_t. \quad \text{[Formula 27]}$$

10. A non-transitory computer readable medium including a signature processing program comprising:

a key generation program to run on d (d is an integer of 1 or more) units of key generation devices, a signature program to run on a signature device, and a verification program to run on a verification device, and serving to execute a signature process using a basis $B_t$ and a basis $B^*_t$ for at least one integer $t=0, \ldots, d$, wherein the key generation program causes a computer to execute a first information input process of taking as input attribute information $\vec{x}_t := (x_{t,i})$ ($i=1, \ldots, n_t$) for an integer t among integers $t=1, \ldots, d$ which is predetermined for each of the key generation devices, a key element generation process of, for the integer t and each integer $j=1, 2$, generating a key element $k^*_{t,j}$ including a vector indicated in Formula 28 based on the attribute information $\vec{x}_t$ inputted in the first information input process, a predetermined value $\delta_j$, and a basis vector $b^*_{t,i}$ ($i=1, \ldots, 2n_t$) of the basis $B^*_t$, and a signing key transmission process of transmitting, to the signature device, a signing key usk including: the key element $k^*_{t,j}$ generated in the key element generation process; and the attribute information $\vec{x}_t$, wherein the signature program causes the computer to execute a second information input process of taking as input a variable $\rho(i)$ for each integer $i=1, \ldots, L$ (L is an integer of 1 or more), which variable $\rho(i)$ is either one of a positive tuple $(t, \vec{v}_i)$ and a negative tuple $\neg (t, \vec{v}_i)$ of the identification information t (t is any one integer of $t=1, \ldots, d$) and attribute information $\vec{v}_i := (v_{i,i'})$ ($i'=1, \ldots, n_t$); a predetermined matrix M having L rows and r columns (r is an integer of 1 or more); and a message m, a signing key acquisition process of acquiring the signing key usk transmitted in the signing key transmission process of at least one key generation device among the d units of key generation devices, a complementary coefficient calculation process of, based on the variable $\rho(i)$ inputted in the second information input process and the attribute information $x_t$ included in the signing key usk acquired in the signing key acquisition process, specifying, among integers $i=1, \ldots, L$, a set I of an integer i for which the variable $\rho(i)$ is a positive tuple $(t, \vec{v}_i)$, the signing key usk including $\vec{x}_t$ indicated by identification information t of the positive tuple being acquired in the signing key acquisition process, and with which an inner-product of $\vec{v}_i$ of the positive tuple and the attribute information $\vec{x}_t$ indicated by the identification information t of the positive tuple becomes 0, and an integer i for which the variable $\rho(i)$ is a negative tuple $\neg (t, \vec{v}_i)$, the signing key usk including $\vec{x}_t$ indicated by identification information t of the negative tuple being acquired in the signing key acquisition process, and with which an inner-product of $\vec{v}_i$ of the negative tuple and the attribute information $\vec{x}_t$ indicated by the identification information t of the negative tuple does not become 0; and calculating, concerning i included in the set I specified, a complementary coefficient $\alpha_i$ with which a total of $\alpha_i M_i$ based on $M_i$ which is an element on an i-th row of the matrix M inputted in the second information input process becomes a predetermined vector $\vec{h}$, a signature element generation process of generating, for each integer $i=1, \ldots, L$, a signature element $s^*_i$ including a vector indicated in Formula 29 using the basis vector $b^*_{t,i}$ ($i=2n_t+1, 2n_t+2$) of the basis $B^*_t$, based on a key element $k^*_{t,1}$ and a key element $k^*_{t,2}$ included in the signing key usk, predetermined values $\xi_1$, E, and $\mu$, and a value m' calculated from the message m, by setting a value $\gamma_i$ to satisfy $\gamma_i := \alpha_i$ when the integer i is included in the set I specified in the complementary coefficient calculation process and the variable $\rho(i)$ is a positive tuple (t, $\vec{v}_i$); by setting the value $\gamma_i$ to satisfy $\gamma_i := \alpha_i/(\vec{v}_i \cdot \vec{x}_t)$ when the integer i is included in the set I and the variable $\rho(i)$ is a negative tuple $\neg$ (t, $\vec{v}_i$); and by setting the value $\gamma_i$ to satisfy $\gamma_i := 0$ when the integer i is not included in the set I, and a signature data transmission process of transmitting, to the verification device, signature data $\sigma$ including: the signature element $s^*_i$ generated for each integer i=1, ..., L in the signature element generation process; the message m; the variable $\rho(i)$; and the matrix M, and wherein the verification program causes the computer to execute a data acquisition process of acquiring the signature data $\sigma$ transmitted in the signature data transmission process, a vector generation process of generating a column vector $\vec{s}^T := (s_1, ..., s_L)^T := M \cdot \vec{f}^T$ based on a vector $\vec{f}$ having r pieces of elements and the matrix M included in the signature data $\sigma$ acquired in the data acquisition process, and generating a column vector $(\vec{s}')^T := (s_1', ..., s_L')^T := M \cdot (\vec{f}')^T$ based on the matrix M and a vector $\vec{f}'$ having r pieces of elements and satisfying $s_0 = \vec{h} \cdot (\vec{f}')^T$ where $s_0 = \vec{h} \cdot \vec{f}^T$, a verification element generation process of, for each integer i=1, ..., L and based on the column vector $\vec{s}^T$ and the column vector $(\vec{s}')^T$ which are generated in the vector generation process, and predetermined values $\theta_i$, $\theta_i'$, $\theta_i''$, and $\sigma_i$ for each integer i=1, ..., L, generating a verification element $c_i$ including a vector indicated in Formula 30, when the variable $\rho(i)$ is a positive tuple (t, $\vec{v}_i$), using a basis vector $b_{t,i'}$ (i'=1, ..., 2$n_t$+2) of the basis $B_t$ indicated by identification information t of the positive tuple, and generating a verification element $c_i$ including a vector indicated in Formula 31, when the variable $\rho(i)$ is a negative tuple $\neg$ (t, $\vec{v}_i$), using a basis vector $b_{t,i}$ (i=1, ..., 2$n_t$+2) indicated by identification information t of the negative tuple, and a pairing operation process of verifying an authenticity of the signature data $\sigma$ by conducting a pairing operation $\Pi_{i=1}^{L} e(c_i, s^*_i)$ for the verification element $c_i$ generated in the verification element generation process, and the signature element $s^*_i$ included in the signature data $\sigma$, $$\left( \overbrace{(\delta_j+1)(x_{t,1}, \ldots, x_{t,n_t})}^{n_t}, \overbrace{-\delta_j(x_{t,1}, \ldots, x_{t,n_t})}^{n_t}, 0, \ldots, 0 \right) B_t^* \quad \text{[Formula 28]}$$

$$\gamma_i \cdot (\xi_1 k^*_{t,1} + (E - \xi_1) k^*_{t,2}) + (\mu b^*_{t, 2n_t+1}) + m'(\mu b^*_{t, 2n_t+2}) \quad \text{[Formula 29]}$$

$$\left( \overbrace{s_i + \theta_i v_{i,1}, \theta_i v_{i,2}, \ldots, \theta_i v_{i,n_t}}^{n_t}, \right.$$
$$\left. \overbrace{s_i' + \theta_i' v_{i,1}, \theta_i' v_{i,2}, \ldots, \theta_i' v_{i,n_t}}^{n_t}, \overbrace{\sigma_i - \theta_i'' m', \theta_i''}^{2}, 0, \ldots, 0 \right) B_t \quad \text{[Formula 30]}$$

$$\left( \overbrace{s_i(v_{i,1}, \ldots, v_{i,n_t})}^{n_t}, \overbrace{s_i'(v_{i,1}, \ldots, v_{i,n_t})}^{n_t}, \right.$$
$$\left. \overbrace{\sigma_i - \theta_i'' m', \theta_i''}^{2}, 0, \ldots, 0 \right) B_t. \quad \text{[Formula 31]}$$

\* \* \* \* \*